United States Patent
Dalli et al.

(10) Patent No.: US 11,797,835 B2
(45) Date of Patent: *Oct. 24, 2023

(54) EXPLAINABLE TRANSDUCER TRANSFORMERS

(71) Applicant: UMNAI Limited, Ta'Xbiex (MT)

(72) Inventors: Angelo Dalli, Floriana (MT); Matthew Grech, San Gwann (MT); Mauro Pirrone, Kalkara (MT)

(73) Assignee: UMNAI Limited, Ta' Xbiex (MT)

( * ) Notice: Subject to any disclaimer, the term of this patent is extended or adjusted under 35 U.S.C. 154(b) by 0 days.

This patent is subject to a terminal disclaimer.

(21) Appl. No.: 18/156,168

(22) Filed: Jan. 18, 2023

(65) Prior Publication Data

US 2023/0153599 A1 May 18, 2023

Related U.S. Application Data

(63) Continuation of application No. 17/554,286, filed on Dec. 17, 2021, now Pat. No. 11,593,631.

(60) Provisional application No. 63/126,694, filed on Dec. 17, 2020.

(51) Int. Cl.
   G06N 3/04 (2023.01)
   G06N 3/08 (2023.01)
   G06N 3/065 (2023.01)

(52) U.S. Cl.
   CPC ............. *G06N 3/065* (2023.01); *G06N 3/04* (2013.01); *G06N 3/08* (2013.01)

(58) Field of Classification Search
   CPC .................................. G06N 3/08; G06N 3/04
   See application file for complete search history.

(56) References Cited

U.S. PATENT DOCUMENTS

| | | |
|---|---|---|
| 5,499,319 A | 3/1996 | Sultan et al. |
| 2014/0096249 A1 | 4/2014 | Dupont et al. |
| 2016/0155049 A1 | 6/2016 | Choi |
| 2017/0213156 A1 | 7/2017 | Hammond et al. |
| 2019/0354853 A1 | 11/2019 | Zoldi et al. |
| 2019/0370647 A1 | 12/2019 | Doshi et al. |

(Continued)

OTHER PUBLICATIONS

Spinner et al., "explAIner: A Visual Analytics Framework for Interactive and Explainable Machine Learning", 2019 (Year: 2019).*

(Continued)

*Primary Examiner* — Selene A. Haedi
(74) *Attorney, Agent, or Firm* — Maier & Maier, PLLC

(57) ABSTRACT

An explainable transducer transformer (XTT) may be a finite state transducer, together with an Explainable Transformer. Variants of the XTT may include an explainable Transformer-Encoder and an explainable Transformer-Decoder. An exemplary Explainable Transducer may be used as a partial replacement in trained Explainable Neural Network (XNN) architectures or logically equivalent architectures. An Explainable Transformer may replace black-box model components of a Transformer with white-box model equivalents, in both the sub-layers of the encoder and decoder layers of the Transformer. XTTs may utilize an Explanation and Interpretation Generation System (EIGS), to generate explanations and filter such explanations to produce an interpretation of the answer, explanation, and its justification.

20 Claims, 23 Drawing Sheets

(56) References Cited

U.S. PATENT DOCUMENTS

| | | |
|---|---|---|
| 2020/0033868 A1 | 1/2020 | Palanisamy et al. |
| 2020/0184278 A1 | 6/2020 | Zadeh et al. |
| 2020/0293888 A1 | 9/2020 | Meyerson et al. |
| 2021/0073282 A1 | 3/2021 | Hunter |
| 2021/0182713 A1* | 6/2021 | Kar ..................... G06V 10/464 |
| 2021/0350221 A1 | 11/2021 | Elenes |
| 2022/0036209 A1 | 2/2022 | Horesh et al. |
| 2022/0067510 A1 | 3/2022 | Jayakumar et al. |
| 2022/0067511 A1 | 3/2022 | Goldman-Shenhar et al. |
| 2022/0147838 A1 | 5/2022 | Gu et al. |

OTHER PUBLICATIONS

Keneni et al., "Evolving Rule-Based Explainable Artificial Intelligence for Unmanned Aerial Vehicles", 2019 (Year: 2019).*

Dietterich, "Ensemble Methods in Machine Learning", 2000 (Year: 2000).

Yang et al., "Enhancing Explainability of Neural Networks through Architecture Constraints", Sep. 2019 (Year: 2019).

Pope et al., "Explainability Methods for Graph Convolutional Neural Networks", Jun. 2019 (Year: 2019).

Yeh et al., "Transformer-Transducer: End-to-end Speech Recognition with Self-attention", Oct. 2019 (Year: 2019).

Tavanaei, "Embedded Encoder-Decoder in Convolutional Networks Towards Explainable AI", Jun. 2020 (Year: 2020).

Roy et al., "Tree-CNN: A Hierarchical Deep Convolutional Neural Network for incremental Learning", Sep. 2019 (Year: 2019).

Shi et al., "Self-Supervised Discovering of Interpretable Features for Reinforcement Learning", Nov. 2020 (Year: 2020).

Sabih et al., "Utilizing Explainable AI for Quantization and Pruning of Deep Neural Networks", Aug. 2020 (Year: 2020).

Garcez et al., "Neurosymbolic AI: The 3rd Wave", Dec. 16, 2020 (Year 2020).

Vilone et al., "Exaplainable Artificial Intelligence: a Systematic Review", Oct. 2020 (Year: 2020).

Sani et al., "Explaining the Behavior of Black-Box Prediction Algorithms with Causal Learning", Jun. 2020 (Year: 2020).

Joyce et al., "Semiotics and agents for integrating and navigating through multimedia representations of concepts", Jan. 2000 (Year: 2000).

Garcez et al., "Abductive reasoning in neural-symbolic systems", Apr. 2007 (Year: 2007).

Kenny et al., "Twin-Systems to Explain Artificial Neural Networks using Case-Based Reasoning: Comparative Test of Feature-Weighting Methods in ANN-CBR Twins for XAI", Jul. 2019 (Year: 2019).

Nan et al., "Recognizing Unseen Attribute-Object Pair with Generative Model", 2019 (Year: 2019).

Lauritsen et al., "Explainable artificial intelligence model to predict acute critical illness from electronic health records", Jul. 2020 (Year: 2020).

Anthimopoulos et al., Lung Pattern Classification for Interstitial Lung Diseases Using a Deep Convolutional Neural Network, May 2016 (Year: 2016).

Vaughan et al., "Explainable Neural Networks based on Additive Index Model", Jun. 2018 (Year: 2018).

* cited by examiner

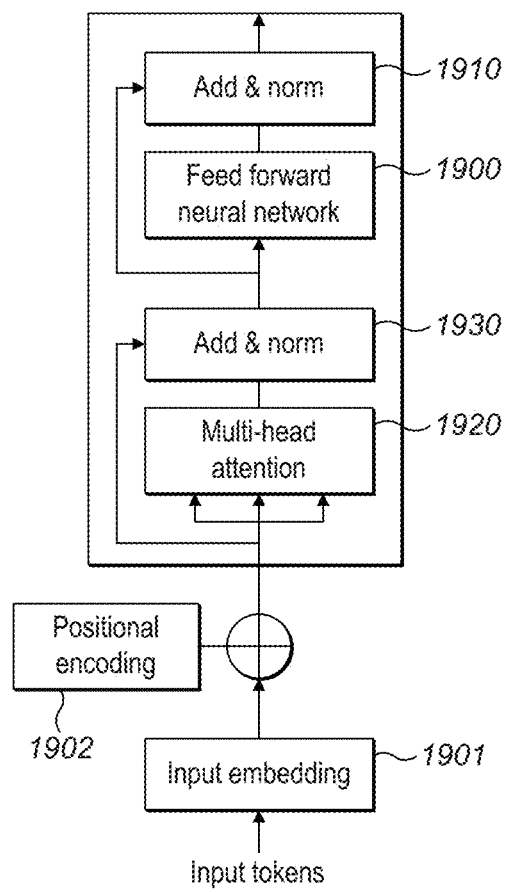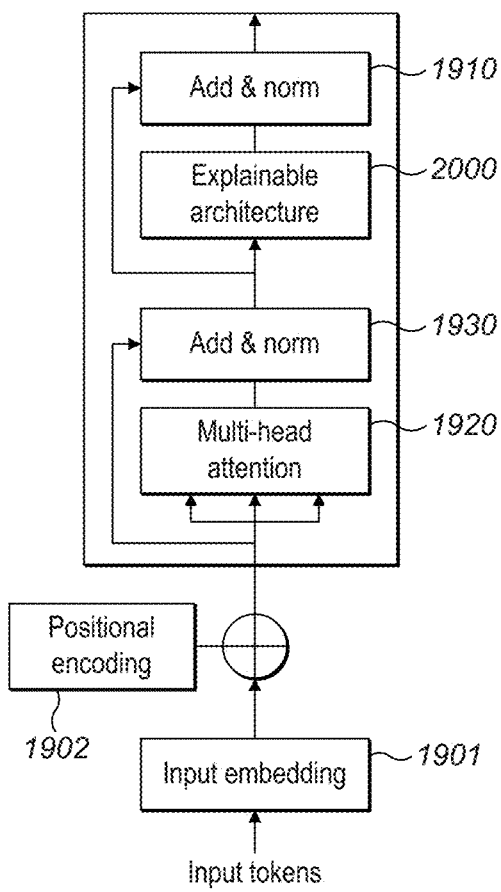
FIG. 8(a)
(PRIOR ART)
FIG. 8(b)

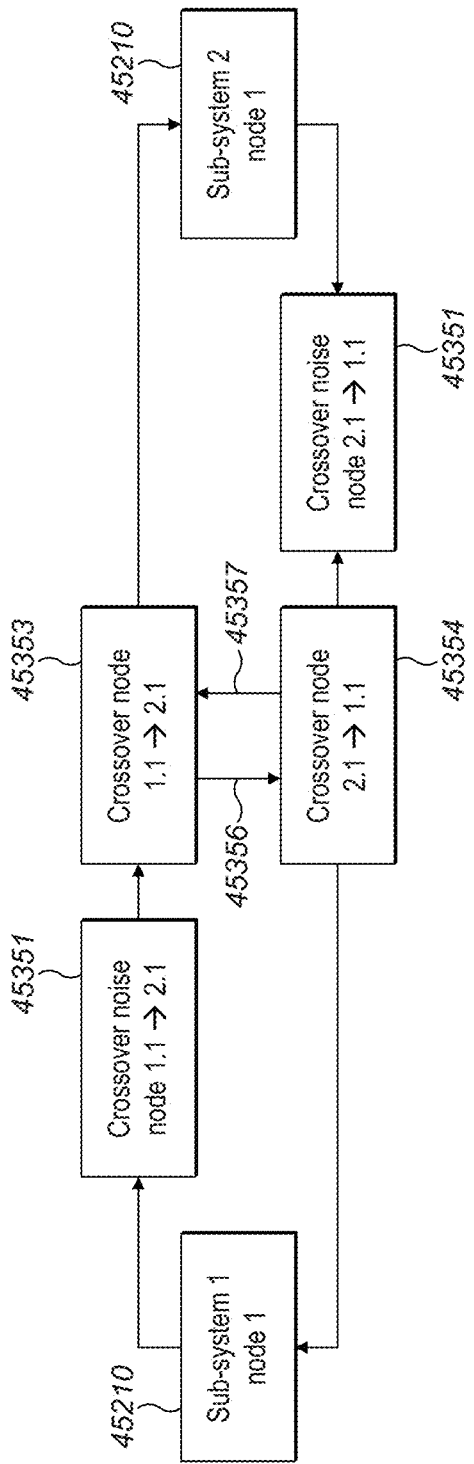
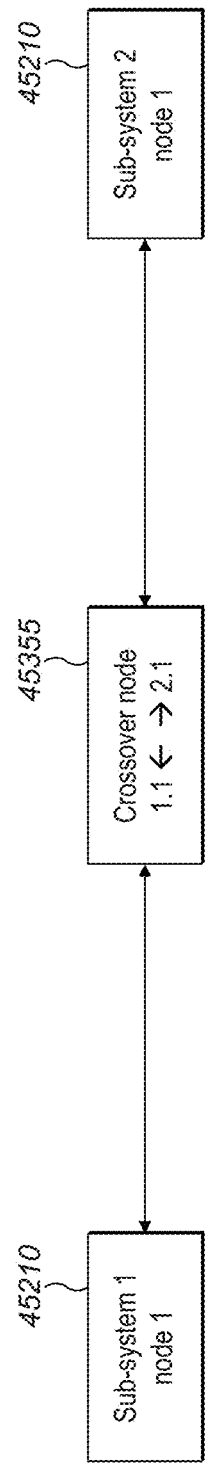
FIG. 21(a)
FIG. 21(b)

EXPLAINABLE TRANSDUCER TRANSFORMERS

CLAIM OF PRIORITY

This application claims priority from U.S. patent application Ser. No. 17/554,286, filed on Dec. 17, 2021, entitled "EXPLAINABLE TRANSDUCER TRANSFORMERS," which in turn claims priority from U.S. Provisional Patent Application No. 63/126,694, filed on Dec. 17, 2020, the entire contents of which are hereby incorporated by reference.

FIELD

An exemplary embodiment relates to the field of machine learning systems.

BACKGROUND

Transducers are one of the fundamental models that allow machine learning systems to translate, map and transform data from an input language into a second output language. A finite state transducer (FST) is a finite state automaton that works on two or more tapes and are more general than plain finite state automata (FSA) that work on a single tape. An FST defines relations between sets of strings and can thus be treated as a fundamental translator or transformer between strings arising in two distinct input and output sets.

A finite state transducer (FST), as shown in FIG. 1, may be defined as a 6-tuple<K, Σ,◻ , s, γ, Δ>, where K refers to the finite set of states, Σ refers to the alphabet of the input symbols, ⌈ refers to the alphabet of the output symbols, s refers to the start state, such that s∈ K, γ refers to the output function, such that γ:K→◻ *, and Δ refers to the transition function. A finite state transducer is a finite state automaton that may translate one tape into another tape. In a formal manner, the input tape, and the output tape may be switched, and hence finite state transducers are bi-directional. In the exemplary FST shown in FIG. 1, there are four transition paths 100, 105, 110 and 115 that lead to the terminal state 120. Additional finite-state syntax can be added to express powerful matching and transformation rules within FSTs (Karttunen, 2000).

Finite state transducers (FST) may be a fundamental component for translating an input language to another language. The Transformer (Vaswani et al., 2017) may be a natural evolution of FSTs, with an attention-based architecture that offers state-of-the-art results in various fields, such as Natural Language Processing (NLP) and image classification. Transformers require significantly less time to train than other architectures, such as LSTM architectures and CNN architectures, due to parallelization of its components, such as computing the queries, keys, and values simultaneously.

The Transformer architecture may be divided into an encoder component and the decoder component.

The input to the encoder component may include the summation of the input embedding and the positional encoding of the input tokens. Positional encoding is required since, unlike sequential architectures, such as recurrent neural networks where the input tokens are sequentially inserted and hence retain the order of the input tokens, in the Transformer (Vaswani et al., 2017) there is no notion of the order of the words. The architecture of the encoder layer, as shown in the Transformer (Vaswani et al., 2017) architecture, may include two sub-layers. The first sub-layer may include a Multi-Head Attention component 215, followed by an Add and Normalization component 217, as shown in FIG. 2. The second sub-layer may include a feed forward neural network component 230, followed by an Add and Normalization component 232. A Multi-Head Attention component may include multiple instances of the Scaled Dot-Product Attention (Vaswani et al., 2017), where each instance has its own weights to improve the generalization of the model. The output matrix of each instance $\{z_o, \ldots, z_n\}$ is concatenated and multiplied by a weight matrix $W_o$, resulting in an output matrix.

The architecture of the decoder layer, as shown in the Transformer (Vaswani et al., 2017) architecture, may include three sub-layers. The first sub-layer consists of a Masked Multi-Head Attention component 250, followed by an Add and Normalization component 252. The second sub-layer consists of a Multi-Head Attention (Encoder-Decoder) component 240, followed by an Add and Normalization component 242. The third sub-layer consists of a feed forward network component 270, followed by an Add and Normalization component 272, as shown in FIG. 2. The Encoder-Decoder Attention component is similar to the Multi-Head Attention component, however the query vector Q is from the previous sub-layer of the decoder layer, and the key vectors K and value vectors V are retrieved from the output of the final encoder layer. The Masked Multi-Head Attention component is a Multi-Head Attention component with a modification such that the self-attention layer is only allowed to attend to earlier positions of the input tokens. The output of the decoder layer may be connected to a linear layer 280, followed by the SoftMax computation to generate the probabilities 290 of the output vocabulary, representing the predicted tokens. The input to the decoder component may include the token embeddings of the output tokens 260 and the positional encoding 295.

A core component of the Transformer architecture (Vaswani et al., 2017) is the attention component. A Transformer may have three types of attention mechanisms: Encoder Self-Attention, Decoder Self-Attention and Encoder-Decoder Attention. The input of the Encoder Self-Attention is the source input tokens of the Transformer, or the output of the previous encoder layer. The Encoder Self-Attention component does not have masking and each token has a global dependency with the other input tokens. The Decoder Self-Attention component uses the output tokens of the Transformer as the input tokens, or the output of the previous decoder layer. In a Decoder Self-Attention, the input tokens are dependent on the previous input tokens. In the Encoder-Decoder Attention component, the queries are retrieved from the previous component of the decoder layer and the keys and values are retrieved from the output of the encoder.

The input $inp_q$, $inp_w$ and $inp_k$ for self-attention are identical in the Transformer, except for the encoder-decoder attention. The self-attention as presented in the Transformer may be illustrated as show in Equation 1.

$$\text{Softmax}\left(\frac{QK^T}{\sqrt{d_k}}\right) V \qquad (1)$$

Where: Q refers to a matrix consisting of a set of queries, K refers to a matrix consisting of a set of keys, V refers to a matrix consisting of a set of values, and $d_k$ refers to the dimensionality of the keys and the queries.

The work in Tsai et al. (2019) presents a new formulation of the attention mechanism in the Transformer from the lens of the kernel. Tsai et al. (2019) use a filtering function M as the mask mechanism in the kernel formulation. The filtering function M may be required for the masking of the self-attention in the decoder module of the Transformer. Tsai et al. (2019) enable better understanding of the attention mechanism by introducing customizability and better understanding of the attention components, such as the kernel feature space, the construction of the kernel and the incorporation of positional embedding, the value function, and the filtering function.

Bi-directional Encoder Representations from Transformers (BERT) (Devlin et al., 2018) is an architecture based on the encoder component of the Transformer (Vaswani et al., 2017) designed to construct bi-directional context representations of the input tokens in a self-supervised approach.

BERT (Devlin et al., 2018) uses masked language modelling to randomly mask random input tokens and set a pre-training objective to predict the original token of the masked input tokens. BERT typically masks 15% of the input tokens at random. The randomly masked input tokens have an 80% chance to be replaced by a [MASK] token, a 10% chance to be replaced by another random token and a 10% chance to remain unchanged. BERT (Devlin et al., 2018) may also use next sentence prediction (NSP) as a pre-training objective, to predict if the second input sentence is the next sentence of the first input sentence. This is useful for multiple downstream tasks such as Question-Answering predictions. The NSP pre-training objective may have a 50% chance that the second sentence of the input being the actual sentence that follows the first input sentence, and a 50% chance that the second sentence of the input being a random sentence from the training dataset.

BERT uses WordPiece embeddings (Wu et al., 2016) for the input tokens. The WordPiece embeddings of the input tokens are summed with the segment embeddings and positional embeddings to create the BERT input. BERT may also be fine-tuned to downstream tasks using approaches such as supervised classification to construct fine-tuned models for selected tasks.

Embedding can also represent non-textual information, such as Contextualized Object Embeddings (COBE), which is extracted from narrated instructional videos uses a visual detector to predict a contextualized word embedding of an object and its associated narration (Bertasius and Torresani, 2020).

ELMo (Peters et al., 2018) constructs word representations that consider linguistic contexts, and syntax and semantics characteristics. The produced word representations are retrieved from the internal states of a bi-directional language model.

Generative Pre-trained Transformer (GPT) (Radford et al., 2018) is an architecture based on the decoder component of a variation (Liu et al., 2018) of the Transformer (Vaswani et al., 2017) designed to learn a model on large corpus of unlabeled text and using the model for fine-tuning to adapt for a classification task with labelled data. The GPT pre-training objective is to maximize the likelihood as shown in Equation 2.

$$\Sigma_i \log P(u_i | u_{i-k}, \ldots, u_{i-1}; \Theta) \qquad (2)$$

Where: P is the conditional probability, which is modelled using a neural network architecture with the respective parameters $\Theta$; u is a token in an unlabelled corpus U, such that $U=\{u_1, \ldots, u_n\}$; and k is the input context window of the GPT architecture.

The trained GPT architecture is fine-tuned for supervision tasks by appending a linear layer to predict the classification label, and to maximize the objective shown in Equation 3.

$$\Sigma_{(x,y)} \log P(y|x_1, \ldots, x_m) \qquad (3)$$

Where: P is the conditional probability, y the classification label, and $\{x_1, \ldots, x_m\}$ the input tokens.

Hoover et al. (2019) present EXBERT, an interactive tool used to understand the BERT attention mechanism. EXBERT may illustrate potential inductive bias by providing insights about the learnt contextual representations. The attention of an input sequence $input_s$, where $input_s = [token_1, token_2, \ldots, token_n]$, may be defined as n×n matrix. EXBERT represents the attention relation of the input sequence as an n×n matrix, at any encoder layer, attention head or an aggregated attention value, together with the functionality to search specific tokens in the corpus using Cosine Similarity to retrieve the top 50 matches, and a display of the summary of the matched metadata, such as POS and NER, in the searched corpus.

Tree Transformer (Wang et al., 2019), is an encoder-based Transformer architecture with a constraint on the attention heads to follow tree-based hierarchical structures. The constraint is implemented using a Constituent Attention module, to learn the tree structures from the corpus. A Tree Transformer layer consists of a Multi-Head Attention sub-layer, a Constituent Attention module, and a Feed Forward sub-layer. Constituent priors are computed by the Constituent Attention module. The attention of the Multi-Head Attention is guided by the constituent priors. The Constituent Attention module generates the constituent priors by generating a sequence $u=\{u_1, u_2, \ldots, u_n\}$. The elements in u represent the probability that the respective input token (e.g., $w_1$) and its neighbor token (e.g., $w_2$) belong to the same constituent block. Breakpoints are indicated by small probability values, triggering the construction of a new constituent block. The sequence u is constructed using Neighbouring Attention and Hierarchical Constraints. The Tree Transformer method may be classified as a gray-box method and thus a trace of the activation path would not be possible. As an improvement on the Tree Transformer method, the method contemplated herein may introduce white-box components in the Transformer based architecture to generate global and local explanations based on such architecture.

EQTransformer (Mousavi et al., 2020) uses an encoder and three decoders for earthquake detection, based on a hierarchical attentive model. The input to the encoder includes seismic signals, to generate a contextual representation of the temporal dependencies. The decoder uses this learnt information to map it to a vector of probabilities associated with the existence of an earthquake signal, the P-phase, and the S-phase, for each time point.

The Transformer architecture may be used for image synthesis (Weissenborn et al., 2020), multi-object tracking (Zhang et al., 2020), music generation (Huang et al., 2018), 3D object detection (Yang et al., 2019), point-cloud processing (Guo et al., 2020), time-series forecasting (Lim et al., 2020), vision language modelling (Li et al., 2019), and end-to-end object detection (Zhu et al., 2020).

The Transformer architecture is a black-box machine learning model. The black-box feed forward neural network components in the Transformer (Vaswani et al., 2017), BERT (Devlin et al., 2018), and GPT (Radford et al., 2018) are incapable of providing explanations to the generated predictions. The attention learnt inside a Transformer, during pre-training, remains a black-box and may not capture the human intuition of hierarchical structures. EXBERT provides a degree of post-hoc analysis of the learnt attention, however a Transformer based architecture still remains a black-box model. Our proposed method introduces white-box components in the Transformer based architecture to generate global and local explanations.

SUMMARY

According to at least one exemplary embodiment, a method, system and apparatus for an Explainable Transducer and Explainable Transformer may be shown and described.

Transducers may allow machine learning systems to translate, map, and transform data from an input language into a second output language. Transducers are often implemented as Finite State Transducers (FST).

An exemplary Transformer may be an attention-based architecture based on a combination of decoder and encoder components and can offer state-of-the-art results in various machine learning applications. The Transformer may be considered as a sophisticated evolution of FSTs, with an attention-based architecture.

An exemplary embodiment may combine an FST with an Explainable Transformer to produce an exemplary Explainable Transducer Transformer (XTT). XTT variants may be contemplated, such as an explainable Transformer-Encoder and an explainable Transformer-Decoder.

An exemplary Explainable Transducer may be used as a partial replacement in trained Explainable Neural Network (XNN) architectures or logically equivalent architectures.

An exemplary Explainable Transformer replaces black-box model components of a Transformer with white-box model equivalents, in both the sub-layers of the encoder and decoder layers of the Transformer.

XTTs may utilize the Explanation and Interpretation Generation System (EIGS), to generate explanations and filter the explanations to produce an interpretation of the answer, explanation, and its justification.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 8 (a) is an exemplary embodiment of a Transformer Encoder (Prior Art). FIG. 8 (b) is an exemplary embodiment of an Explainable Transformer Encoder (XTT-Encoder).

FIG. 9 (b) is an exemplary embodiment of an Explainable Transformer Decoder (XTT-Decoder).

FIG. 10 (b) is an exemplary embodiment of an XTT-Decoder with a downstream classification task.

FIG. 21 (a) is an exemplary multi-task crossover learning structure with unidirectional crossover links.

FIG. 21 (b) is an exemplary multi-task crossover learning structure with bi-directional crossover links.

DETAILED DESCRIPTION

Figure 1:
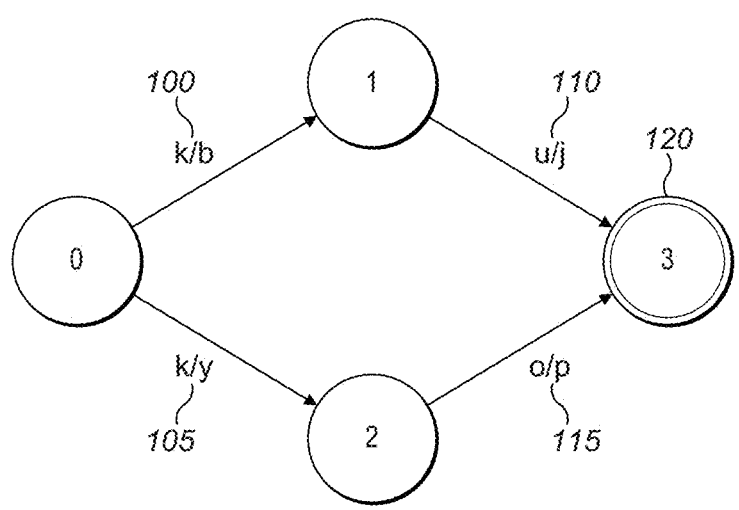
FIG. 1 is an exemplary embodiment of a Finite State Transducer (Prior Art).
Figure 2:
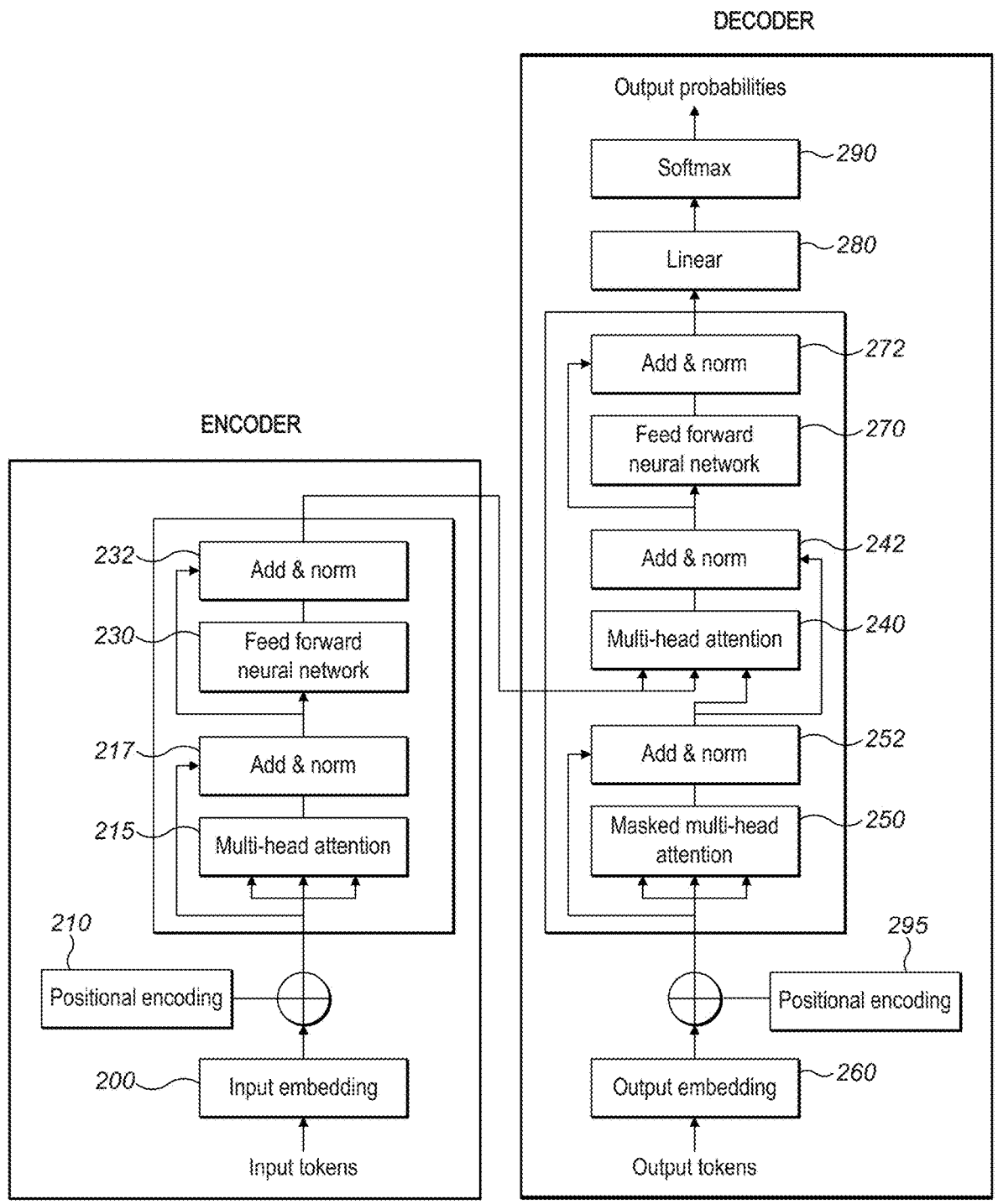
FIG. 2 is an exemplary embodiment of a Transformer (Prior Art) adopted from Vaswani et al. (2017).

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

The terms interpretable and explainable may have different meanings. Interpretability may be a characteristic that may need to be defined in terms of an interpreter. The interpreter may be an agent that interprets the system output or artifacts using a combination of (i.) its own knowledge and beliefs; (ii.) goal-action plans; (iii.) context; and (iv.) the world environment. An exemplary interpreter may be a knowledgeable human.

An alternative to a knowledgeable human interpreter may be a suitable automated system, such as an expert system in a narrow domain, which may be able to interpret outputs or artifacts for a limited range of applications. For example, a medical expert system, or some logical equivalent such as an end-to-end machine learning system, may be able to output a valid interpretation of medical results in a specific set of medical application domains.

It may be contemplated that non-human Interpreters may be created in the future that can partially or fully replace the role of a human Interpreter, and/or expand the interpretation capabilities to a wider range of application domains.

There may be two distinct types of interpretability: (i.) model interpretability, which measures how interpretable any form of automated or mechanistic model is, together with its sub-components, structure, and behavior; and (ii.) output interpretability which measures how interpretable the output from any form of automated or mechanistic model is.

Interpretability thus might not be a simple binary characteristic but can be evaluated on a sliding scale ranging from fully interpretable to un-interpretable. Model interpretability may be the interpretability of the underlying embodiment, implementation, and/or process producing the output, while output interpretability may be the interpretability of the output itself or whatever artifact is being examined.

A machine learning system or suitable alternative embodiment may include a number of model components. Model components may be model interpretable if their internal behavior and functioning can be fully understood and correctly predicted, for a subset of possible inputs, by the interpreter. In an embodiment, the behavior and functioning of a model component can be implemented and represented in various ways, such as a state-transition chart, a process flowchart or process description, a Behavioral Model, or some other suitable method. Model components may be output interpretable if their output can be understood and correctly interpreted, for a subset of possible inputs, by the interpreter.

An exemplary machine learning system or suitable alternative embodiment may be: (i.) globally interpretable if it is fully model interpretable (i.e., all of its components are model interpretable); or (ii.) modular interpretable if it is partially model interpretable (i.e., only some of its components are model interpretable). Furthermore, a machine learning system or suitable alternative embodiment may be locally interpretable if all its output is output interpretable.

A grey-box, which is a hybrid mix of a black-box with white-box characteristics, may have characteristics of a white-box when it comes to the output, but that of a black-box when it comes to its internal behavior or functioning.

A white-box may be a fully model interpretable and output interpretable system which can achieve both local and global explainability. Thus, a fully white-box system may be completely explainable and fully interpretable in terms of both internal function and output.

A black-box may be output interpretable but not model interpretable, and may achieve limited local explainability, making it the least explainable with little to no explainability capabilities and minimal understanding in terms of internal function. A deep learning neural network may be an output interpretable yet model un-interpretable system.

A grey-box may be a partially model interpretable and output interpretable system and may be partially explainable in terms of internal function and interpretable in terms of output. Thus, an exemplary grey-box may be between a white-box and a black-box on a scale of most explainable and interpretable (white-box) to least explainable and interpretable (black-box). Grey-box systems may have a level of modular interpretability since some of their components may be model interpretable.

Explainable architectures utilized in the explainable transformer XTT models include, but are not limited to, eXplainable artificial intelligence (XAI) models, Interpretable Neural Nets (INNs), eXplainable Neural Nets (XNN), eXplainable Spiking Nets (XSN) and eXplainable Memory Nets (XMN) models. A further exemplary embodiment may present methods for detecting bias both globally and locally by harnessing the white-box nature of eXplainable Reinforcement Learning (XRL).

Although some examples may reference one or more of these specifically (for example, only XAI or XNN), it may be contemplated that any of the embodiments described herein may be applied to XAIs, XNNs, XTTs, XSNs, or XMNs interchangeably. Another exemplary embodiment may relate to bias detection in Interpretable Neural Networks (INNs) and related grey-box models, which may be a hybrid mix between a black-box and white-box model. An exemplary embodiment may apply fully to the white-box part of the grey-box model and may apply to at least some portion of the black-box part of the grey-box model. It may be contemplated that any of the embodiments described herein may also be applied to INNs interchangeably.

Explainable Neural Networks (XNNs) are a new type of Artificial Neural Networks (ANNs) that are inherently interpretable and explainable. The main concept behind an XNN is that it is that the inner network structure is fully interpretable. Interpretability is built within the architecture itself, yet it functions like a standard neural network. This eliminates the need to apply additional techniques or processing for interpreting the result of a neural network. XNNs compute both the answer and its explanation in a single feed-forward step without any need for simulations, iterations, perturbation, etc. XNNs are also designed to be easily implementable both in software but also in hardware efficiently, leading to substantial speed and space improvements.

An XNN may combine multiple local models into one global model. Local models analyze a small area within the entire search space. Global models are about understanding the model with a holistic view. XNNs may implement both—multiple partitions represent the local zones and multiple linear models to explain each partition, combined they make up a global model. XNNs support both linear and non-linear data by embedding transformations within the neural network itself while retaining explainability. Each layer, neuron, and connection within an XNN has a precise and well known and understandable function, unlike standard ANNs that are a black box. XNNs are thus the first ever known fully white box ANNs, giving rise to new category of neural networks that are understandable and interpretable.

Figure 13:
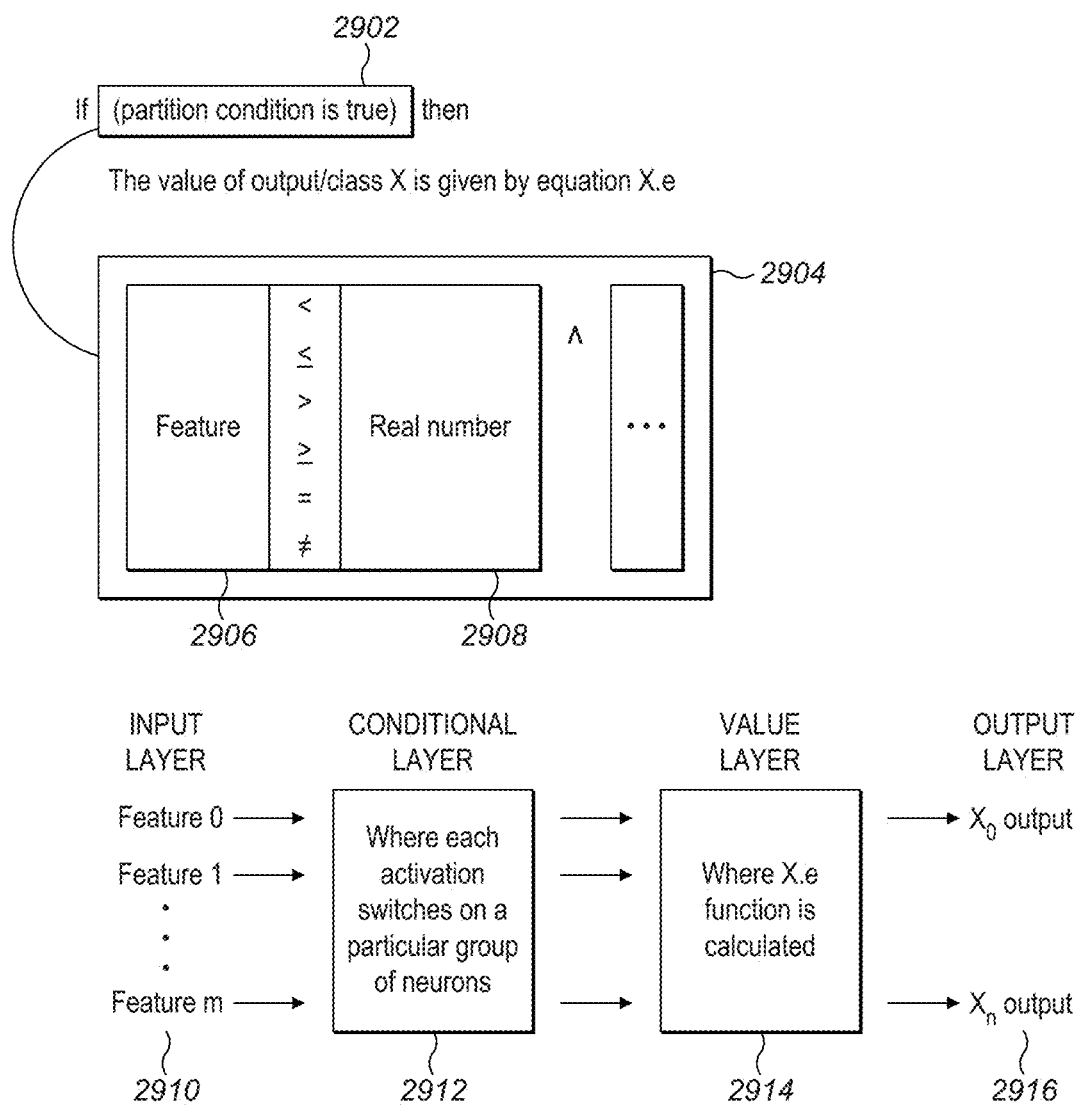
FIG. 13 is an exemplary embodiment of a system for embedding rule-based knowledge in an exemplary XNN.

Referring now to exemplary FIG. 13, FIG. 13 may be a schematic flowchart illustrating rule-based knowledge or logically equivalent knowledge embedded in XNN. First, a partition condition 2902 may be chosen using a localization method that may reference a number of rules and encoded knowledge. Partitions can be non-overlapping or overlapping. In the case of non-overlapping partitions, the XNN may take a single path in feed forward mode. In the case of overlapping partitions, the XNN may take multiple paths in feed forward mode and may compute a probability or ranking score for each path. In an alternative embodiment, overlapping partitions may also make use of an aggregation function which combines the results from the activated partitions. The partition condition 2902 can be interpreted as focusing the XNN onto a specific area of the model that is represented. The partition localization method may be typically implemented in the form given by template 2904 where various features 2906 are compared to real numbers 2908 repetitively using conjunctive normal form (CNF) or a logical equivalent such as disjunctive normal form (DNF). In an alternative embodiment, other non-Boolean logical systems may be utilized such as Type 1 or Type 2 fuzzy logic systems, modal logic, quantum logic, probabilistic logic, or other suitable type of logical system for the expression of logical or similar statements.

The localization method values, conditions and underlying equations may be selected and identified using an external process, such as an XAI model induction method or a logically equivalent method. In an alternative embodiment, the localization values, conditions, and underlying equations may be partially or fully induced using an end-to-end approach using gradient descent methods such as back-propagation. The chosen values are iteratively tested and varied until a certain level of accuracy is obtained in fitting the model to the relative test or synthetic data provided and/or by iteratively querying the initial black-box predictor model. An XNN may have four exemplary components in a localization or focusing module, which may be part of the conditional network, namely the input layer 2910, a conditional layer 2912, a value layer 2914 and an output layer 2916.

The input layer 2910 may be structured to receive the various features that need to be processed by the XNN. The input layer 2910 feeds the processed features through a conditional layer 2912, where each activation switches on a group of neurons. The conditional layer may require a condition to be met before passing along an output. Further, the input may be additionally analyzed by a value layer 2914. The value of the output X (in case of a calculation of an integer or real value, etc.) or the class (in case of a classification application, etc.) X is given by an equation X.e that is calculated by the value layer 2914. The X.e function results may be used to produce the output 2916. It may be contemplated that the conditional layer and the value layer may occur in any order, or simultaneously.

Figure 3:
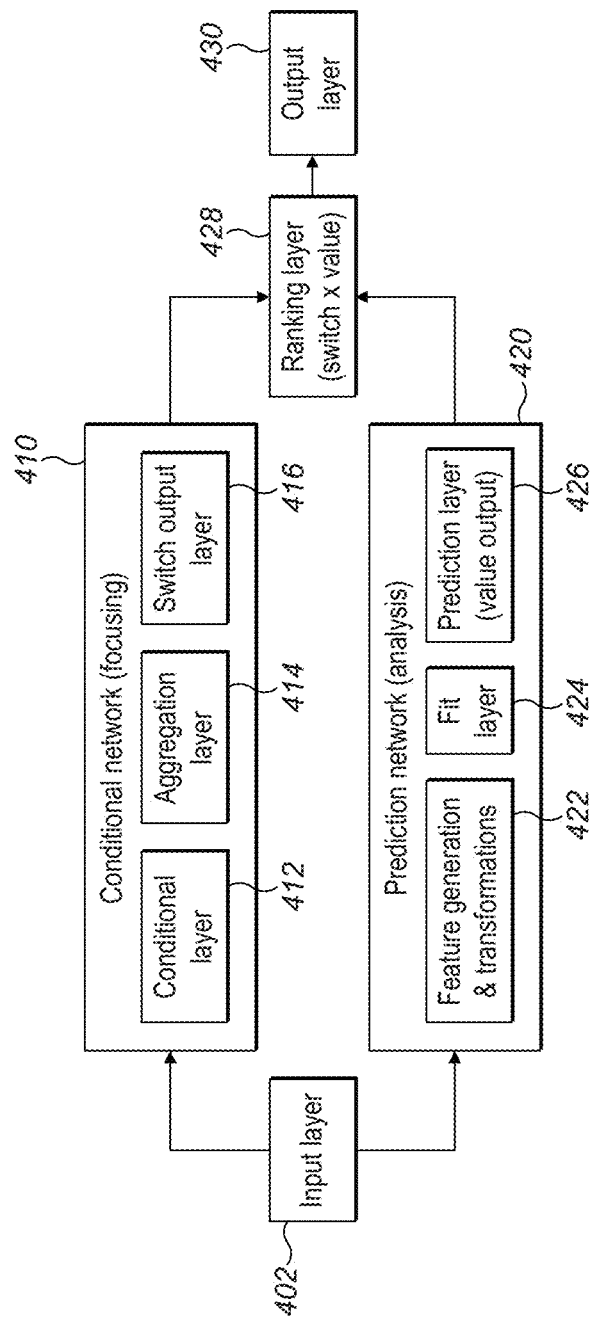
FIG. 3 is an exemplary Explainable Neural Network (XNN) Architecture.

Referring now to exemplary FIG. 3, FIG. 3 may illustrate a schematic diagram of an exemplary high-level XNN architecture. An input layer 402 may be inputted, possibly simultaneously, into both a conditional network 410 and a prediction network 420. The conditional network 410 may include a conditional layer 412, an aggregation layer 414, and a switch output layer (which outputs the conditional values) 416. The prediction network 420 may include a feature generation and transformation 422, a fit layer 424, and a prediction output layer (value output) 426. The layers may be analyzed by the selection and ranking layer 428 that may multiply the switch output by the value output, producing a ranked or scored output 430. The explanations and answers may be concurrently calculated by the XNN by the conditional network and the prediction network. The selection and ranking layer 428 may ensure that the answers and explanations are correctly matched, ranked and scored appropriately before being sent to the output 430.

The processing of the conditional network 410 and the prediction network 420 is contemplated to be in any order. Depending on the specific application of the XNN, it may be contemplated that some of the components of the conditional network 410 like components 412, 414 and 416 may be optional or replaced with a trivial implementation. Depending on the specific application of the XNN, it may further be contemplated that some of the components of the prediction network 420 such as components 422, 424 and 426 may be optional or replaced with a trivial implementation.

It may further be contemplated that in some circumstances, the selection and ranking layer 428 and the output 430 may be combined into one integrated component. For optimization purposes, the XNN may also be implemented with both the conditional network 410 and the prediction network 420 together with all their components merged into one network. This merged conditional and prediction network may also be merged with a combined selection and ranking layer 428 and the output 430. This optimization will still result in a logically equivalent XNN, which may be faster for feed forward processing.

The XNN can thus be implemented in a way that there is the input layer 402, and a combination of the conditional network 410 and the prediction network 420, including the conditional layer 412, aggregation layer 414, switch output layer 416, feature generation and transformation layer 422, fit layer 424, prediction layer 426, and ranking layer 428 leading to the output 430. This combination may apply to all embodiments and implementations of the XNN, including both software and hardware implementations. The transformation capabilities of XNNs in this regard are unique and unparalleled in other neural network implementations since the white-box nature of XNNs allows flexibility and extreme merging to be performed without affecting the logical behavior of the XNN, although this affects various attributes of a practical implementation, such as size/space usage, performance, resource usage, trainability, and overall throughput.

Figure 4:
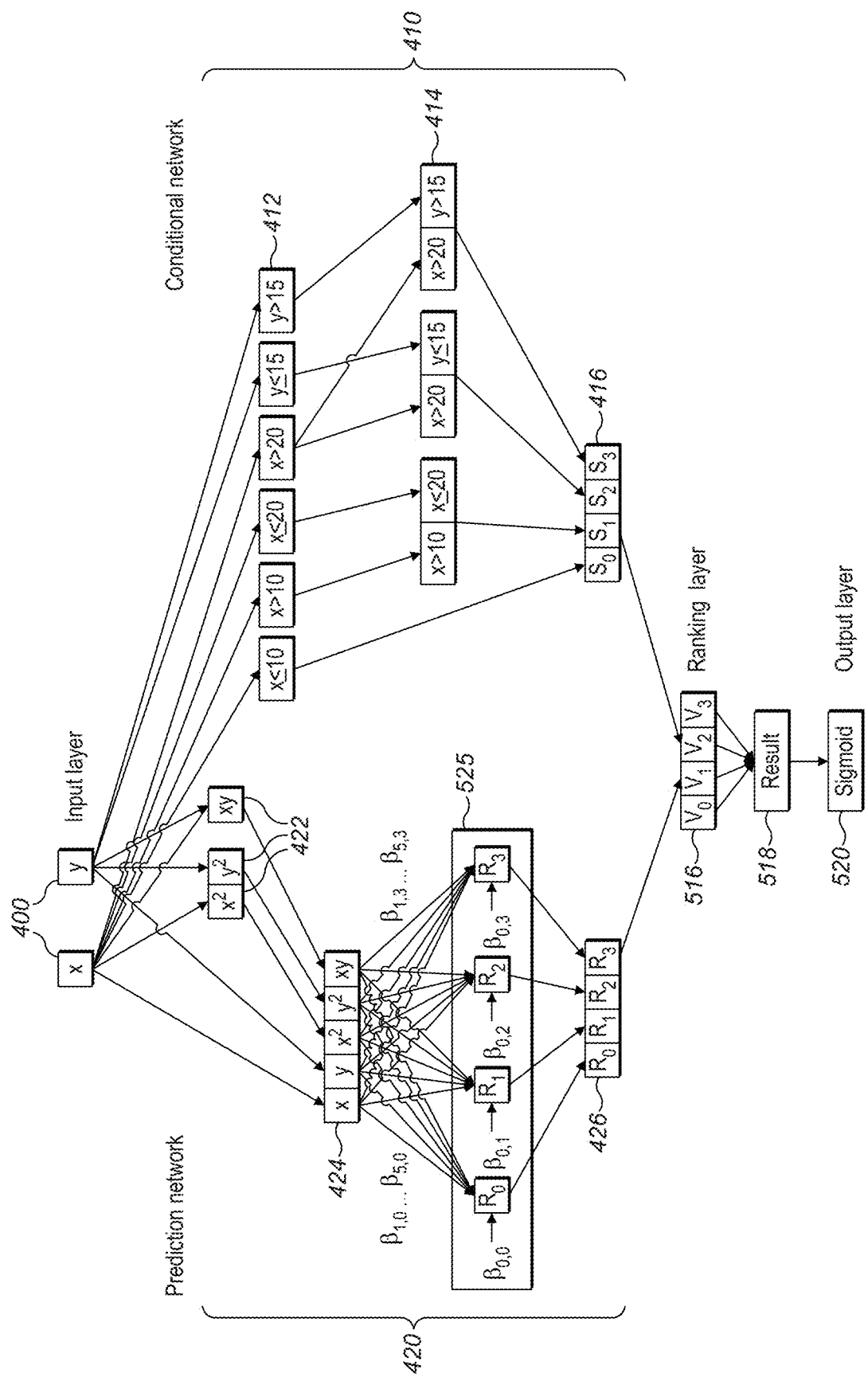
FIG. 4 is an exemplary XNN Architecture.

Referring now to FIG. 4, FIG. 4 may illustrate an exemplary XNN architecture which combines the results from the switch output layer and the value output layer. The example depicted in FIG. 4 is logically equivalent to the following exemplary ruleset:

$$f(x, y) =
\begin{cases}
\text{Sigmoid}(\beta_{0,0} + \beta_{1,0}x + \beta_{2,0}y + \beta_{3,0}x^2 + \beta_{4,0}y^2 + \beta_{5,0}xy), & x \leq 10 \\
\text{Sigmoid}(\beta_{0,1} + \beta_{1,1}x + \beta_{2,1}y + \beta_{3,1}x^2 + \beta_{4,1}y^2 + \beta_{5,1}xy), & x > 10 \land x \leq 20 \\
\text{Sigmoid}(\beta_{0,2} + \beta_{1,2}x + \beta_{2,2}y + \beta_{3,2}x^2 + \beta_{4,2}y^2 + \beta_{5,2}xy), & x > 20 \land y \leq 15 \\
\text{Sigmoid}(\beta_{0,3} + \beta_{1,3}x + \beta_{2,3}y + \beta_{3,3}x^2 + \beta_{4,3}y^2 + \beta_{5,3}xy), & x > 20 \land y > 15
\end{cases}$$

The ruleset may be found following the activation function in the output layer 520. The exemplary architecture in FIG. 4 may begin with an input 400. This input 400 may be processed within an appropriate input layer such as item 402 shown in FIG. 3. The input may then be used as inputs to the conditional network 410 and the prediction network 420. As illustrated in FIG. 4, the prediction network may contain a feature generation and transformation layer 422, a fit layer 424, and a value output layer 426. The value output layer 426 may provide equations which weigh different features of the inputs. Further, the input 400 may be used as input to the conditional network 410, as illustrated in FIG. 3. Again, the conditional layer 412 and aggregation layer 414 may produce conjunctive rules or other logical equivalents or partitions which are represented in the switch output layer 416.

The outputs of the value output layer 426 and the switch output layer 416 may be combined in an appropriate output layer, such as the output layer 430 shown in FIG. 3. Once the output layer 430 has been formed, a sigmoid or other activation function 520 may be applied to the result 518, depending on the application. It is further contemplated that a ranking layer 516 may also be applied to the result, either before and/or after the output combination, depending on the application.

XNNs may present an intuitive way to construct interpretable models, while still utilizing the power of ANNs and related methods such as deep learning. Once the model is trained through back-propagation or a similar method, the resulting neural network can be used to serve predictions and the inner structure of the XNN can be used to construct the rules.

Interpretable Neural Networks (INNs) provide an architecture which can automatically generate an explanation using existing deep learning techniques. INNs can utilize existing software infrastructures and hardware used for neural networks and may also remain fully compatible with backpropagation training techniques.

The architecture may include a feature transformer which converts the input to some hidden features, and a number of relevance estimators which transform the hidden features to feature weights. The feature weights are then combined with the transformed input in order to extract the attribution of each input transformed feature. The resulting feature attributions are then aggregated for the result. Feature attribution may be extracted at different levels. In the simplest form, attribution may be linked directly with the original inputs. In other cases, such as CNNs, feature attribution may also be computed for higher-level features which are typically found in kernels and filters. Additionally, INNs may split the model in various partitions, thus enabling a higher-level of flexibility and interpretability, by enabling a mixture of local or segmented explainability. In some cases, INNs are also capable of providing global explainability.

Figure 5:
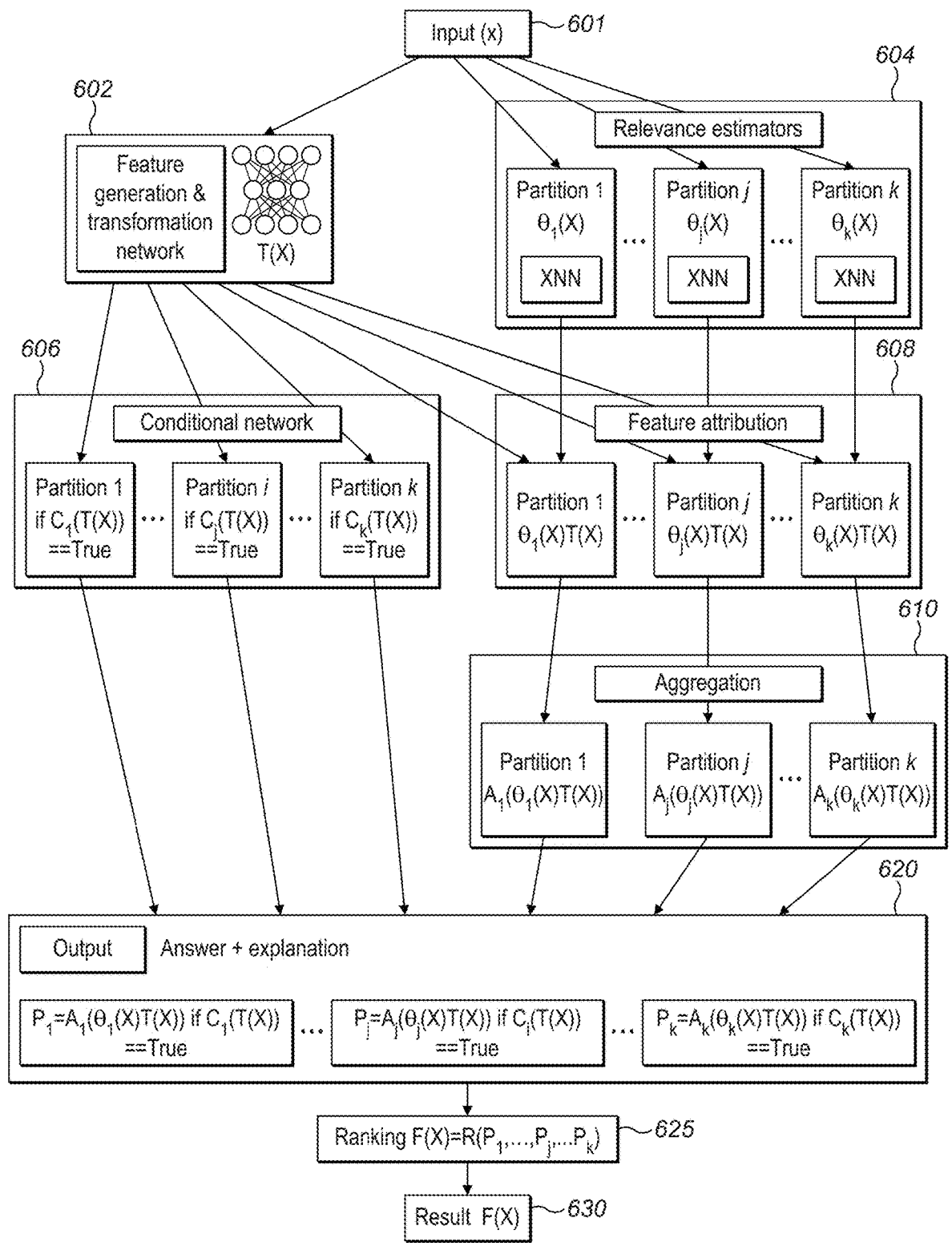
FIG. 5 is an exemplary Interpretable Neural Network (INN) Architecture.

Referring now to FIG. 5, FIG. 5 may illustrate an exemplary architecture for an interpretable neural network. An exemplary embodiment may apply architectural constraints to standard neural networks to model data. An exemplary embodiment may start with some input vector X 601. The input may connect to a feature generation and transformation network 602 and to k relevance estimators 604. The transformed features may be abstract or high-level features which could have been computed using a deep neural network such as a CNN, a non-linear mathematical function such as polynomial expansion, Fourier transforms, continuous data bucketization, causal operators, or some other form of generated features, which may be discrete or continuous. It is further contemplated, that the feature and transformation network may be a pipeline of transformations, including but not limited to polynomial expansions, rotations, dimensional and dimensionless scaling, Fourier transforms, Walsh functions, state-space and phase-space transforms, Haar and non-Haar wavelets, generalized L2 functions, fractal-based transforms, Hadamard transforms, Type 1 and Type 2 fuzzy logic, knowledge graph networks, categorical encoding, topological transforms of Kolmogorov/Frechet/Hausdorff/ Tychonoff spaces, difference analysis and normalization/ standardization of data. The relevance estimator 604 may calculate the coefficient, at least in a local manner, of each transformed feature.

In mathematical terms, the transformation network may be denoted as a function $T(X)$. Similarly, $\theta_j(X)$ represents the relevance function of the $j^{th}$ partition. If $X \rightarrow T(X)$ returns a vector with z transformed dimensions, then $X \rightarrow \theta_j(X)$ also returns a vector with z coefficients, or relevance weights. It is assumed that $|T(X)|=|\theta_j(X)|=z$.

INNs may be flexible enough to allow modelling of complexity through various options and configurations. The functions $X \rightarrow T(X)$ and $X \rightarrow \theta_j(X)$ may be a deep neural network which make it possible to model complex abstract features. The network may also be an XNN, to have a white-box estimator. It may be noted that the combination of $T(X)$ and $\theta_j(X)$ may represent various embodiments of explainable models which are possible to implement with an INN architecture.

The neural network may include a conditional network 606. The conditional network 606 may evaluate rules in the form of IF-conditions to activate one or more partitions. The output of $C_i(X)$ may binary. It may be noted that the partitions may be static or dynamic and may be discovered either through an external partitioning process, through a connected neural network, or through an internal process. It may also be noted that INNs may also function with only one partition, where for all values of X, $C_i(X)$ is always one. This is equivalent to having zero partitions. In this case, there is no need to apply a partitioning method to find suitable partitions.

The feature attribution 608 may calculate the attribution of each transformed feature, which is activated by the associated partition. The relevance attribution may multiply the result of the computed coefficient with the transformed feature. In mathematical terms, feature attribution 608 may compute $\theta_j(X)T(X)$ for the $j^{th}$ partition. The output of layer 608 may serve as the basis of explanation generation. The values from this layer may be used to generate feature attribution graphs, heatmaps, textual explanations or other form of explanations.

In the aggregation layer 610, the neural network aggregates the results for each partition (the predictive result for the activated partition). In mathematical terms, an exemplary aggregation function may be defined by $A_j(\theta_j(X)T(X))$. In an exemplary embodiment, the aggregation function may be a simple summation of the feature attributions. This becomes equivalent to a linear function, at least functioning in a local manner, such that the result $R_j = \theta_j(X)_1 T(X) + \ldots + \theta_j(X)_z T(X)$.

It may be contemplated that the model may have overlapping partitions. In this case, a ranking function may be applied to resolve the overlapping partitions. Let R define the rank function and $P_j$ the output of the $j^{th}$ partition, which brings the generalized model to:

$$f(x) = R((P_1, P_2, \ldots, P_j, \ldots P_k))$$

Finally, the switch layer 620 selects the activated partition. If more than one partition is activated, some ranking function 625 may need to be applied. The result is generated through the result layer 630.

In a practical embodiment, the INN model may have several optimizations in transformation functions T(x), in the estimators $\theta_j(x)$, in the aggregation function A, in the ranking function R or within some other component. INNs may provide a higher level of flexibility by enabling partitions to be customized according to the level of simplicity or complexity which is required.

Figure 14:
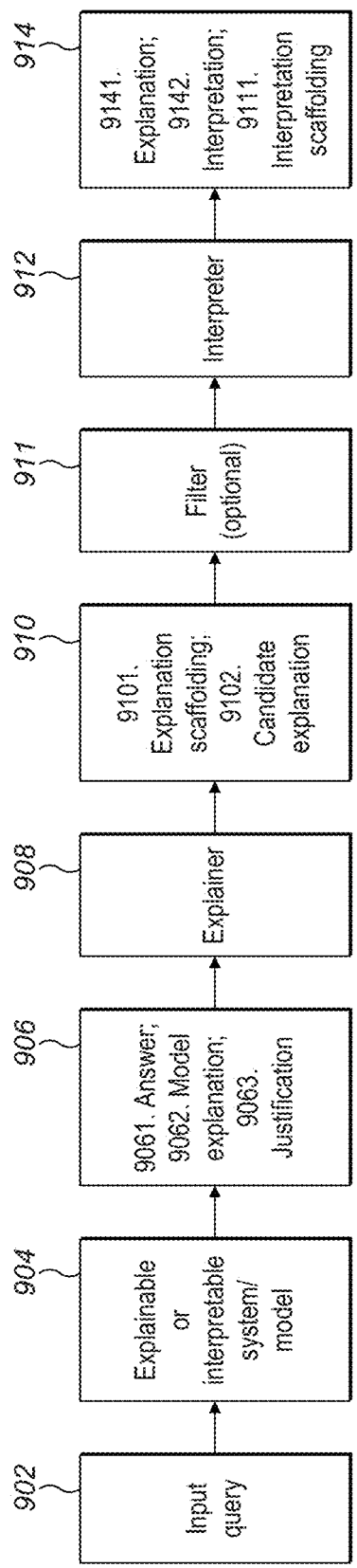
FIG. 14 is an exemplary schematic flowchart illustrating an exemplary explanation and interpretation process.

Referring now to the exemplary embodiment in FIG. 14, FIG. 14 may present an exemplary explanation generation pipeline. The pipeline may begin with an input query 902, representing a data sample, scenario or other question which is currently being examined, which may then be processed through three components: the Explainable or Interpretable System/Model 904, the Explainer 908, and the Interpreter 912. Each of the three main components may produce different outputs which may be input to the next component in the pipeline. It may be contemplated that the Input Query 902 is not limited to a specific data sample or scenario only and may relate to the entire model (global model explainability) or a modular explanation which deals with a specific component of the interpretable model.

The Explainable or Interpretable System/Model 904 may produce an Explainable or Interpretable Output 906, consisting of an Answer 9061, together with an optional Model Explanation 9062 of that Answer, and optionally a Justification 9063 of the Answer and/or its Model Explanation. The Justification 9063 of the Answer and/or its Model Explanation is an explanation of the model explanation (i.e., a meta-explanation) that gives additional information about the assumptions, processes and decisions taken by the Explainable or Interpretable System/Model 904 when outputting the Answer and/or Model Explanation. The Explainer 908 may produce an Explainer Output 910, consisting of an Explanation Scaffolding 9101, together with an optional Candidate Explanation 9102. In an exemplary embodiment, the Candidate Explanation is generated as a result of processing of the Explanation Scaffolding 9101 and can be used in the process of evaluation of the contents of the Explanation Scaffolding in some form of iterative process involving unsupervised or supervised learning and optimization. The Filter 911 is an optional component that primarily transforms and filters the Explanation Scaffolding 9101 and the Interpretation Scaffolding 9111, for example, after the Explainer 908 has produced output for the current step but before the Interpreter 912 starts.

The Interpreter 912 may produce an Explanation 9141, together with an optional Interpretation 9142 of that Explanation, using an Interpretation Scaffolding 9111.

The end result 914 of the explanation process, including either an Explanation and/or an Interpretation, may be provided to either a human user, another application, or another system component forming part of a larger embodiment, or some other automated system.

Note that FIG. 14 may be one exemplary pipeline and pipelines may be implemented in various alternative manners that may omit or combine one or more components, and/or execute them in different orders and sequences. For example, in an exemplary practical implementation embodiment, it may be contemplated that both the explainer 908 and interpreter 912 may be omitted together with their respective outputs 908 and 914.

In another exemplary embodiment, components 908 and 912 may be combined as a single component that produces a combination of the outputs 908 and 914.

In another envisaged embodiment, a simplified implementation of the Interpreter 914 simply takes the Candidate Explanation 9102 and outputs it as the Explanation 9141.

It may be further contemplated that in the case of a global (i.e., model level) explanation or a query-less application embodiment, even the input query 902 may be omitted without losing the logical equivalence to the exemplary pipeline in FIG. 14.

It may be contemplated that some combination of outputs in FIG. 14 may be combined or omitted altogether in a practical embodiment. For example, it may be envisaged that the Justification 9063 may be deemed optional in some applications, while the Interpretation 9142 may be left for a human interpreter or expert to create instead of an automated system. An interpretable machine learning system may be thoroughly understood and have its functionality and internal behavior (model interpretability), answers (output interpretability) and explanations interpreted and understood by an interpreter. The final explanations accompanying the answers might not require further post-hoc processing on their core structure, although additional cycles of processing to add syntactic and semantic information and to contextualize and personalize the explanation is acceptable, as illustrated in FIG. 14, where the explanation 9141 goes through different stages of transformation and enhancement before it gets to a final stage.

Explainable reinforcement learning (XRL) introduces an explainable reinforcement learning system by introducing explanations and the concept of an explanatory model to the actions and the environment where the XRL system is deployed. An action may refer to the input provided to the environment, calculated by applying a policy to the current state. This may be discrete or continuous. The set of all possible actions is called action space.

The RL/XRL agent may process the action selection and ranking, that is, some action a for the current state s, which leads to state s'. The reward is denoted by r. The RL agent may have a simulation of the environment used in the action selection process. The model may have additional connection points, depending on the structure of the model itself.

The first XRL modification introduces explanations x as part of the model/environment model; that is, the world model can give back a partial or full explanation about the state s' and the reward r, which we define as $x_e$. The second XRL modification is in the action space, which introduces an associate explanation, that is a, $x_a$ which denote action and explanation of the action respectively. A policy may refer to the mapping from the past experience to an action. The policy Π, in XRL becomes $\Pi_x$, which is now an explainable mapping, such that:

$$\Pi_x \approx s \rightarrow a, x_a$$

$$\Pi_x \approx s, x_s \rightarrow a, x_a$$

In terms of behavioral FSM each (state, action) pair can have a constant connection point prior to making the action after selecting the state, during the action, and after the action is made. For RL and XRL, another connection point is before, during and after the selection of the action under a policy π. This is applicable when action space and/or the state space is either discrete or continuous. Explanations as part of the XRL learning process may lead to better safety and control mechanisms as they may allow for a better understanding of the inner working of the system which may require adjustments, monitoring, and automatic/manual interventions. XRL agents may also be modelled using FSTs instead of FSMs.

An exemplary Explainable Transducer (XFST) may partially replace a trained XNN architecture. An Explainable Transducer Transformer (XTT) embodiment may replace black-box model components of a Transformer (Vaswani et al., 2017) with white-box model components, by using an explainable architecture x, where x∈{XAI, XNN, INN, XRL, XSN, XMN} or logically equivalent or similar architectures. The XFST thus represents a white-box machine learning architecture. An exemplary embodiment may provide an explainable version of a finite state transducer together with an explainable Transformer and may also include two main explainable Transformer variants, namely an explainable Transformer-Encoder and an explainable Transformer-Decoder.

An exemplary embodiment may provide an explainable Transformer-Encoder by introducing an explainable model in the sub-layers of the encoder layer of the Transformer.

An exemplary embodiment may also provide an explainable Transformer-Decoder by introducing an explainable model in the sub-layers of the decoder layer of the Transformer.

The explainable Transformer architectures may utilize the explanation framework, to generate explanations and filter such explanations to produce interpretability to the interpreter.

In an explainable Transformer architecture, the input varies according to the selected components for the induction of the explainable architecture x, where x∈{XAI, XNN, INN, XRL, XSN, XMN} or logically equivalent or similar architectures. In an exemplary embodiment, once the explainable model components have been selected via induction, the actual input for the Transformer can be fixed, and if necessary, padding used for inputs of a shorter length.

Figure 6:
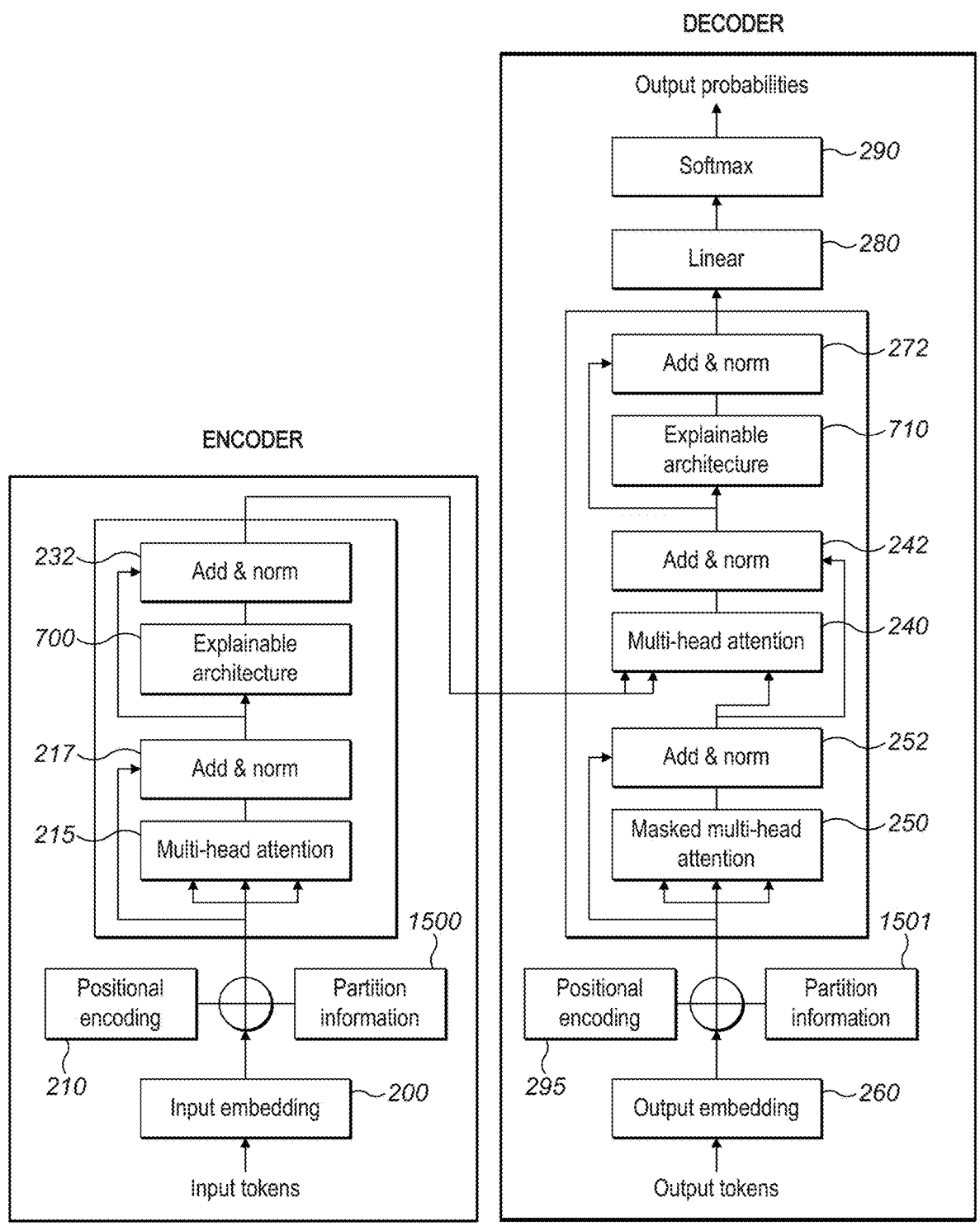
FIG. 6 is an exemplary embodiment of an Explainable Transformer Architecture using an explainable architecture in the encoder and decoder components with partition information.

An explainable architecture x, where x∈{XAI, XNN, INN, XRL, XSN, XMN} or logically equivalent or similar architectures, in an Explainable Transducer Transformer (XTT), may induce the Feed Forward Network component 230 of the encoder layer and the Feed Forward Network component 270 of the decoder layer, to create two explainable architectures 700 and 710, as depicted in FIG. 6.

The induced white-box model 700 constructs explanations and an explainable path trace from the output of the Add and Normalization component 217 to the output of the black-box Feed-Forward component 230. The induced white-box model 710 may construct explanations and an explainable path trace from the output of the Add and Normalization component 242 to the output of the black-box Feed Forward Network component 270.

An XTT utilizing explainable models that support Wide Learning models, such as XNNs, which are themselves a class of Wide Neural Networks (WNNs), may exhibit unique practical characteristics, especially when combined with the embedding nature of the Transformer architecture, which adds the generalization capabilities of Deep Learning to the more precise and universal learning capabilities of Wide Learning. Our use of hierarchical partitioning techniques or other logically equivalent methods that may be used for identifying suitable partitions, add significant representational and processing power to XTTs without negatively affecting their explainability or interpretability. XTT explanation model partitions may be initially created as part of the XTT by an external process that creates the initial XTT. Alternatively, XTT partitions may also be pre-trained or suitably initialized from a linked taxonomy or ontology that provides suitable partitioning information. Once created, the XTT explainable model can use gradient descent methods to fit or further refine the partitions if desired. The XTT partitions may either be locked by having their values set as static values that cannot be changed, or can be movable dynamically for each backward training pass using standard back-propagation and related techniques. The hierarchical partitions may model data at different levels of abstraction. Such abstraction may be required when generating explanations. In an exemplary embodiment, a ranking function may be used to determine how the XTT selects, merges, or splits its overlapping or non-overlapping partitions. It may be further contemplated that the hierarchical nature of the XTT partitions may be used to represent symbols and concepts at different levels of semantic and semiotic detail.

XTTs may allow its explainable partition structures and values to be changed using techniques such as Multiple Objective Optimisation (MOO), Genetic Algorithms (GA) and Monte Carlo Simulation Methods (MCSM), or via Casual Logic and Simulation techniques. XTT partitions may be hierarchical rather than just a flat partition. Flat partitions may be regarded as a sub-set of possible hierarchical partitions where there is just a single level. The utilization of a hierarchy allows for more expressive explanations to be generated that more adequately models the expected nature of a good explanation.

An explainable Transformer may be trained on a 3-tuple dataset <I, O, E>, where I may refer to the input, O may refer to the output and E may refer to the explanations between the input I and the output O. As shown in FIG. 6, the input may include the combination of the token embedding 200, the positional information of the input tokens 210 and optionally the partitioning information 1500 1501 or similar explanation generated data from an external explainable model, to train an explainable Transformer with explainable architectures x, where x∈{XAI, XNN, INN, XRL, XSN, XMN} or logically equivalent or similar architectures.

An explainable Transformer may be trained without using any explainable architectures in the encoder layer and the decoder layer and adding the partitioning information 1500 1501 or similar explanation generated data from an external explainable model to the input embedding of the encoder and optionally to the output embedding in the decoder.

Figure 7:
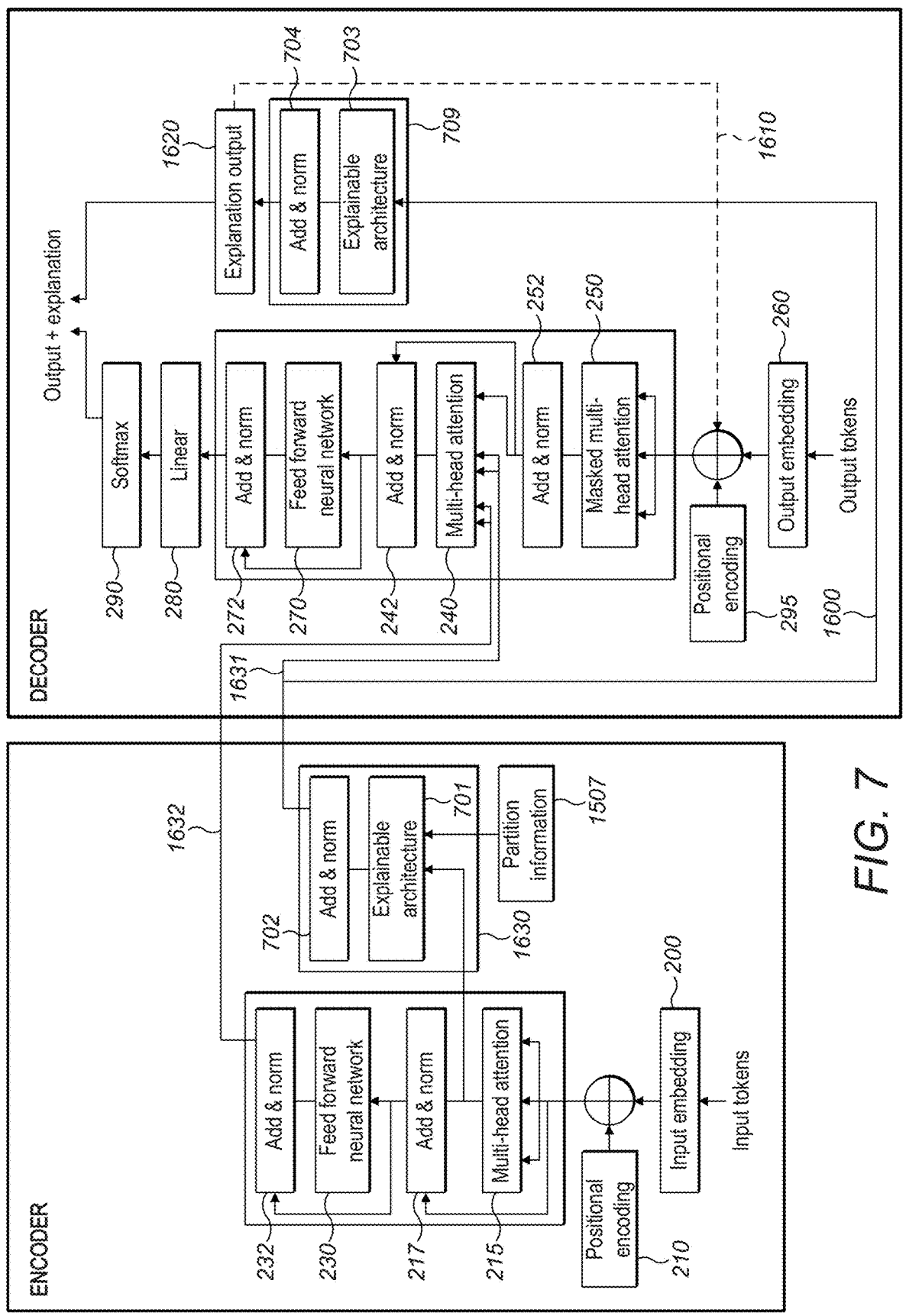
FIG. 7 is an exemplary embodiment of an Explainable Transformer Architecture with a parallel explainable encoder component and a parallel explainable decoder component.

An explainable Transformer may have an additional two layers in parallel to the encoder layer and the decoder layer as shown in FIG. 7. The two additional layers may be focused on constructing an explainable architecture from the input space, as shown in FIG. 7.

The explainable Transformer may include a parallel explainable encoder layer 1630 which takes two inputs: the output of the Multi-Head Attention component 215 or the output of the Add and Normalize component 217, and the partitioning or explainable information of the input tokens 1507.

The explainable Transformer may include a parallel explainable decoder layer 709 which takes the output 1600 of the parallel explainable encoder layer 1630. A parallel explainable encoder layer may include an explainable architecture component 701 and an Add and Normalization component 702. A parallel explainable decoder layer 709 may include an explainable architecture component 703 and an Add and Normalization component 704. In an exemplary embodiment the output of the parallel explainable encoder layer is used as input to the Multi-Head Attention layer 1631 in the decoder layer of the XTT as illustrated in FIG. 7. In another exemplary embodiment, the output of the parallel explainable encoder layer 1631 is merged with the output of the encoder layer 1632 prior being used as input for the Multi-Head Attention layer 240 in the decoder of the XTT. In another exemplary embodiment, the output of the parallel explainable encoder 1631 is solely used as input to the parallel explainable decoder. As shown in FIG. 7, XTT outputs the predicted output 290 and the relevant explanations 1620. The explanations 1620 may be utilized as a feedback loop 1610 to the decoder component.

The explanations and partition information may be predicted, using an XTT-Decoder architecture, using historic explanations and partition information. In an exemplary embodiment, an explainable model is represented by a 3-tuple vector <i, o, e>, where i refers to the input, o refers to the output and e refers to the generated explanations. The generated explanations e, where e=$\{e_1, e_2, \ldots, e_n\}$ are used as input to an XTT-Decoder to pre-train the model to predict the next explanation $e_{(i+1)}$, given the current explanation $e_i$ and a context window k for the historic explanations. The XTT-Decoder may then be fine-tuned on a separate set of explanations to classify or predict the value of the downstream task.

The difference or change in one or more explanations e, for the same component in an explainable model, may be recorded and optionally used as input to an XTT to predict the next difference or change in the explanations. In an exemplary embodiment, an XTT-Decoder is used to predict the next change in explanations. The XTT-Decoder is pre-trained on a set of explanation gradients $e_g$, where $e_g=\{g_1, g_2, \ldots g_m\}$, to predict the next gradient $g_{(i+1)}$, given the current explanation $g_i$ and a context window k for the historic explanation gradients. The XTT-Decoder may then be fine-tuned on a separate set of explanation gradients to classify or predict the value of the downstream task. Pre-training in XTTs may also utilize the embedded representations of input and output data to take into consideration elements of both similarity and contrast during training. In an exemplary embodiment, a multi-modal embedding of, for example, images and text captions, can be utilized to simultaneously minimize similarly associated images and text, yet ensuring that the contrast between unrelated images and text is maximized. Sparse embeddings within XTTs may also give additional performance improvements, especially in conjunction with sparse explainable models.

The explanations, gradients of the explanations, or partitioning information of an explainable architecture x may be used as the input 1507 to the parallel explainable encoder layer of an XTT, as shown in FIG. 7. In an exemplary embodiment, the input 1507 of the parallel explainable encoder layer 1630, processes the explanations of an explainable model that was trained on the same dataset, that will subsequently be used to train the XTT architecture. In a further exemplary embodiment, the input 1507 to the parallel explainable encoder layer refers to explanations generated on a similar dataset to the dataset that will be used to train the XTT.

The input of the explainable Transformer-Encoder may be identical to the input of the encoder layer of the Transformer (Vaswani et al., 2017). The explainable Transformer-Encoder may induce the black-box feed forward neural network 1900 using an explainable architecture x 2000, where x∈{XAI, XNN, INN, XRL, XSN, XMN} or logically equivalent or similar architectures, as shown in FIG. 8 (b).

In another exemplary embodiment, an XTT may have its explainable model trained on the entire encoder layer, having the input consisting of the token embeddings 1901 combined with the positional embedding 1902, or the output of the previous encoder layer. It is further contemplated that various different positional encoding methods may be used with XTTs, including but not limited to Direct-Sum, Lookup Table, and Product kernel type of positional encoding methods.

Figure 9A:
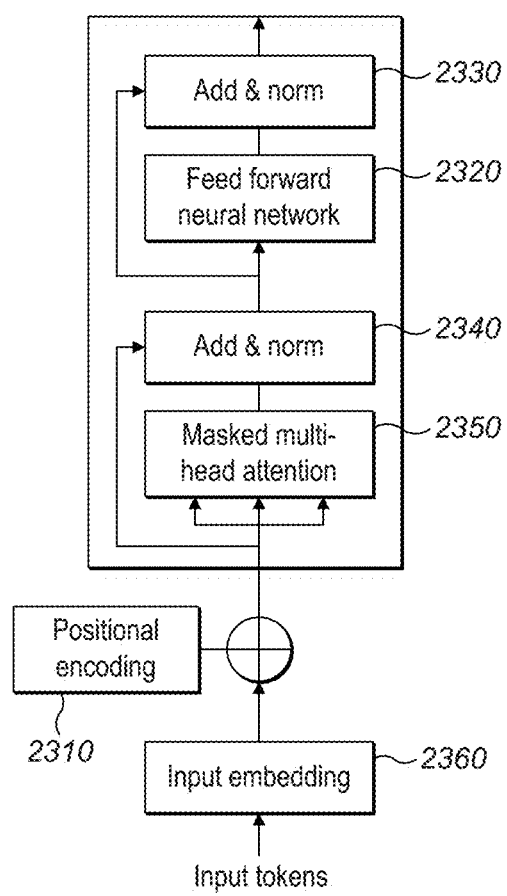
FIG. 9 (a) is an exemplary embodiment of a Transformer Decoder (Prior Art).
Figure 9B:
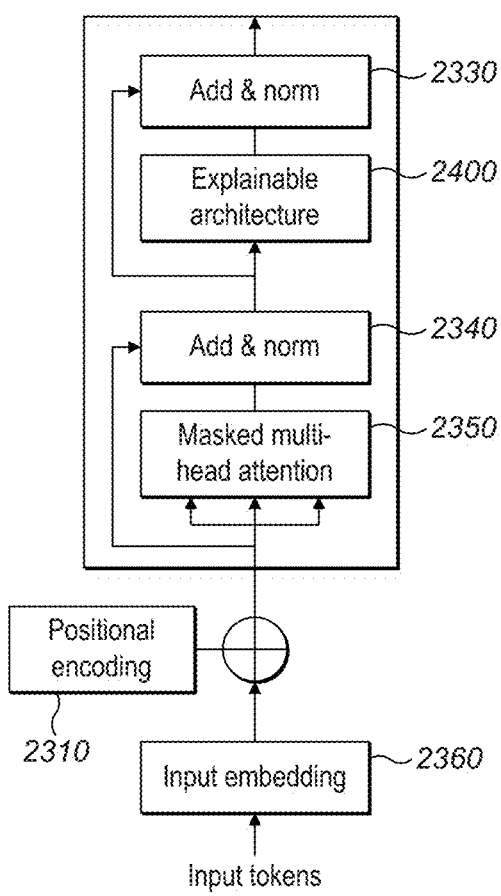

In an exemplary embodiment, the input and output of the explainable Transformer-Decoder may be identical to the decoder-based Transformer (Liu et al., 2018). The input of the explainable architecture 2400 in the explainable Transformer-Decoder may include the output of the Add & Normalization component 2340, as shown in FIG. 9 (b). The output of the explainable Transformer-Decoder may be the output of the black-box feed forward neural network component 2320, as shown in FIG. 9 (b), or the output of the Add and Normalization component 2330.

In an exemplary embodiment, one or more components in an XTT, apart from the explainable feed forward network itself, may be replaced by an explainable model. In a further exemplary embodiment, an explainable Auto-Encoder-Decoder (XAED) may be utilized to replace part or all of a Transformer-Encoder and/or Transformer-Decoder.

In an alternative embodiment, an explainable model in an explainable Transformer-Decoder may induce the entire decoder layer, having the input consisting of the token embeddings 2360 combined with the positional embedding 2310, or the output of the previous decoder layer.

The output of the explainable architectures XTT, XTT-Encoder and XTT-Decoder may include the explanation and interpretability generated from the explainable architectures x, where x∈{XAI, XNN, INN, XRL, XSN, XMN} or logically equivalent or similar architectures.

The explainable architectures in the XTT, XTT-Encoder and XTT-Decoder may use a training dataset without having a black box component as input. In that case, a new explainable model is trained.

XTTs may contain feature transformations of the training dataset. The XTT transform function may be a pipeline of transformations, including but not limited to polynomial expansions, rotational transformation, dimensional and dimensionless scaling, Fourier transforms, Walsh functions, state-space and phase-space transforms, Haar and non-Haar wavelets, generalized L2 functions, fractal-based transforms, Hadamard transforms, Type 1 and Type 2 fuzzy logic, knowledge graph networks, categorical encoding, topological transforms of Kolmogorov/Frechet/Hausdorff/Tychonoff spaces, difference analysis and normalization/standardization of data. The transform function pipeline may further contain transforms that analyze sequences of data that are ordered according to the value of one or more variables, including temporally ordered data sequences. The transformation function pipeline may further contain transformations obtained via gradient descent methods and other explainable architectures.

It is also contemplated that the explainable model data synthesis capabilities can be used to generate training dataset samples that are presented as training to the explainable architectures within the proposed explainable Transformer architectures XTT, XTT-Encoder and XTT-Decoder using a variety of techniques such as causal GAN based generation, genetic engineering, Monte Carlo simulation, Petri Nets, Reinforcement Learning techniques, simulation using the white-box model itself and its global model, and other methods that may be available.

Human knowledge injection (HKI) or system knowledge injection is another type of input to the XTT, XTT-Encoder and/or XTT-Decoder architecture. The coefficients of an explainable architecture within the XTT, XTT-Encoder and/ or XTT-Decoder architecture may be modified to enforce specific rules to lead to a more effective collaboration between human users and the AI system.

It is further contemplated that human knowledge injection (HKI) may be used to modify and extend the range of synthetic data even further. Synthesis and HKI methods may aid XTT in overcoming the data distribution shift problem and make it generalize better to a wider range of possible inputs in its input and training space, including Out of Distribution (OOD) data.

The explainable models within XTTs enable practical implementations of zero-shot learning or few-shot learning solutions. Few-shot learning may take advantage of the hierarchical partitions and local models to adapt quicker when faced with sparse data availability conditions. Zero-shot learning may be achieved in a practical manner via incorporation of rules, and thus modification of the partition structure within the explainable model, via HKI. Such usage of HKI may enable XTTs to be directly bootstrapped directly from appropriate rules or set of rules without any training data whatsoever. It is further contemplated that the use of inductive, deductive, and abductive logic may be utilized to enhance the adaptability of XTTs. It is further contemplated that the use of causal logic may be utilized to enhance the adaptability of XTTs while ensuring that there is an element of plausibility and model-based checking that may help prevent underfitting and/or overfitting problems.

Explainability may be achieved through the extraction of the partition information of the explainable model components in an XTT, and its variants XTT-Encoder and XTT-Decoder, and the construction of the feature attributions for the features of the training dataset.

The coefficients c of a local model may be used as feature attribution to the feature input space. The partition information and feature attributions are an output of the explainable architecture components within the XTT, XTT-Transducer, XTT-Encoder and/or XTT-Decoder architecture.

The feature attributions c may be coefficients to the input space and illustrating the importance of each input feature. Hence, the feature attributions are part of the explainability by transforming the input space into an explainable input space.

When an XTT, XTT-Encoder and/or XTT-Decoder architecture is connected to other machine learning systems, the input space may represent some form of abstract features or concepts. For example, the input to an XTT, XTT-Encoder and/or XTT-Decoder architecture may be the output from a CNN network. In an exemplary embodiment where the explainability was constructed in the encoder and the decoder part of the Transformer architecture, the outputs are the feature attributions to the input space features and the feature attributions to the latent space. XTTs enable the complete removal of unexplainable latent spaces to the extent that the input features themselves are explainable. As another option, an XTT, XTT-Encoder and/or XTT-Decoder architecture may be adapted to apply to its output at least one of: a Fourier transform, integer transform, real number transform, complex number transform, quaternion transform, octonion transform, Walsh function, state-space transform, phase-space transform, Haar and non-Haar wavelets, generalized L2 function, fractal-based transform, Hadamard transform, fuzzy logic, knowledge graph networks, categorical encoding, difference analysis, normalization, standardization, multi-dimensional Bezier curves, recurrence relations, and causal operators.

In another exemplary embodiment, an XTT, XTT-Encoder and/or XTT-Decoder architecture may be required to apply a suitable activation function and/or suitable transformation on the predicted output. Typical activation functions may include the sigmoid or SoftMax functions or suitable equivalent. Typical transformations may involve transformation of the prediction output using some form of structure such as (i.) hierarchical tree or network, (ii.) causal diagrams, (iii.) directed and undirected graphs, hypergraphs, or simplicial complexes, (iv.) multimedia structures, (v.) sets of hyperlinked graphs, or suitable structures.

Figure 15:
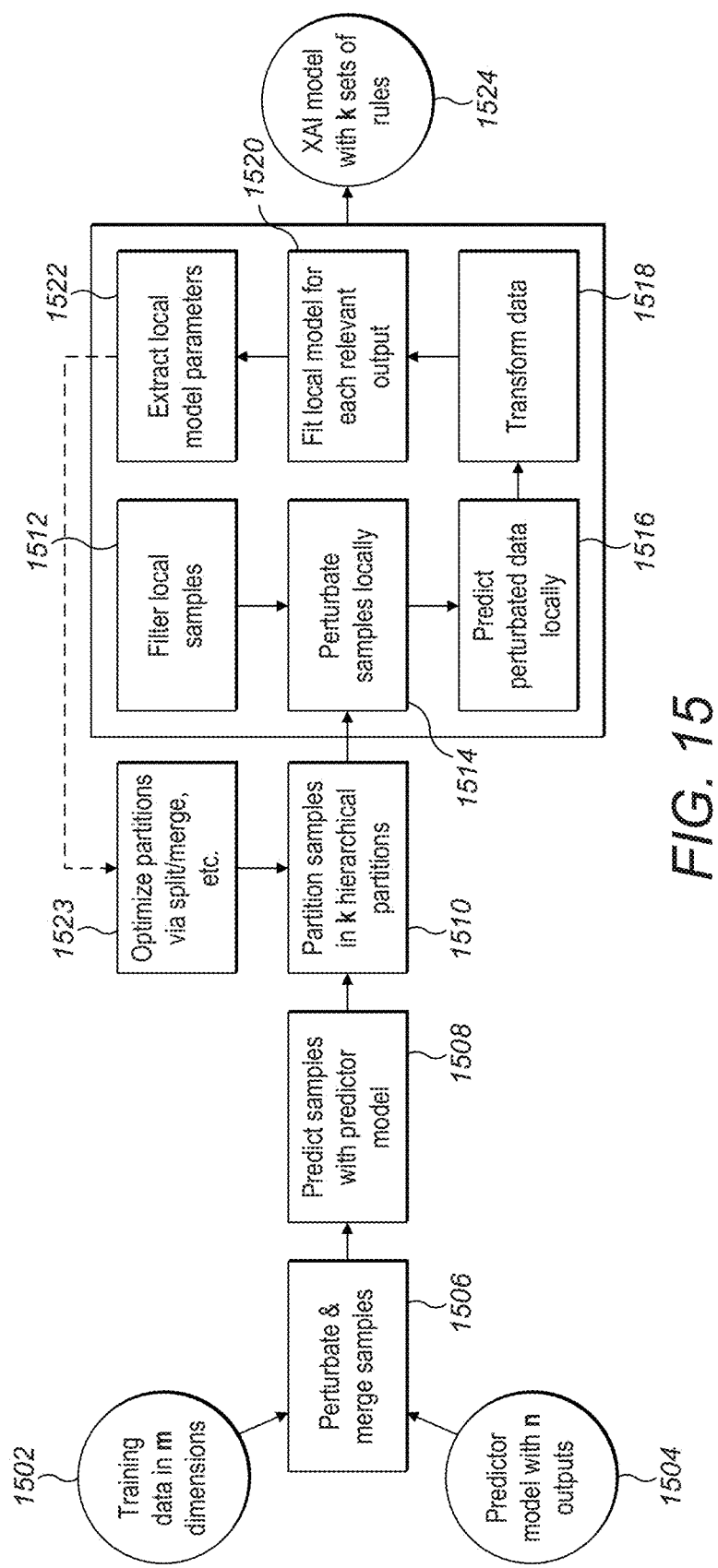
FIG. 15 is an exemplary schematic flowchart illustrating an exemplary induction method.

In an alternative exemplary embodiment, the partitions may be constructed externally with an induction process such as the exemplary model induction method shown in FIG. 15. In such an exemplary embodiment, the output would be the partition information of such systems accompanied by the feature attribution of the XNN architecture or the INN architecture.

In an exemplary XAI model induction method, the modeling system may input the data into the black-box system and may record the output corresponding to each input. In another embodiment the modeling system may use a trivial predictor model, like a simple mapping function, that returns the label or response for all or part of the input data set, which is equivalent to running the induction method directly on training data. In another embodiment the modeling system may use a suitable automatic predictor building method to create the predictor model directly from the training data. The addition of the black-box or predictor model as input to the induction method may help in reducing or eliminating errors and/or noise from the original input dataset.

Data points may be initially obtained from all or part of the training data, optionally combined with synthetically generated data. Synthetically generated data may be generated via an external process, such as a simulation system, world model, etc. The input data may also be the empty set, in which case, the induction method will work using the perturbated data obtained from the input predictor model. An optional data quality assurance function may also be applied to a subset of the input data points and/or the input data as a whole prior to execution of the induction method. The induction method builds a global model by dynamically creating perturbated sample data points that are then injected in the input predictor model, which may be a black-box, and the output result is then noted and combined with all other available data points from training and/or synthetic data. It may be contemplated that perturbated data may be utilized on its own without using the original training data. An exemplary embodiment of a perturbation method may utilize a combination of random noise addition methods, rotation perturbation, projection perturbation, k-anonymization, Generative Adversarial Networks (GANs) or any other suitable perturbation method. The resulting combined data points may form the input to the partitioning function of the induction method. Data points from the predictor model may be continuous, discrete, or categorical values. Predictor models that output a classification result may have such classification applier either on (i.) discretized output, via some appropriate transformation function that assigns the appropriate class label, or (ii.) probabilistic output that can be used directly or via some appropriate transformation function.

A next exemplary step may identify a hierarchy of "partitions". Each partition may cover a set or cluster of data points retrieved from the combined data available to the induction method. Each partition may define zero, one or more rules and may optionally contain child partitions with their respective associated rules. The extracted partitions may incorporate overlapping and non-overlapping partitions. In the case of overlapping partitions, some priority function may be used to determine which partition to activate. In an alternative embodiment, if more than one partition is activated, some aggregate function may be used to combine or split results from the multiple activated partitions. Various methods may be implemented for finding the rules or clusters of data points pertaining to a rule, as long as each partition has sufficient data to fit a linear model and is not too complex such that a linear model may not perform well. Non-linear transformations including but not limited to polynomial expansion, rotations, dimensional and dimensionless scaling, state-space and phase-space transforms, integer/real/complex/quaternion/octonion transforms, Fourier transforms, Walsh functions, continuous data bucketization, Haar and non-Haar wavelets, generalized L2 functions, fractal-based transforms, Hadamard transforms, Type 1 and Type 2 fuzzy logic, knowledge graph networks, categorical encoding, topological transforms of Kolmogorov/Frechet/Hausdorff/Tychonoff spaces, difference analysis and normalization/standardization of data and conditional features may be applied to an individual partition, prior to the linear fit, to enhance model performance.

A partition may be a cluster that groups data points optionally according to some rule and/or distance similarity function. Each partition may represent a concept, or a distinctive category of data. Partitions that are represented by exactly one rule have a linear model which outputs the value of the prediction or classification. Since the model may be modelled linearly, the coefficients of the linear model can be used to score the features by their importance. The underlying features may represent a combination of linear and non-linear fits as the induction method handles both linear and non-linear data and/or linear and non-linear predictor models.

An exemplary embodiment may be illustrated in mathematical terms. Referring to the exemplary embodiment in FIG. 15, FIG. 15 may illustrate an exemplary model induction method. In an exemplary embodiment, X may denote the input dataset 1502, and Predict(x) may denote the predictor model function with n outputs 1504. X may be a matrix with m dimensions. Each dimension (m) may represent the input features of X and each output may represent the number of classes (n). The input data set may be a combination of training data and synthetic generated data. Additionally, in an exemplary embodiment the samples may be perturbated 1506 using a function such as Perturbate(X), which may be any perturbation function to generate sample perturbed data, given some input training or test data X, where X may be a subset of the input data, some neighborhood of the input data, some suitable embedding of input/output/explanation data, or may even be trivially the empty set, in which case the perturbation function needs to query the predictor model using some form of a random or non-random pattern. $X_p$ may denote the combination of the perturbated and original input dataset, Y may denote the output from the predictor model function 1508, such that $X_p = X \cup \text{Perturbate}(X)$, and $Y = \text{Predict}(X_p)$.

The hierarchy of partitions may be represented by P through an external function Partition 1510, such that $\text{Partition}(X_p, Y) = P$, where $P = \{P_1, \ldots, P_i, \ldots, P_k\}$ and k is equal to the number of rules in the case where each partition is defined by exactly one rule. The partitioning function may be a clustering algorithm such as k-means, Bayesian, connectivity based, centroid based, distribution based, grid based, density based, fuzzy logic based, entropy, a mutual information (MI) based method, or any other logically suitable methods. The partition function may also include an ensemble method which would result in a number of overlapping or non-overlapping partitions. In the case of overlapping partitions, an aggregation function may be used to combine or split the result from multiple partitions. The partition function may alternatively include association-based algorithms, causality based partitioning or other logically suitable partitioning implementations.

$R_i(x)$ may represent each rule in the $i^{th}$ partition. Each Rule ($R_i(x)$) may include multiple conditions, such that $R_i(x) = C_1 \wedge C_2 \wedge \ldots \wedge C_j \wedge \ldots \wedge C_q$, where q may represent the number of conditions in the rule, and $C_j$ may be the $j^{th}$ condition with respect to the input matrix x of the $i^{th}$ rule (i.e. $i^{th}$ partition). The perturbated input matrix $X_p$ may be divided into k matrices, where k is equal to the number of rules, such that $X_L$ denotes the locally filtered matrix defined by $\{x | x \in X_p \wedge R_i(x) = \text{True}\}$, such that the union of $\{X_{L1}, X_{L2}, \ldots, X_{Li}, \ldots X_{Lk}\} = X_p$ when partitions are non-overlapping. When partitions overlap on each other the union of $\{X_{L1}, X_{L2}, \ldots, X_{Li}, \ldots X_{Lk}\} \neq X_p$. When partitions overlap each other, a ranking function needs to be applied to choose the most relevant rule or be used in some form of probabilistic weighted combination method. In an alternative embodiment, if more than one partition is activated, some aggregate function is used to combine the results from multiple partitions.

A next exemplary step may involve fitting a local model to each partition, defined by Ri. $X_L$ may represent the inputs that are found in both $X_p$ and $R_i(x)$. In other words, $X_L$ may be the inputs or feature data that apply to the $i^{th}$ rule. The local samples may be filtered 1512. $X_L$ may then be perturbated 1514, and $X_{LP}$ may denote the combination of $X_L$ and a locally perturbated dataset of Perturbate($X_L$). Thus, $Y_L = \text{Predict}(X_{LP})$ which predicts perturbated data locally 1516. Finally, $X_T$ may be calculated by finding a transformation of $X_{LP}$ 1518, such that $X_T = \text{Transform}(X_{LP})$. The transform function may be a pipeline of transformations, including but not limited to polynomial expansions, rotations, dimensional and dimensionless scaling, Fourier transforms, integer/real/complex/quaternion/octonion transforms, Walsh functions, state-space and phase-space transforms, Haar and non-Haar wavelets, generalized L2 functions, fractal-based transforms, Hadamard transforms, Type 1 and Type 2 fuzzy logic, knowledge graph networks, categorical encoding, difference analysis and normalization/standardization of data. The transform function pipeline may further contain transforms that analyze sequences of data that are ordered according to the value of one or more variables, including temporally ordered data sequences. $X_T$ may generate new features, such that z represents the total number of features by the transformation function.

For each j in the range of 1 through n (i.e., the number of outputs), the system may calculate the local model in a linear manner 1520. $Y_L$ is a matrix including n vectors, one for each output, such that $Y_{Lj}$ represents the $j^{th}$ output vector. The linear model can be defined by $Y_{ij} = \text{Fit}(X_T, Y_{Lj})$ where Fit is a function that fits a linear model, such as linear regression, logistic regression, kernel method, etc. The linear model defines a set of coefficients $\{\beta_0 \ldots \beta_z\}$ 1522 such that $Y_{ij} = \beta_0 + \beta_1 x_1 + \ldots + \beta_i x_i + \ldots + \beta_z x_z$. The linear model or a combination of linear models may provide the XAI model with the rules 1524. In an alternative embodiment, the fit of the local models may be achieved in one atomic Fit function using parallel programming or gradient-descent techniques, or a suitable equivalent. Note that $x_i$ could be a transformed feature such as polynomial (such as $x^2$), intersection (such as xy), conditional features (such as x>10 and y<2), Fourier transforms, etc. Note that $\beta_i$ could be either positive or negative, corresponding to positive or negative contributions to the model for the relevant transformed feature. The positive or negative contributions may also be commonly referred to as excitatory and inhibitory influences. Compression or regularization techniques may also be applied to simplify the fit of the local models, which indirectly also simplifies the resulting explanations. Finally, rules may be constructed from the various combinations of $Y_{ij}$.

$$\text{Rule}_1(x) = \{Y_{1,1}, Y_{1,2}, \ldots, Y_{1,n}\} \text{ if } R_1(x)$$

$$\text{Rule}_2(x) = \{Y_{2,1}, Y_{2,2}, \ldots, Y_{2,n}\} \text{ if } R_2(x)$$

$$\text{Rule}_i(x) = \{Y_{i,1}, Y_{i,2}, \ldots, Y_{i,n}\} \text{ if } R_i(x)$$

$$\text{Rule}_k(x) = \{Y_{k,1}, Y_{k,2}, \ldots, Y_{k,n}\} \text{ if } R_k(x)$$

In an exemplary XNN architecture, as shown in FIG. 4, with $n_p$ partitions, may include n local models 525, a value output layer $\text{value}_{layer} = \{r_1, r_2, \ldots, r_n\}$ 426, a switch output layer $\text{switch}_{layer} = \{s_1, s_2, \ldots, s_n\}$ 416, and a conjunctive layer $\text{conjunctive}_{layer} = \{v_1, v_2, \ldots, v_n\}$ 516 that combines $\text{value}_{layer}$ 426 and $\text{switch}_{layer}$ 416. An activation function 520, such as Sigmoid, may be used on the output value to produce the final output of an exemplary XNN architecture. It is contemplated that a sparse XNN/INN may be utilized to implement parts of the partition structure in an energy efficient manner.

Explainable model hierarchical partitions may also be subject to one or more iterative optimization steps 1523 that may optionally involve merging and splitting of the hierarchical partitions using some suitable aggregation, splitting, or optimization method. A suitable optimization method may seek to find all paths connected topological spaces within the computational data space of the predictor while giving an optimal gauge fixing that minimizes the overall number of partitions.

An XTT transducer may be defined as a 6-tuple $<K, \Sigma, \Gamma, s, F, \Delta>$ to replace multiple components of an XNN architecture, where K refers to the finite set of states (including explanation model states), $\Sigma$ refers to the alphabet of the input symbols (including explanation symbols), $\Gamma$ refers to the alphabet of the output symbols (including explanation symbols), s refers to the start state, such that $s \in K$, $\gamma$ refers to the output function, such that $\gamma:K \rightarrow \Gamma$ *, and $\Delta$ refers to the transition function (including explanation related transitions, which form the main component of the justification associated with the explanation). In an exemplary embodiment, the input $\Sigma$ may be set to the $\text{value}_{layer}$ 426 and $\text{switch}_{layer}$ 416, such that $\Sigma = \{\text{value}_{layer}, \text{switch}_{layer}\}$. The output $\Gamma$ may be set to the conjunctive layer $\text{conjunctive}_{layer}$, such that $\Gamma = \{\text{conjunctive}_{layer}\}$. The transition relation $\Delta$ of the explainable finite state transducer $XTT_t$ translates the $\text{value}_{layer}$ and $\text{switch}_{layer}$ values in the $\text{conjunctive}_{layer}$ values. It may be further contemplated that the output vocabulary may be set to the output of the activation function 520, instead of the conjunctive layer 516.

An XTT may be constructed on a trained Conditional Network layer 410. In an exemplary embodiment the input $\Sigma$ is set to the partition boundaries 412 of an XNN architecture. The output $\Gamma$ is set to the Switch Output layer 416. The transition relation $\Delta$ includes the translation between the Conditional Layer 412, the Aggregation Layer 414 in relation to the Switch Output Layer 416.

Figure 12:
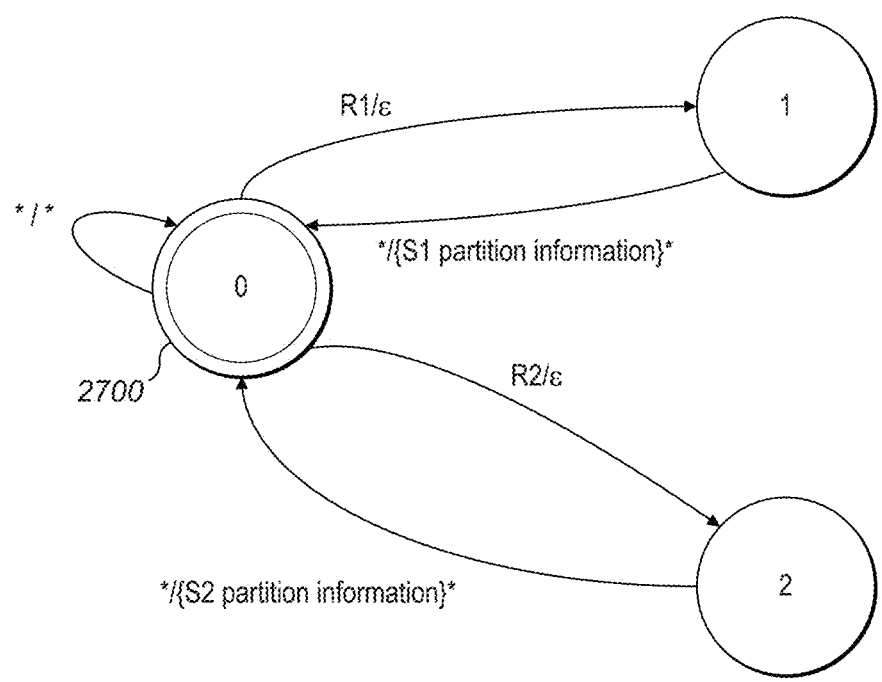
FIG. 12 is an exemplary embodiment of an Explainable Finite State Transducer.

In an exemplary embodiment, an XSFT-style XTT accepts the index of the local model and the respective prediction value, and outputs the respective partition information of the local model utilized in the XNN architecture with the prediction value. The tape is inserted in the start state s 2700, as shown in FIG. 12. The tape includes the index of the value layer elements, followed by the respective prediction, for each observation. As shown in FIG. 12, the exemplary XTT includes two partitions. A matching of the respective index of any partition would enter the state of such partition and returns the partitioning information of such partition, where the partitioning information replaces the index of the value layer.

In another exemplary embodiment, an explainable finite state transducer accepts the index of the local model and the relevant prediction and/or query input value, and outputs the prediction value and the explanation multiplexed together in some appropriate output encoding.

An XTT may induce multiple connected components, such as the black-box feed forward neural network 230 270 and the subsequent Add and Normalization component 232 272 with an explainable architecture x, where $x \in \{XAI, XNN, INN, XRL, XSN, XMN\}$ or logically equivalent or similar architectures.

An XTT may induce the Encoder-Decoder Multi-Head Attention component 240, the Add and Normalization component 242, the Feed Forward Neural Network component 270 and/or the Add and Normalization component 272, of the decoder layer, with an explainable architecture x, where $x \in \{XAI, XNN, INN, XRL, XSN, XMN\}$ or logically equivalent or similar architectures, to create a white-box model. Such explainable models may be intentionally sparse and/or compressed to maintain bisimulation equivalence between the original components and their explainable model replacements.

An XTT architecture that induces the Transformer architecture may be referred to as inline XTT architecture, as shown in FIG. 6. An XTT architecture that induces the Transformer architecture and uses an additional parallel explainable encoder layer and parallel decoder layer may be referred to as parallel XTT architecture, as shown in FIG. 7.

An explainable Transformer may be trained on a 3-tuple dataset $<I, O, E>$, where I may refer to the input, O may refer to the output and E may refer to the explanations between the input I and the output O. As shown in FIG. 6, the input may include the combination of the token embedding 200, the token positional information 210 and optionally the partitioning information 1500 1501 or similar explanation generated data from an external explainable model, to train the XTT with an explainable model, as shown in FIG. 6. It is further contemplated that a grey-box XTT implementation may be achieved by using black-box Feed Forward components instead, as shown in Vaswani et al. (2017).

A Transformer may be trained only on the encoder part as shown in FIG. 8 (a), by using self-supervised learning techniques such as Masked Language Modelling (Devlin et al., 2018). An explainable Transformer-Encoder may induce the black-box feed forward neural network component 1900 of an encoder layer by an explainable architecture x 2000, where $x \in \{XAI, XNN, INN, XRL, XSN, XMN\}$ or logically equivalent or similar architectures, as shown in FIG. 8 (b). The architecture of an XTT-Encoder may consist of the input embedding 1901, the positional encoding 1902, the Multi-Head Attention component 1920, the Add and Normalization component 1930, the explainable architecture 2000 and the Add and Normalization component 1910.

An explainable Transformer-Encoder may induce the feed forward neural network component 1900 and the Add & Normalization layer 1910 with an explainable architecture x, where $x \in \{XAI, XNN, INN, XRL, XSN, XMN\}$ or logically equivalent or similar architectures.

An explainable Transformer-Encoder may induce the Multi-Head attention 1920, the Add and Normalization component 1930, the Feed Forward Neural Network component 1900 and/or the Add and Normalization component 1910 with an explainable architecture x, where x∈{XAI, XNN, INN, XRL, XSN, XMN} or logically equivalent or similar architectures.

A transformer may be trained only on the decoder part of a Transformer architecture, as illustrated on FIG. 9 (a) (Radford et al., 2018). An XTT may induce the feed forward neural network component 2320 of a decoder layer by an explainable architecture x 2400, where x∈{XAI, XNN, INN, XRL, XSN, XMN} or logically equivalent or similar architectures, as shown in FIG. 9 (b).

An explainable Transformer-Decoder may induce multiple components, such as the combination of the feed forward neural network component 2320 and the Add and Normalization component 2330, with an explainable architecture x, where x∈{XAI, XNN, INN, XRL, XSN, XMN} or logically equivalent or similar architectures.

An explainable Transformer-Decoder may induce the Multi-Head attention 2350, the Add and Normalization component 2340, the Feed Forward Neural Network component 2320 and/or the Add and Normalization component 2330 with an explainable architecture x, where x∈{XAI, XNN, INN, XRL, XSN, XMN} or logically equivalent or similar architectures.

The explainable Transformer-based architectures XTT, XTT-Encoder, and XTT-Decoder may generate multiple levels of explanations, which may include partitioning information, internal coefficients of the model and feature attributions of the input space, and such explanations may be an output to the interpreter. The explanations may be in the form of textual format or numeric format which may represent the importance of the input dimensions, or some form of appropriate transform applied on the input and appropriate interactions, where such transforms may output explanations in a variety of output formats including multimedia images, videos, 3D data, multi-dimensional data, and other suitable formats. Explanations may also contain the results of applying interventional and/or counterfactual processes, for example, by utilizing bias control swaps to determine the bias in a given set of input dimensions. Any such bias detected directly via the XTT may not even need to use a dataset for such bias testing. It is further contemplated that such results may be generalized via the application of suitable identification, assessment, recommendation, ranking and resolution functions within an Identify-Assess-Recommend-Resolve (IAR) framework.

XTTs can process both structured and unstructured data, including hierarchically structured data in form of trees, graphs, hypergraphs, and simplicial complexes. Related prior work on the Tree Transformer (Wang et al., 2019) constraints the attention heads, using a Constituent Attention component, to introduce tree-based structures of the input tokens. Unlike our proposed method, the Tree Transformer utilizes black-box feed forward neural network components and may thus be classified as a gray-box method. An activation path trace would not be possible to implement using Tree Transformer, unlike in XTTs. Our proposed method introduces white-box components in the Transformer based architecture to generate global and local explanations. The hierarchically structured partition system in the XTT explainable models lends itself naturally to the processing of complex structured data, which is only partially achieved in Tree Transformer using constituent priors. The XTT attention model is capable of expressing the equivalent of a hierarchy of such priors, at different levels of detail and scale, which is impossible to achieve with Tree Transformer and related variants. This may be possible via the linear or non-linear equations which are available in a rule-based model (XAI Model) or logically equivalent methods such as an XNN, INN, XSN, XMN and other suitably equivalent implementation methods. In the linear or non-linear equation, lists of features may be extracted with their corresponding coefficients which may represent the feature importance for that given model or set of rules. The coefficient matrix C in an explainable model may be analyzed directly to extract the most important feature per rule/partition in the model defined by F(X).

In an alternative embodiment, the matrix of coefficients may be aggregated such that the vector I represents the aggregated importance of each feature from all j rules such that $I=\{\theta_0, \ldots, \theta_i, \ldots \theta_{k-1}\}$ where $\theta_i = \Sigma_{p=0}^{j-1} C_{p,i}$, such that $C_{p,i}$ identifies the ith coefficient of the pth partition/rule. Finally, let $Is=\{F0, \ldots, Fs, \ldots, Fk-1\}$ represent a sorted vector with all elements of I where s represents the sort index, such that $F_{s-1} \geq F_s \geq F_{s+1}$. A map vector M may also be used to link the sorted coefficient index s with the transformed feature index k. Through the white-box nature of the rule-based XAI model, a user may then be able to inspect for any potential bias by inspecting the contents of the sorted feature importance vector Fs whereby F0 and M0 may contain the feature with the highest bias.

Normalization may also be applied on the resulting feature importance. In an exemplary embodiment, the F and M vectors may be used to create appropriate reports and analyses of bias and their sources and may also be inputs to formulate a strategy for bias reduction, mitigation, or elimination either via supervised, unsupervised, or semi-supervised means.

In an exemplary embodiment, an XTT may contain a number of input and output modules. One or more modules may include a normalization module configured to normalize the inputs before being received by the input layer or after being outputted from the input layer, a scaling module configured to scale the said inputs before received by the input layer or after outputted from the input layer, and a standardization module configured to standardize the said inputs before received by the input layer or after outputted from the input layer.

In an alternative exemplary embodiment, the F and M vectors may be used as input to a feature discovery and model discovery method that utilizes this information in perfecting its strategy and/or as an additional input parameter that lets the feature discovery and model discovery method suggest, and optionally execute, structural changes to the AI model.

For example, in a typical embodiment, the bias information may be used to focus a GA or MCSM system on specific parts of an XNN/XSN/XMN that exhibits bias, or rules in an XAI model that may be causing bias, or the attention model of an XTT that exhibits bias, or actions taken by an XRL agent that may be causing bias under some policy.

Local bias detection may be applied to a specific sample. The answer, along with its explanation coefficients, may serve as the basis for localized bias detection. Referring to an exemplary model, a specific input sample may have two inputs, in this case x and y. A feature importance vector I may represent the feature importance in a global manner such that $I=\{\beta_1, \beta_2+\beta_{10}, \beta_3+\beta_5, \beta_7, \beta_8\}$, corresponding to the features $\{x, y, xy, x^2, y^2\}$. The vector I may be sorted in descending order such that the most prominent feature is placed in the beginning of the vector. Given a specific input vector {x, y}, it may be noted that one or more rules may trigger through the function f(x, y).

In this exemplary embodiment, let $x \leq 10$. This may trigger the function $Sigmoid(\beta_0+\beta_1 x+\beta_2 y+\beta_3 xy)$, which results into the following localized feature importance vector, which serves the basis as an explanation candidate whereby $E=\{\beta_1 x, \beta_2 y, \beta_3 xy\}$. It may be noted that different features may have different importance at a global and a local level; for example, in this particular embodiment, globally the feature x may be the most important, however, after evaluating the function locally it may be noted that y is the most important.

XTTs may be used in conjunction with a suitable Distributed Explainable Architecture (DEA) to increase the performance of the defined models. A Distributed Explainable Architecture DEA may contain multiple explainable architectures $DEA_m$, such that $m=\{x_1, x_2, \ldots, x_n\}$ and $x_i \in \{XAI, XNN, INN, XTT, XRL, XSN, XMN\}$ or logically equivalent or similar architectures, and such architectures are processed in parallel. The number of explainable architectures 2610 in an exemplary distributed framework is defined as $DEA_n$.

Figure 11:
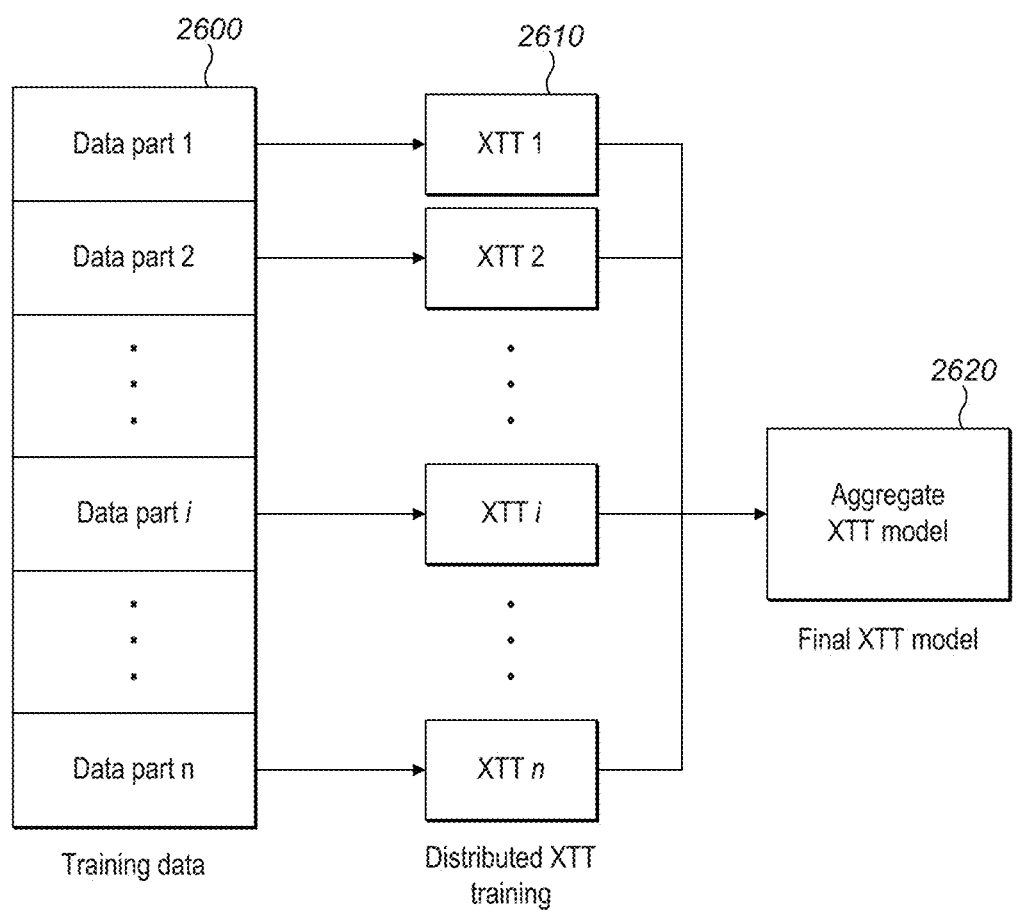
FIG. 11 is an exemplary embodiment of a Distributed XTT Training System.

FIG. 11 illustrates a high-level architecture of a distributed training system, where $DEA_m$ represent the XTT architectures and $DEA_n$ includes n models, that may further be a homogenous or heterogenous mixture of explainable architectures. DEA splits the dataset into multiple subsets 2600 of data in order to train the explainable architectures $DEA_m$. It is further contemplated that appropriate distributed training techniques may be applied to homogenous and heterogenous explainable model mixes within DEAs, including but not limited to collective operation techniques like All-Reduce, Horovod, and other suitable distributed learning techniques.

The models trained in the distributed framework DEA are aggregated 2620 during the training phase by calculating the average (or weighted average) from the parallel models. The aggregate model may be formed based directly on the weights of the model, rather than from the result of the individual models. The Distributed explainable architecture DEA may be useful for large datasets where the training data cannot fit in the CPU/GPU memory of a single machine.

DEA may include hybrid models, such that the models in the architecture are a mix of x, where $x \in \{XAI, XNN, INN, XTT, XRL, XSN, XMN\}$ or logically equivalent or similar architectures. An exemplary embodiment may implement multiple different models. For example, one data part may implement an XNN while another data part of the same system may implement an XTT. The models may then be combined to create an aggregate model. The aggregate model may be equal to x, where $x \in \{XAI, XNN, INN, XTT, XRL, XSN, XMN\}$ or logically equivalent or similar architectures or may be a hybrid model implementing multiple different models.

DEA may incorporate multiple independent models where one model, once trained, can work independently without the need to rely on the full distributed architecture, which is optimized primarily for training purposes.

The XTT architecture may construct an Explanation Scaffolding from the output produced by the explainable architecture of the XTT and use it to illustrate the results to the interpreter to assist in understanding such how the model arrived at such prediction. An interpreter may be the end-user or a component within the XTT architecture.

The underlying components of an explainable Transformer architecture XTT may require model interpretation in order to update their states or internal parts of the model.

There are three types of model interpretation: (i.) basic interpretation or answer, (ii.) explanatory interpretation or explanation, and (iii.) meta-explanatory interpretation or justification.

A basic interpretation or answer may refer to a prediction output o that can be understood by the sub-component.

An explanatory interpretation or explanation is represented by a 2-tuple vector <o, w> and may refer to a prediction output o combined with a model explanation w for such predicted value, that can be understood by the sub-component. A model explanation may include coefficients $\theta$ of the explainable architecture x, where $x \in \{XAI, XNN, INN, XRL, XSN, XMN\}$ or logically equivalent or similar architectures, that may be utilized to explain the feature importance of the input features for a given observation.

A meta-explanatory interpretation or justification may be represented by a 3-tuple vector <o, w, j> and may contain the prediction output o, the model explanation w and justification of the model explanation j. The model justification j provides additional information about the assumptions, processes and decisions taken by the explanation system that were taken into consideration to produce the model explanation.

The model explanation and meta-explanatory interpretation may be utilized by the interpreter to update components within the XTT architecture.

In an exemplary embodiment, an XTT may be utilized within an Explanation and Interpretation Generation System (EIGS) to provide a suitable model for the processing of input queries and to produce an appropriate answer, explanation and optional justification pertaining to said input query. A typical EIGS explanation and interpretation pipeline is illustrated in FIG. 14. It may be further contemplated that XTTs may be utilized to transform appropriate parts of the Explanation Scaffolding in an EIGS, including but not limited to transforming the presentation output, user-specific output personalization, context-specific output transformation, goal-specific output transformation, plan-specific output transformation and action-specific output transformation. It is further contemplated that an XTT may be utilized to transform EIGS output based on a combination of statistical, causal, taxonomical, ontological, domain, and semiotic information.

In an exemplary embodiment, an XTT may be utilized within an Explanation and Interpretation Generation System (EIGS) to provide a suitable model for a Filter to produce an appropriate filtering of an Explanation Scaffolding. It may be further contemplated that XTTs may be utilized to filter appropriate parts of the Explanation Scaffolding in an EIGS utilizing a combination of interpretation framing, protocol context, interpretation rules, interpretation procedures, interpretation scenario, and conflict resolution information. The XTT attention model may be used to implement an intra-filter and/or inter-filter agreement process within an EIGS.

In an exemplary embodiment, an XTT may be utilized within an Explanation and Interpretation Generation System (EIGS) to provide a suitable model for an Interpreter to produce an appropriate interpretation and generate elements of an Interpretation Scaffolding. XTTs may be utilized to transform appropriate parts of the Interpretation Scaffolding in an EIGS, including but not limited to transforming the interpretation output, interpretation scenario-specific output transformation, context-specific transformation, and interpretation brief-specific output transformation. An XTT may be utilized to transform EIGS interpretation output based on a combination of framing, protocol, interpretation rules, interpretation procedures, interpretation templates, interpretation brief, scenario model, domain, interactive context, and conflict resolution information. The XTT attention model may be used to implement an intra-interpreter and/or inter-interpreter agreement process within an EIGS. An XTT may be utilized to transform EIGS interpretation output based on an appropriate selection model and selection process.

XTTs may be trained on images without the requirement of a convolutional neural network (CNN) (Dosovitskiy et al., 2020; Chen et al., 2020). A transformer may be trained on image data, without incorporating the 2D input structure of the images, to auto-regressively predict the pixels of the input image, instead of predicting the language tokens. iGPT (Chen et al., 2020) trained a GPT-2 architecture to learn image representations in the transformer architecture, using a low-resolution version of the ImageNet dataset. Vision Transformer (Dosovitskiy et al., 2020) divides the input images into patches, flattens them, and uses them as input tokens to train a Transformer architecture. Vision Transformer (Dosovitskiy et al., 2020) and iGPT (Chen et al., 2020) may be seen as a black-box Transformer, as its components, such as the multilayer perceptron (MLP), are not explainable or interpretable. XTTs introduce white-box explainable components within the Transformer architecture that allow for interpretable internal coefficients and generation of explanations that may be aligned to those of a Vision Transformer (Dosovitskiy et al., 2020) or iGPT (Chen et al., 2020). Variations of self-attention mechanisms may be used in a transformer.

The EQTransformer (Mousavi et al., 2020) is a black-box model, as the predicted earthquake signals, P-phase and the S-phase outputs are not explainable or interpretable. XTTs introduce white-box explainable components within the Transformer architecture, allowing for interpretable internal coefficients and generation of explanations, such as features attributions to the input space, which illustrates the importance of each input feature. An exemplary XTT based implementation of an earthquake detection system would thus result in a white-box explainable system, unlike EQTransformer. XTTs also allow further generalization of hierarchically structured explanations without needing to resort to multiple encoder-decoders as in EQTransformer, relying solely on the explainable models embedded within XTTs, such as an XNN.

Self-attention mechanisms or similar mechanisms may be induced by an explainable architecture x, where $x \in \{XAI, XNN, INN, XRL, XSN, XMN\}$ or logically equivalent or similar architectures, to create an explainable self-attention mechanism. The input tokens of a self-attention mechanism and the black-box self-attention mechanism or similar mechanisms may be required as input to induce the explainable architecture x. An explainable self-attention mechanism may generate multiple levels of explanations, which may include partitioning information, internal coefficients of the model and feature attributions of the input space, and such explanations may be an output to the interpreter.

XTTs may be trained using self-supervised techniques, such as masking, cloze deletion, Pattern-Exploiting-Training (PET), game-theoretic approaches, and other suitable techniques. Typed mask symbols may represent different symbols, concepts, or classes/groups of objects, and may be distributed and encoded over the input data. The interactions of the typed masks with the rest of the input symbols/features represents the generalized training data used by the XTT. Typed masks may be selected from a permutation of a sub-set of possible tasks and modalities. Untyped masks are thus the equivalent of a typed mask that combines all possible tasks and modalities into one mask symbol.

An XTT may utilize past learnt representations or historical states from all encoder or decoder layers to merge in a single vector v. The vector v may be used as feedback to any layer in the XTT, such that the initial layers of an XTT have access to higher level representations. Previous work, such as Feedback Transformer (Fan et al., 2020) are limited to the modification of self-attention to attend to higher level representations. An XTT can utilize any internal coefficient of the white-box model to attend to higher level representations due to the nature of white-box models. It is further contemplated that such an XTT may also impose causal constraints on past learnt representations to avoid creating causally implausible inferences or creating prediction paths that may statistically valid but causally implausible. XTTs may also utilize Behavioural Models and their condition, event, trigger, and action state representation to impose further environmentally plausible constraints on past learnt representations to achieve explainable yet simultaneously causal and environmental plausible feedback memory. Adding feedback memory to XTTs also makes them Turing Complete, as they can represent conditional processing and simulate Turing Machines, opening up new application areas such as automated code generation, refinement, and optimization.

In an exemplary embodiment, an XTT system may be used to analyze and parse an existing formal computer program, written in a suitable formal language, and once loaded, refine it further using the XTT attention model. Human users may be able to indicate areas that they need to be filled in by using a similar mechanism to the next sequence token used to generate natural language content. For formal languages, the hierarchical partition structure within explainable models may be used to directly model the structure of the formal language program or artefact. It is further contemplated that a formal specification language may be used to specify the problem that needs to be solved using the formal language program, thus allowing the XTT system to automatically generate candidate code solutions for the specified problem. In another option, the XTT system may also be used to convert code according to pre-defined stylistic standards, highlight inconsistencies or errors, suggest better alternatives and re-factoring and re-writes of code, to de-obfuscate code that has been obfuscated, and apply functional programming language concepts such as alpha-conversion, beta-reduction, and eta-reduction to generated code. In another option, the XTT system may be used in conjunction with an Automated Theorem Proving (APT) system together with a suitable mathematical formal language system like Metamath, F*, HOL, Mizar, and others, to analyze, generate and auto-complete mathematical expressions, statements, and proofs automatically, either from scratch or via an existing collection of proven statements and/or incomplete statements. In another option, the XTT system may be used to analyze DNA code in conjunction with protein or other suitable molecular shapes to explain regulatory changes in DNA, gene expressions, protein folding and other related biochemical applications, while providing an explanation of the underlying assumptions between the input-output transforms that are applied by the XTT, which is necessary for regulated and trustworthy applications such as those involved in drug discovery, medical and pharmaceutical applications.

In an exemplary embodiment, an end-to-end deep learning architecture consists of an XTT that is used for image and video compression. Video frames are divided into patches that are subsequently used as input tokens to train the XTT. Such contextualized tokens are generated by down-sampling distinctive features as required for optimal performance. The explanations generated by the explainable architectures in an XTT may form a lossless explanation path during the Backmap process. The path may represent the importance of the filtered contextualized tokens for a particular classification label. Redundancy optimization and adaptive token elimination techniques such as that presented in Goyal et al. (2020) may be utilized to accelerate XTT performance further.

An XTT may be used in an end-to-end automatic speech recognition (ASR) architecture. In an exemplary embodiment, an XTT is used to translate a speech audio waveform into the corresponding text. The pre-trained XTT contextual representations are connected to a linear layer and a SoftMax operation to predict the output. The predicted output is then connected to a decoder, such as the beam search decoder, to convert it into the corresponding text.

In an exemplary embodiment, an XTT is used in an end-to-end deep learning architecture to process speech. An XAED-encoder is used to convert the speech into a latent discrete representation. An XTT is connected to the output of the XAED-encoder, to predict the next output based on the previous outputs. An XAED-decoder is connected to the XTT to convert the predicted output into speech. To measure the performance of the exemplary embodiment, the phoneme error rate (PER) metric is used with a pretrained ASR model to convert the generated audio to text.

In an exemplary embodiment, an XTT is used for multiple object tracking. The XTT consists of an encoder and two decoders, $d_1$ and $d_2$, to generate the bounding boxes as output. The keys and values of the XTT-encoder and the query $q_1$ are passed as input to $d_1$. $d_1$ may predict objects in the current video frame. The keys and values of the XTT-encoder and the query $q_2$ are passed as input to $d_2$. $d_2$ may predict objects in the current video frame with objects detected in the previous frames. The performance of $d_1$ and $d_2$ may be measured using metrics such as intersection over union.

XTTs may be used to match satellite, aerial or other type of bird-eye-view (BEV) images for digital surface model (DSM) or depth map (DM) generation. In an exemplary embodiment, an XTT-Encoder is used to measure the disparity between satellite image pairs, utilizing a similar exemplary architecture to that illustrated in FIG. 10 (a), where the predicted value is calculated using disparity regression instead of classification. The input tokens of the XTT-Encoder may be generated by dividing the image pairs into flattened image patches, defined as $\{img_1^1, img_2^1, \ldots, img_n^1, [SEP], img_1^2, img_2^2, \ldots, img_n^2\}$. The [SEP] symbol may be used as a separator between the first image and the second image. Disparity may be predicted by attaching a linear layer or an explainable architecture x, where x∈{XAI, XNN, INN, XRL, XSN, XMN} or logically equivalent or similar architectures, to the final layer of the XTT-Encoder. It is further contemplated that the input images are encoded prior to the XTT-Encoder, using a combination of CNNs, CNN-XNNs, CNN-XTTs and/or XAEDs. The white-box explainable components of the XTT-Encoder allow for interpretable internal coefficients and generation of explanations, such as feature attributions to the input space of the input images, which illustrates the absolute importance and relative contribution of each input feature. It is further contemplated that XTTs may be utilized to process imagery in monocular, stereoscopic, and multi-view input data via straightforward extensions of the XTT-Encoder.

In an exemplary embodiment, an XTT is used for an audio-visual classification task to predict if audio is present in a video. The audio is represented using extracted spectrograms divided into frames using the sliding window approach. The visual frames are represented using the flatten layer of the CNN-XNN architecture, as visual frame embeddings, using frames sampled from the sliding window approach used in the audio representation. The input for the XTT-encoder may consist of the audio embedding and the input to the decoder may consist of the visual embedding. The order of the inputs may be reversed, such that the visual embedding is the input to the XTT-encoder and the audio embedding is the input to the decoder. The XTT is connected to a sigmoid layer to predict whether the input audio event classes are present in the video embedding. In a further exemplary embodiment, a CNN-XTT architecture is used instead of a CNN-XNN architecture. In a further exemplary embodiment, the final feed forward layer of a CNN architecture is used instead of the flatten layer of a CNN-XNN architecture. In a further exemplary embodiment the CNN-XTT architecture is utilized to detect other input modalities apart from audio, including objects in the audio-visual input.

An XTT may be used for the generation and detection of synthetically generated multi-dimensional data. In an exemplary embodiment, an XTT implementation may be used to detect and classify deepfake images from authentic ones, or to detect for the presence of adversarial attack information that has been added to data to confuse machine learning systems. It is contemplated that suitable explainable models, such as Explainable Generative Adversarial Networks (XGANs) and/or Explainable Generative Adversarial Imitation Learning (XGAIL) model, may be used to extend the generation and detection capabilities of XTTs. In another exemplary embodiment, an XTT may be implemented within a camera processing system to automatically generate, insert and blend accurately positioned, framed, scaled, lit, and rendered synthetic images of people and objects within a combination of actual imagery and computer-generated imagery. It is further contemplated that such a synthetic image blending system may be implemented within an Augmented Reality (AR), Virtual Reality (VR) or similar metaverse system. In a further exemplary embodiment, an XTT based system may be implemented within portable hardware ocular devices that are utilized for AR/VR/metaverse applications, to perform real-time blending of synthetic images with real-life imagery or metaverse imagery. It is further contemplated that such an XTT based system may be implemented within medical hardware for use within surgeries or analysis of medical images; within engineering applications for use in equipment inspection processes and manufacturing inspection processes; and within medical implants that transmit data in human readable and interpretable formats, such as within an electro-mechanical interface, an electro-chemical biological interface or an appropriate biological-electrical human machine interface such as a biological neuron-artificial AI system interface. In a further exemplary embodiment, an XTT based system may be implemented as part of a medically implanted device that bridges two or more biological neurons, receiving input signals from a biological neuron and outputting signals to a biological neuron, in a suitably encoded format. It is contemplated that such applications may provide a practical solution for bridging damaged biological nervous system connections, for example, in paraplegic patients or assist in the implantation and connection of artificial devices such as cameras and other sensors in advanced prosthetic devices. It is further contemplated that the simulator and data sample synthesis of an XGAIL system implemented as part of an XTT system will enable the XTT system to generate multi-modal mixed output that is properly synchronized according to the relevant sequence ordering of the different modalities and the environmental world context (for example, temporal synchronization). It is further contemplated that such an exemplary XTT system implementation may also be used to create novel data samples, imagery, digital and analogue mixed-media paintings, and 3D sculptures using a variety of learnt styles that can be used to modify the generated data samples appropriately, for example, to imitate a particular artistic style. It is further contemplated that such generated data samples may be tagged with some secure traceable digital code, distributed ledger entry or non-fungible token (NFT).

In an exemplary embodiment, an XTT implementation may be used to generate music, using either a combination of formal music notation and synthesis, sound sample mixing, text-to-speech generation, and general audio sample generation. It is further contemplated that a multi-modal XTT implementation may be used to generate additional output in different modalities, for example, utilizing video generation to create accompanying video for music, pose estimation and deepfake generation models to create dance videos with realistic synthetically generated avatars with human-like movement and similar applications. It is further contemplated that a multi-modal XTT implementation may be used to analyze input in different modalities, for example, to associate speech, pose estimation, text, and gesture identification to create realistically moving and behaving avatars in a virtual environment.

An XTT may be pre-finetuned as an additional step after pre-training, to further improve the performance of the downstream tasks.

An XTT-Encoder may be used in an end-to-end deep learning architecture to predict annotations on video frames. In an exemplary embodiment, a deep learning consists of a CNN-XNN component and an XTT component. The video frames of the input dataset are used as input to the CNN-XNN architecture to predict the object embedding. The corresponding transcribed text $input_t$ of the video frame, where $input_t = \{t_1, t_2, \ldots, t_n\}$, is used as input to the XTT-Encoder to predict the contextualized word embeddings. The explainable end-to-end deep learning model may force the CNN-XNN architecture to learn the embedding of the contextual word representation for the token $t_j$, where $t_j$ may refer to a distinguishable word in the transcribed text of the video frame, so that the CNN-XNN architecture may learn the semantic context of the prediction label. In a further exemplary embodiment, a CNN-XTT architecture is used instead of the CNN-XNN architecture.

An XTT-Encoder may be used to track the state of dialogues and learn unseen slots instead of being previously defined in an ontology, for dialogue state tracking (DST) task, in an end-to-end deep learning architecture. In an exemplary embodiment, the input to an XTT-Encoder may include a [CLS] token, the system dialogue token embeddings $d_s$, where $d_s = \{s_1, s_2, \ldots, s_n\}$, the user dialogue token embeddings $d_u$, where $d_u = \{u_1, u_2, \ldots, u_m\}$, and a [SEP] token that separates $d_s$ from $d_u$ in the input space. The contextualized token representation [CLS] is then connected to an explainable architecture x, where x∈{XAI, XNN, INN, XRL, XSN, XMN} or logically equivalent or similar architectures to classify the context class of the dialogue. The contextualized token representations of the rest of the input tokens may be connected to an explainable architecture x to predict the start and end position of the slot value, by selecting the token with the maximum predicted probability for the start output and selecting the token with the maximum predicted probability for the end output. The explainable architectures in the XTT-Encoder may be induced from a black-box model or learnt directly from a dataset.

In an exemplary embodiment, an XTT-Encoder is used to identify an entity in a given input sequence. An input sequence $\{s_1, s_2, \ldots, s_n\}$ processed by the XTT-Encoder generates a contextualized representation $\{y_1, y_2, \ldots, y_n\}$. The contextualized representations $\{y_1, y_2, \ldots, y_n\}$ may be connected to an explainable model to predict two outputs: the start position of the entity and the end position of the entity. The contextualized token representation with the highest probability prediction for the start position may be selected for the start position of the entity representation. The contextualized token representation with the highest probability prediction for the end position may be selected for the end position of the entity representation.

In a further exemplary embodiment, an XTT-Encoder is used to identify the start position and the end position of the answer for the input question. The input to the XTT-Encoder may include a [CLS] token, the token embeddings of the question $input_q$, where $input_q = \{q_1, q_2, \ldots, q_n\}$, the token embeddings of the answer $input_a$, where $input_a = \{a_1, a_2, \ldots, a_m\}$, and a [SEP] token that separates $input_q$ from $input_a$ in the input space. The contextualized token representation [CLS] is then connected to an explainable architecture x, where x∈{XAI, XNN, INN, XRL, XSN, XMN} or logically equivalent or similar architectures to classify if the answer is present in the token embeddings $input_a$. The contextualized representations of $input_a$ may be connected to an explainable model to predict two outputs: the start position of the answer and the end position of the answer. The contextualized token representation with the highest probability prediction for the start position may be selected for the start position of the answer. The contextualized token representation with the highest probability prediction for the end position may be selected for the end position of the answer.

In an exemplary embodiment, an XTT-Encoder is used to link mentions of entities in a text to the corresponding entities in a knowledge base. The input to the XTT-Encoder may include a [CLS] token at the start of the input space, followed by the token embeddings of the context $input_c$, where $input_c\{t_1, t_2, \ldots, t_n\}$, the token embeddings of the mention $input_m$, where $input_m = \{t_1, t_2, \ldots, t_m\}$, the token embeddings of the entity $input_e$, where $input_e = \{t_1, t_2, \ldots, t_k\}$, and a [SEP] token that separates $input_m$ and $input_c$ from $input_e$ in the input space. The contextualized token representation of [CLS], is then connected to an explainable architecture x, where x∈{XAI, XNN, INN, XRL, XSN, XMN} or logically equivalent or similar architectures, to predict if the mention of the entity $input_m$ is linked to the entity $input_e$ or not. The XTT-Encoder may assign mentions that are similar to the entity as a negative prediction to learn an XTT that is more semantically aware in its entity linking task.

Figure 10A:
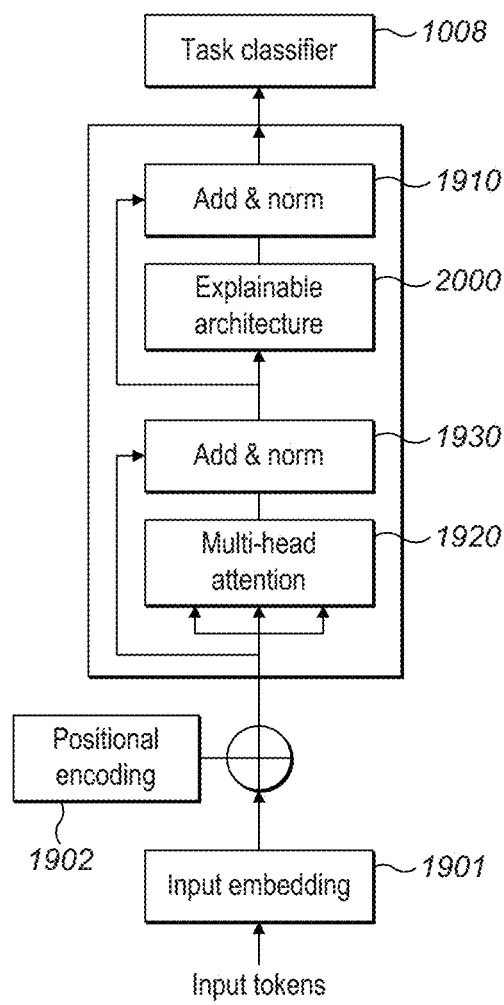
FIG. 10 (a) is an exemplary embodiment of an XTT-Encoder with a downstream classification task.
Figure 10B:
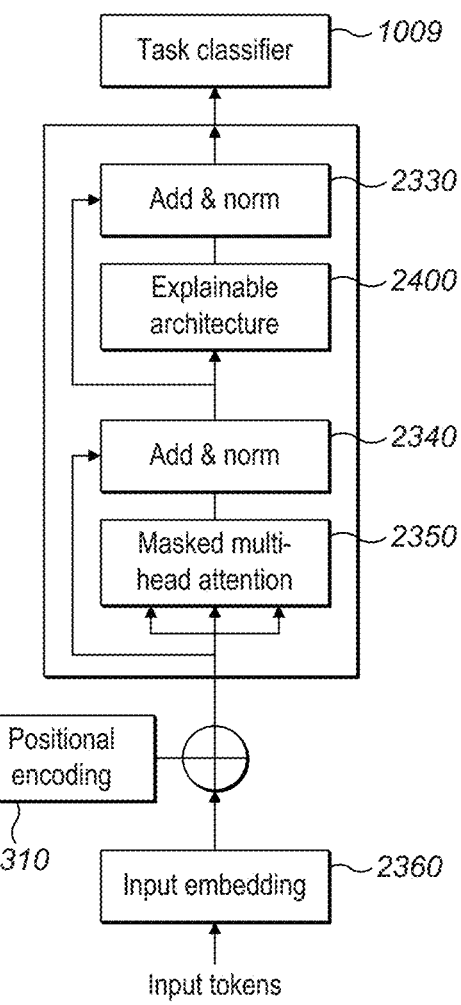

An XTT-Encoder may be combined with an XTT-Decoder to predict the output based on the previous outputs. In an exemplary embodiment, an XTT-Encoder is combined with an XTT-Decoder to predict the next observed action in a video frame. The XTT-Encoder processes the video frames V, where $V = \{v_1, v_2, \ldots, v_n\}$, as non-overlapping flattened image patches, in a similar mechanism as the work in Dosovitskiy et al. (2020), to generate feature representation l, for each frame, such that l=XTT-Encoder(V). It is further contemplated that the XTT-Encoder process may be used in practical implementation of an explainable video coding and video modelling system. The XTT-Decoder processes the feature representations l, combined with temporal positional embedding, to predict the action present in the video frame, based on the previous video frames, in a similar manner as shown in FIG. 10 (b).

In an exemplary embodiment, an XTT-Encoder architecture may be used to induce an encoder-based Transformer that was trained to classify medical imaging observations. The input tokens $\{t_1, t_2, \ldots, t_n\}$ may refer to the portions of the medical imaging data combined with a positional embedding mechanism. The XTT-Encoder may induce the black-box feed forward neural network component 1900 using an explainable model x 2000, to construct multiple levels of explanations which may include partitioning information, internal coefficients of the model and feature attributions of the previous layer 1930 in relation to the output of the black-box feed forward neural network component. The XTT-Encoder may induce the black-box MHA component 1920 with an explainable model x, to construct multiple levels of explanations which may include partitioning information, internal coefficients of the model and feature attributions of the input tokens $\{t_1, t_2, \ldots, t_n\}$ in relation to the output of the black-box MHA component 1920. The internal coefficients of the model and the feature attributions may represent the importance of the input dimensions, or the bias found in the encoder-based Transformer.

An XTT may include an explainable model x that takes additional inputs, such as but not limited to, the coefficients from the Constituent Attention Module (Wang et al., 2019), to construct explanations to hierarchical structures learnt in a Transformer architecture.

In an exemplary embodiment, an XTT system implementation for medical imaging may use an explainable encoder-based Transformer that was trained to classify pneumonia observations in a chest x-ray image dataset, by utilizing a classification token to the input image token sequence. The explainable architecture x may take additional input, such as, but not limited to, the Constituent Priors of the respective image patches. The link probabilities at each encoder layer and the respective feature attributions may be utilized to form an explainable parse tree of the input chest x-ray image patches using unsupervised parsing by top-down greedy parsing approach.

An explainable Transformer XTT architecture may be a component in an end-to-end explainable deep learning system, or suitable machine learning system, which incorporates XTT as part of the pipeline. The underlying architecture deriving the input tokens to the XTT architecture may be a convolutional neural network (CNN) and the explainable Transformer may be the final component of the architecture.

The exemplary embodiments may be implemented directly as a hardware circuit, which may be implemented either using (i.) flexible architectures like FPGAs, or (ii.) more static architectures like ASICs, analogue/digital electronics, photo-electronics, or optical processors, or (iii.) neuromorphic architectures, spintronics, or memristors that may be more suited for the hardware implementation of connectionist models, or (iv.) quantum computing hardware.

In an exemplary embodiment, XTTs may be implemented using FPGAs, which may be useful for applications involving high throughput and hardware acceleration advantage while maintaining flexibility that is usually associated with software implementations.

In an exemplary embodiment, XTTs may be implemented using ASICs, which may be useful for applications involving mass production of similar products. Such an implementation may have high performance and throughput, possibly at a cost of having less flexibility.

In an exemplary embodiment, XTTs may be implemented using discrete components, which may be useful for small size or compact XTTs. Cost and robustness considerations may make this type of implementation attractive, for example, when high power systems are involved or when a simple XTT is needed for basic control or safety monitoring.

In another exemplary embodiment, an XTT may be implemented using neuromorphic hardware. Neuromorphic hardware also intertwines memory and processing in a similar manner to spintronics. Hardware neuromorphic XTT implementations may be highly efficient while having most of the advantages and flexibility similar to that of a general computing architecture without actually needing a general computing architecture. Neuromorphic XTT implementations may implement explainable models like XNNs and/or INNs efficiently, while enabling possible non-neural components of XTTs to be implemented efficiently too, for example, by utilizing the neuro-symbolic architecture of the XNN conditional network. Interpretable models such as INNs, enable such architectures to be made understandable by presenting a model that can mostly be further presented to people in the form of rules and/or workflows. This surface representation form can be edited and then seamlessly reconverted back into the neural, connectionist format that is needed for neuromorphic hardware. Such an exemplary embodiment provides a practical solution for editing, adding, and deleting relevant information and consequently changing the behavior of neuromorphic devices in a controlled, reliable, and replicable manner.

In another exemplary embodiment, an XTT may be implemented on neuromorphic hardware that employ spiking neurons rather than the more common activation function-based neurons. Spiking neurons may increase the power efficiency and processing throughput very significantly, making some practical applications feasible that would otherwise be unfeasible with non-spiking neurons.

In another exemplary embodiment, an XTT may be implemented using spintronics or memristors. Spintronics intertwine memory and computing components leading to a potentially more efficient hardware implementation since there does not need to be much, if any, transfer of memory values, weights, etc. during operation. Memristors offer similar advantages and have the advantage of being non-volatile. Spintronic and/or memristor implementations may have similar characteristics to an FPGA implementation if they are reprogrammable. Non-reprogrammable spintronics or memristors may have similar characteristics to ASICs. An XTT can be efficiently implemented using spintronics or memristors by converting all the different layers and neurons in any connectionist-based part of the XTT architecture together with any state-machine or tabular-based part of the XTT architecture to a spintronic or memristor circuit. Spintronic implementations may be particularly efficient in practice due to the conflation of memory and processing that is available in a spintronic circuit. Memristor implementations may be particularly power efficient as their non-volatile weight storage makes it possible to aggressively switch off part or all of a memristor based system during operation. Faster data access and the elimination or reduction of having computationally expensive data transfer requests over a data bus can significantly improve the performance of such an implementation.

In another exemplary embodiment, an XTT may be implemented using a quantum processing system. It is contemplated that an XTT implemented on a quantum processing system will have characteristics that are similar to classical XTT model with the addition of quantum specific extensions. For example, such an extension may allow for the specification of quantum annealing effects and their correct interpretation. In another example, an extension may allow for the correct interpretation of multiple qubit states, qubit basis states, mixed states, Ancilla bits, and other relevant quantum effects due to entanglement and/or decoherence. In another example, an extension may allow for the introduction of quantum logic specific operators and/or hardware logic gates within an XNN, such as quantum logic gates like CNOT (Controlled-NOT), CSWAP (Controlled-Swap or Fredkin gate), XX (Ising Coupling Gate XX), YY (Ising Coupling Gate YY), ZZ (Ising Coupling Gate ZZ) gates, Pauli gates, Hadamard gates, Toffoli gates and other relevant quantum logic operations that may be combined serially or in parallel. Such quantum-logic gates (or quantum gates) operate on a number of qubits, acting as the quantum analogy of classical logic gates. The XX, YY, ZZ designation of the Ising gates are related to the Pauli X, Y, Z matrices which are used to describe the interaction of a particle's spin with an external electromagnetic field. Furthering these examples, such quantum specific extensions may be implemented in various parts of the XTT architecture, for example by having quantum extended versions of conditions, events, triggers, and actions. It is further contemplated that such quantum extended versions of an XTT may take advantage of quantum effects, for example, to execute multiple actions, or evaluate multiple conditions, or evaluate large systems of constraints in significantly fewer processing steps needed than possible on a classic processing implementation. In an exemplary embodiment, an XTT implemented on quantum computing hardware, may utilize suitable quantum algorithms, such as those based on quantum Fourier transforms, amplitude amplification, quantum walks and so on. In an exemplary XTT embodiment on quantum devices, the Bernstein-Vazirani, Simon's algorithm or the Deutsch-Jozsa algorithm may be utilized to predict and refine the boundary conditions of the XTT architecture, while also potentially speeding up the encoding-decoding aspect. In another exemplary quantum embodiment, Shor's algorithm, Quantum Phase estimation algorithm, Grover's algorithm, Quantum Counting, Quantum Hamiltonian NAND trees, or the HHL algorithm may be used to speed up the constraint, condition, event, and trigger parts of an XTT architecture integrated with a Behavioral Model (BM). In another exemplary embodiment on quantum devices, a hybrid solution may be utilized, such as the QAOA algorithm, VQE eingensolver, CQE eingensolver, and quantum matrix inversion to speed up part of the processes involved, for example by using Gaussian estimation processes, or linear system of equations solvers that utilize quantum processing to give faster results both during XTT model training and when operating normally in the environment.

Quantum implementations of XTTs may also be able to offer significant advantages in multi-task and multi-modal applications. For example, a Hilbert space can be defined for each modality and/or task (with an appropriate basis state definition for each task/modality) and subsequently a multi-task and multi-modal Hilbert space can be composed that encompasses all the individual tasks and modalities. The resulting multi-task and multi-modal Hilbert space can be used to represent all the interactions between tasks and modalities and be used to implement both training for a sub-set of modalities and/or tasks together with a quantum version of crossover learning. Crossover learning may also benefit from a quantum implementation as the combination of sparse connections within the crossover learning structure and the superior search performance characteristics of quantum computing hardware are likely to produce faster applications. It is further contemplated that a hybrid implementation may result in practical implementations, where classical hardware is used to implement the individual task or modality oriented XTTs, and quantum hardware is used to implement the crossover learning structure.

In an exemplary embodiment, an XTT may be incorporated within a workflow system that reads from the XTT and writes back to the XTT respectively, including both processing data and event data. It is further contemplated that the XTT and the workflow combination may be further integrated within a Robotic Process Automation (RPA) system, Decision Support System (DSS) or a Data Lake system.

XTTs actions, objective metrics, conditions, constraints, actions, triggers, and events may utilize a combination of abductive, inductive, deductive logic in conjunction with causal logic. Using inductive logic, XTTs may predict future behavior based on generalized rules and knowledge that may have been learnt fully automatically. Using deductive logic, XTTs may predict behavior according to a combination of one or more conditions or constraints. Using abductive logic, XTTs may retrofit an observed scenario to a known set of possible states in the XTTs or be able to explain the currently observed behavior in a reasonably acceptable manner. Abductive logic may also be useful in practical implementations of XTT-based diagnostic systems and can be used to aid in the diagnosis and troubleshooting of AI systems using behavioral monitoring and predictive data. Abductive logic may also be useful in the creation of XTT-based explanation narratives that fit an observed state, while inductive and deductive logic may be useful in the creation of XTT-based explanation narratives in general, together with predictive-like narratives. Abductive logic may be useful in situations where the environment provides partial observability.

An XTT may be used for causal explanations using counterfactual language representation architectures. In an exemplary embodiment, an XTT-Encoder is trained with an additional Treated Concept objective (Feder et al., 2020), and Controlled Concept (Feder et al., 2020) to predict the presence of a potential confounding concept. The predictions of the XTT-encoder in this exemplary embodiment are then compared with the predictions of an XTT-encoder that has not used counterfactual fine-tuning training, using the average of the absolute differences between the prediction probabilities assigned to the output classes.

Figure 19:
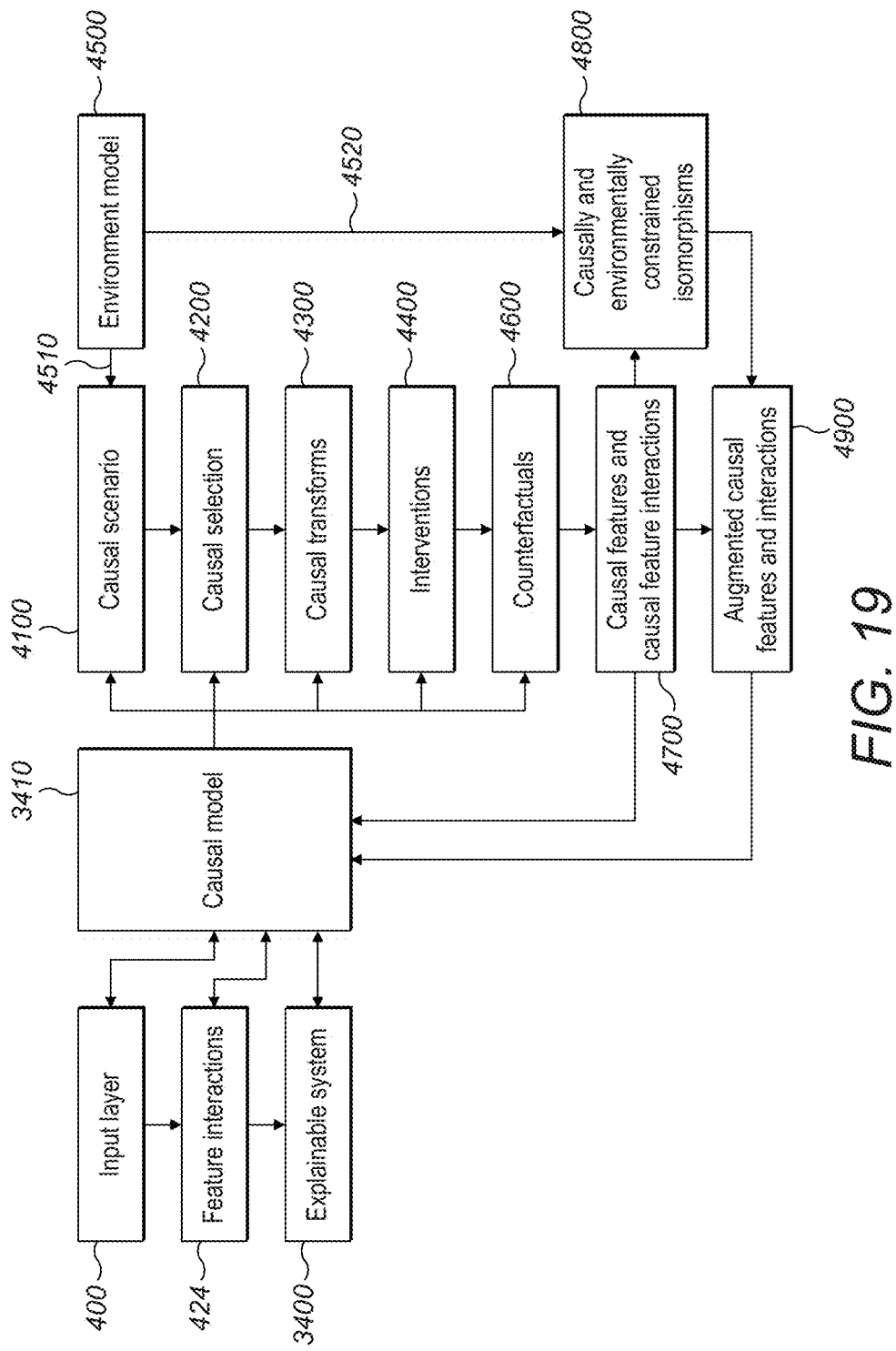
FIG. 19 is an exemplary XTT with causal models.

XTTs may implement causal model specific functionality to handle cause-and-effect, handle association, intervention, and counterfactual causal logic, perform plausibility checks via environmental model input, and also augment training data via causally plausible isomorphisms. In an exemplary embodiment shown in FIG. 19, an XTT is implemented together with explainable causal model functionality. The input layer 400 (which may correspond to the Input component 400 in FIG. 3 if the explainable system is an XNN), feeding to a suitable feature interactions component 424 (which may correspond to the Fit Layer component 424 in FIG. 3 if the explainable system is an XNN), which then feed into the explainable system 3400, which may be the XTT itself and/or one of its explainable model components. The input layer 400 also feeds into the causal model component 3410. The feature interactions 424 and the explainable system 3400 have bi-directional links to the causal model 3410, as they both feed into the causal model and receive back input, features and feature interaction information back from the causal model. The causal model 3410 provides input to a causal processing pipeline 4100-4600. The causal processing pipeline starts off with the causal scenario 4100, which may optionally also receive environmental contextual input 4510 from an environmental model 4500. Such environment context 4510 can be used to set plausibility constraints and appropriate boundaries that disallow environmentally impossible states from being considered by the AI system. The causal scenario 4100 feeds into the causal selection component 4200, which selects the appropriate information to be considered for further processing by the pipeline. The causal transforms component 4300 receives the filtered information from 4200 and applies suitable transforms, including association-based statistical transforms and symbolic transforms, and feeds into the interventions component 4400. The interventions component 4400 applies causal interventions using a suitable logic (such as the do( ) operator if using Pearl's causal logic), and then feeds into the counterfactuals component 4600. The counterfactuals component 4600 applies counterfactual causal logic to the current scenario being considered. Components 4300, 4400, 4600 may repeat the pipeline process iteratively, starting from any previous part of the pipeline as appropriate. When the pipeline is ready with its processing, the result is transmitted and stored back in the causal model 3410 via the causal features and causal feature interactions component 4700. It is further contemplated that an optional implementation aspect will allow the exemplary embodiment to augment training data via a process of causally and environmentally constrained isomorphisms. In such an option, the output from 4700 is fed to an isomorphism component 4800. The environment model 4500 may also optionally transmit relevant environmental constraints and invariances information 4520 to the isomorphism component 4800. Component 4800 applies possible isomorphic transformations to known data, and subsequently applies causal constraints and filtering based on the information received from 4700 to ensure that only causally and environmentally plausible newly generated or synthesized data samples are transmitted to the augmented causal features and interactions component 4900. Such augmented data samples are added to the causal model 3410 and made accessible to the explainable system 3400 for further retraining, adaptation, few-shot learning processes and other suitable uses.

Continuing with the exemplary embodiment, it is further contemplated that various causal heuristics can be utilized to improve the performance of the causal XTT. For example, the two heuristics given in (Qi et al., 2020) can be incorporated whenever historical information is utilized by the causal XTT, essentially always inserting an unobserved confounder or a noise variable in between historical information and the end answer.

Figure 23:
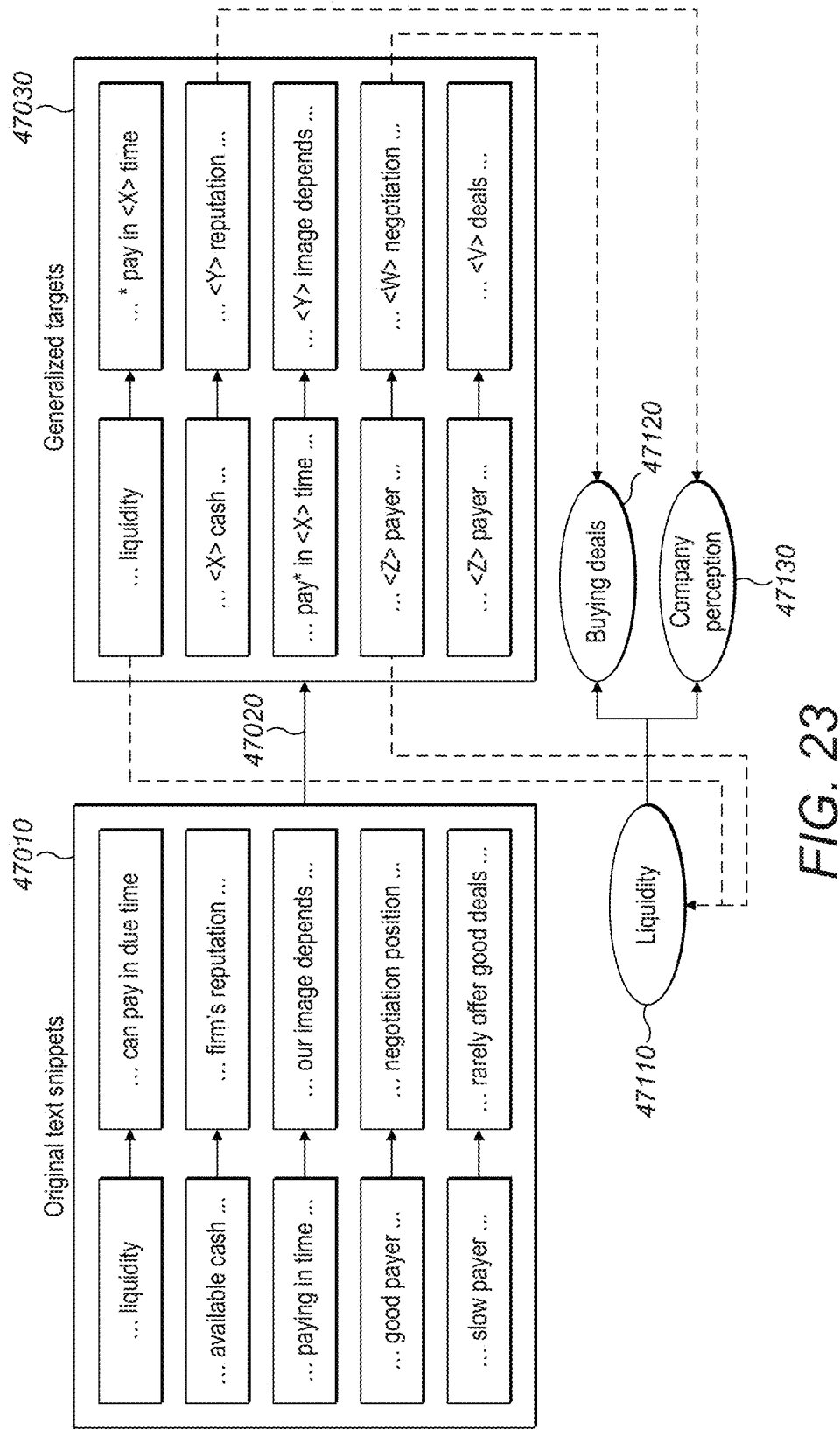
FIG. 23 is an exemplary automated draft causal model creation from document data using an exemplary XTT system.

FIG. 23 illustrates an exemplary causal XTT system implementation that automatically creates draft causal models from natural language documents. Utilizing the XTT attention model, relevant original text snippets from text documents are identified 47010, together with a positional link between the antecedent and its consequent, for example by identifying an antecedent-consequent link between "paying in time" and its consequent "our image depends" (since in this example, the company image depends on paying in time). Through an appropriate masking or generalization process or some suitable self-supervised process 47020, the original causally linked snippets 47010 are then generalized to match different phrases in the documents, which are represented in the exemplary XTT system as generalized targets 47030. For example, the generalized target for the "paying in time" leads to "our image depends" causal link may be given by "pay* in <X> time" leads to "<Y> image depends", where <X> and <Y> are two different typed masks (i.e. a semantical generalization) and the "*" symbol is a morphological generalization that depends on the input language of the documents (i.e. a syntactical generalization). The generalized targets 47030 are then clustered together into causal concepts using a suitable embedding scheme, for example, linking phrases related to "liquidity" and "<Z> payer" to the causal concept (i.e., a causal variable) of "Liquidity" 47110, phrases related to "reputation" to the causal concept of "Company Perception" 47130, and phrases related to "negotiation" and "deals" to the causal concept of "Buying Deals" 47120. The causal structure underlying the generalized targets 47030 (which in turn was extracted from the original text snippets 47010) is used to assign the correct direction of the causal links between the causal concepts. In the example show in FIG. 23, Liquidity 47110 is the cause of both Buying Deals 47120 and Company Perception 47130. It is further contemplated that appropriate causal heuristics may lead the causal XTT to insert a confounder between 47110 and 47120 (representing the uncertainty inherent in dealmaking positions) and another confounder between 47110 and 47130 (representing the uncertainty inherent in company perception and its links to other non-financial causes).

In an exemplary embodiment, an XTT may link neuro-symbolic conditional constraint with part or all of its current and/or previous historic state and/or its previous historic rate of activations in order to constrain the rate of trigger activation. A neuro-symbolic constraint may be implemented in a variety of suitable exemplary implementations including, but not limited to, in the form of symbolic rules or system of symbolic expressions, polynomial expressions, conditional and non-conditional probability distributions, joint probability distributions, state-space and phase-space transforms, integer/real/complex/quaternion/octonion transforms, Fourier transforms, Walsh functions, Haar and non-Haar wavelets, generalized L2 functions, fractal-based transforms, Hadamard transforms, Type 1 and Type 2 fuzzy logic and difference analysis. Neuro-symbolic conditional constraints may also be implemented in form of a data structure that references the different features and variables accessible to the explainable model and any associated taxonomies, ontologies, and causal models. Neuro-symbolic constraints may also be implemented in the form of knowledge graph networks.

A named reference label may be assigned to particular components within an explainable model in an XTT architecture. Named reference labels may be descriptive in nature and may also contain additional meta-data and links to external taxonomies, ontologies, and models. A named reference label may consist of symbolic expressions and/or formulas of the form of: Conjunctive Normal Form (CNF) rules Boolean logic, first order logic, second order logic, propositional logic, predicate logic, modal logic, probabilistic logic, many-valued logic, fuzzy logic, intuitionistic logic, non-monotonic logic, non-reflexive logic, quantum logic, paraconsistent logic or other suitable type of logical system for the expression of logical—or similar statements to provide an explanation of the set or sequence of decisions that resulted in the execution of the current component, in the XTT, which we refer to as the path trace. An "activation path" may be defined as a data flow path followed by an AI model, starting from a particular input, and ending in a particular output prediction. The path trace is set or sequence of decisions, nodes, transitions, or applicable description structures for the particular AI model describing the activation path. Named references may be used in safety related constraints to ensure easier and more reliable identification by humans, especially in potentially critical and stressful situations where human attention span may be severely taxed or limited.

In another exemplary embodiment, the same invariance of named reference labels under dynamical processes may be utilized by an XTT to generate stable, long-term explanations of the dynamics occurring within an AI model without having to recode knowledge or retrain explanatory methods with each run of the dynamical process. It is further contemplated that appropriate temporal transformations may be applied to explain visual dynamics that occur within a 2D or 3D scene whether such a scene is directly observed or synthetically generated.

In an exemplary embodiment, an XTT will use a suitable computational and knowledge representation structure as the basis of its constraint and predictive logic implementation. Such a suitable structure may be a Resource Description Framework (RDF) tree, RDF graph, Levi graph, or other suitable form of graph structure. It is further contemplated that a hypergraph structure or a simplicial complex may be used in a practical XTT implementation.

In an exemplary embodiment, an XTT may implement audit log functionality. An exemplary application of such XTT audit log information is in the creation of decision logs and path traces that clearly illustrate the flow, interactions, and behavior of the XTT and its conditions, events, triggers and actions and overall dynamics. It is contemplated that path traces may be implemented in expert systems and rule-based systems as an annotated sequence of rules that have been triggered and executed. It is further contemplated that path traces may be implemented in workflow systems as an annotated sequence of workflow nodes and paths that have been executed by the workflow engine. The path trace can be used to illustrate the precise sequence and behavior of the XTT and may be implemented and configured to display nearest neighbors along the path that may be of interest to the user. It is further contemplated that an XTT may utilize its own audit system log that can be stored in a system of record, DLT, database, or some other suitable system in a tamper-proof and traceable manner. Such audit information may be either stored in an independent system that is separate from the associated AI model or share the same audit system used by its associated AI model.

In an exemplary embodiment, an XTT may be implemented and verified by on a combination of systems based on one or more of the Temporal Logic of Actions, Abstract Machine Notation, Petri Nets, Computation Tree Logic, and other suitable implementation methods that can formally represent modal logics, intuitionistic logics, and/or relational semantics, including but not limited to Kripke semantics and/or Alexandrov topologies.

In an exemplary embodiment, an XTT may utilize anchor terms. A number of nodes and edges, and other events, triggers, constraints, and actions in an XTT may be deemed to be important or critical for the particular application domain. Such importance may be determined either by the application or usage context, or via an external third party, such as a regulatory or legal authority or an industry standard making body, that imposes certain mandatory constraints. These type of important or critical constraints may be referred to as anchor terms, anchor variables, anchor nodes, anchor edges, anchor events, anchor triggers, anchor constraints and anchor actions, respectively. Such anchor components are analogous to the anchor terms within Explanation Structure Models (ESMs). Anchor terms may also be assigned a named reference label.

In an exemplary embodiment, quantization methods may be applied during the XTT processing to increase performance and possibly reduce implementation size, especially on resource constrained hardware. It is further contemplated that some form of instability reduction technique, such as using Ordinary Differential Equation (ODE) solvers, such as the one presented in Qin et al., (2020) may be applied to partially counteract any detrimental effects of quantization on the XTT accuracy and reduce instability during training.

In an exemplary embodiment, an XTT may utilize a combination of model-free and model-based optimization methods. Model-free methods that rely on statistical relationships and suitable measures such as covariance, correlation and mutual information and other suitable techniques can be used to generate the necessary structures within an XTT without having access to a model or suitable set of priors. Model-based methods that rely on causal relationships, symbolic knowledge or other suitable methods further refine XTTs by adding a richer and more expressive optimization step due to the wider computational representation capabilities of model-based methods.

In an exemplary embodiment, an XTT may be used as the basis or part of a practical data privacy preserving AI system implementation. Data privacy may be violated intentionally or unintentionally by AI systems in a number of scenarios: (i.) personal data from training datasets unintentionally incorporated in AI models; (ii.) personal data can be re-extracted or re-created by analyzing the model answers repeatedly; (iii.) personal data of certain uniquely identifiable groups may end up at a higher risk of identification; (iv.) model inversion and membership inference techniques, that can associate model data via a unique key or signature; (v.) other sources of information, such as public data sources, which may be combined with private information, may re-create or otherwise identify private information. The main data privacy preserving solutions for AI can be classified under four categories: (i.) differential privacy; (ii.) secure multi-party computation; (iii.) federated learning; (iv.) homomorphic encryption. Exemplary embodiments of XTT based systems may enable practical implementations under all four categories.

In an exemplary privacy preserving solution (i.), differential privacy, the introduction of noise in the training data or some other suitable means of obfuscation, may be used to generate a controllable amount of privacy through a noise factor or ratio, in the XTT architecture. The noise level may be a variable which the user may be able to supply or edit, where the noise level may be implemented as a constraint and/or objective. In privacy preserving solution (ii.), secure multi-party computation (SMPC) may be used to obtain a correct answer while concealing partial information about data and may simultaneously compute the answer using data from one or more sources. Exemplary embodiments of XTT and explainable models may extend SMPC protocols to apply to explanation generation apart from answer output. It is further contemplated that exemplary embodiments of an XTT can be analyzed and tested formally for security and trust building purposes without revealing any private information. A secure enclave may also be used to decrypt the data in a protected space within the hardware processor, limiting the possibility that other parts of the system can access such data in clear text. An end-to-end hardware implementation of a combination of an XTT with a secure enclave may be rather resilient to most forms of data attacks. In privacy preserving solution (iii.), federated learning, an XTT may be distributed across various decentralized devices that hold only local data samples. The local data samples are not shared with other devices, thus limiting, but not completely eliminating, the privacy risk involved, and may be particularly suitable for IoT or edge computing applications where messaging options are limited or constrained by the network topology, such as in a mesh network. In privacy preserving solution (iv.), homomorphic encryption, or homomorphic computing may be used to allow computation on encrypted data without either decrypting the data and also, optionally, using encrypted explainable models. In an exemplary embodiment of an XTT using homomorphically encrypted data and a homomorphically encrypted XNN, utilizing the CKKS protocol, a secret key and a public key are generated. The public key is used for encryption and can be shared, while the private key is used for decryption and must be kept secret, for example, in a secure hardware enclave or similar implementation solution.

An XTT system may utilize generated structured explanations based on what-if, what-if-not, counterfactual, but-for, and conditional scenarios to generate explained strategies and scenario-based explanations that correspond to the outcome of applying such scenarios to the XTT system input, where one or more hypothetical target outcomes are selected as part of the scenario modelling. Such scenario-based explanations are also known as contrastive explanations or comparative explanations, depending on whether the target scenario outcome is contrastive or comparative in nature, respectively. It is contemplated that in such a scenario-based explanation generation application, an XTT system may associate constraints with the scenario being examined, objective costs with the feature difficulty/attainability/severity, and associate actions as output targets with domain specific and scenario-specific actions. In a further exemplary embodiment, an XTT system may be implemented together with an XRL agent to provide additional information regarding the policy, costs, and rewards and/or also to provide additional training examples for the XRL agent. In an exemplary embodiment, an XAI model such as XTTs may be used to predict the outcome of a loan application. A loan application may be accepted or rejected for various reasons, such as the total income, the current occupation, age, total net worth, and other factors. The system user may want suggestions on how to change the outcome of the loan application. For example, in the case of a rejected loan application, the system user may want to know what combination of items in the input needs to change for the status of an application to change from rejected to approved. It may be contemplated that only a sub-set of all input variables, features and feature interactions may need to be changed. One or more costs may be associated with each variable, corresponding to some suitable metric for each type of cost. For example, bias protected classes, such as gender or race, may have a very high cost associated or marked as impossible to reach outright (i.e., an illegal outcome state). In another example, a high cost may be associated with strategy actions that are irreversible. Other variables such as current income may have lower cost, than the total net worth variable. The cost of an action may be linear or non-linear and may contain dependent or independent variables which impact the total cost. Missing data may also have a special cost associated with it, enabling the XTT system to handle missing data appropriately, with or without corrective measures. Explanation data such as feature importance or coefficients provide an exact measurement of the expected reward or cost for a given action. Exogenous and endogenous variables and causal models may be used to estimate the total cost of an action, including any specific association, intervention or counterfactual rules that need to be applied, including for data that has partially missing values. An XTT system may be trained to learn the suggested actions for a given user with a specific context, i.e., suggest possible changes in variables, which lead to a change in outcome while minimizing the total cost of actions. It may also be contemplated the suggested actions may contain some form of sequence, which lead to the desired goal. It is further contemplated that a nearest-neighbor method is utilized in conjunction with such scenario-based XTT system explanations to provide (suitably anonymized) actual examples of applications that have had the desired scenario outcome (exemplars) or a hypothetical average of such an application (prototype). Such nearest-neighbor methods may take advantage of partition hierarchy structures within the explainable model, to generate examples from the same partition, or from a nearby partition or from a partition that is further away from the current partition. It is further contemplated that possible changes in variables are ranked and prioritized by some suitable system and presented to the user or to an automated process in the form of an Identify-Assess-Recommend-Resolve (IAR) framework. In an exemplary embodiment, an XTT may be implemented together with an XRL agent to generate realistic environmental simulations and/or provide experience learning data samples for the XRL agent. It is further contemplated that such an exemplary embodiment may be utilized in the creation of virtual reality simulations, augmented reality simulations, virtual collaboration spaces, and metaverses.

In an exemplary embodiment of an XTT system with an AutoXAI (automated XAI) system, optimization methods may also be used to generate scenario-based explanations such as Multiple Objective Optimization (MOO), Pareto Front Methods, Particle Swarm Optimization (PSO), Genetic Algorithms (GA), Bayesian Optimization, Evolutionary Strategies, Gradient Descent techniques and Monte Carlo Simulation (MCS). It is further contemplated that the encoding-decoding information for the XAED and/or XGAN system are fully or partially linked to attribution values and other data stored in an Explanation Structure Model (ESM). It is further contemplated that such an exemplary AutoXAI system may utilize a formal language or some other suitable means to represent a computational graph for the state knowledge stored within the XTT architecture, together with more dynamic changes like the feed-forward network in the encoder and/or decoder of an XTT. This allows the AutoXAI system to adapt the XTT system performance to one or more specific application domains or tasks and provides a practical solution to the incorporation of meta-learning systems within an XTT, which while common in reinforcement learning systems is an unobvious use for XTTs. Such meta-learning systems may also provide a practical solution towards the initial incorporation of human process knowledge which is subsequently refined during AutoXAI model discovery.

An XTT, XTT-Encoder or an XTT-Decoder may process multiple tasks and multiple modalities while sharing the same parameters. In an exemplary embodiment of a multi-task and multi-modal XTT system, an explainable model includes an XTT-Encoder or an XTT-Decoder that processes audio, images and video using the same parameters. The input of the XTT-Encoder or the XTT-Decoder may include the tokenized input for images, the tokenized input for videos and the tokenized input for audio, such that: input$_{(XTT-Encoder)}$={$x_1^{img}$, $x_2^{img}$, ..., $x_i^{img}$, $x_1^{video}$, ..., $x_j^{video}$, $x_1^{audio}$, ..., $x_k^{audio}$}. The XTT-Encoder or XTT-Decoder may include multiple class tokens for each modality, such that: cls$_{(XTT-Encoder)}$={cls$_1^{img}$, cls$_2^{img}$, ..., cls$_i^{img}$, cls$_1^{video}$, ..., cls$_j^{video}$, cls$_1^{audio}$, ..., cls$_k^{audio}$}. cls$_{(XTT-Encoder)}$ may be attached to a linear layer to produce the prediction output of the task. The input embeddings and the positional embeddings may be different for each modality, even though they are connected to the same XTT-Encoder or XTT-Decoder. The XTT-Encoder or XTT-Decoder may be trained for different tasks by sampling a minibatch from each dataset of each task, calculating the gradient and updating the parameters accordingly. Multiple strategies may be used for sampling from different tasks, such as sampling alternating from different tasks, sampling task by task, uniformly sampling from different tasks, sampling tasks according to specific weighting criteria, or accumulating gradients for mini-batches of multiple tasks and performing a singular parameter update, for all the mini-batches of all the tasks or a pre-defined set of mini-batches across all tasks. The XTT-Encoder or XTT-Decoder may be trained one modality at a time for a given task. The XTT-Encoder or XTT-Decoder may be trained in a multi-modal approach by using multi-modal input for a given task. A multi-modal XTT-Encoder or XTT-Decoder enables explanations to be generated in a multi-modal white-box model, to enable model interpretability for a given multi-modal input and output.

In a further exemplary embodiment, an XTT utilizing an explainable model such as an XNN, INN or XTT may have multiple inputs corresponding to one or more tasks that are associated with one or more input features and have multiple outputs corresponding to the outputs for those tasks. The semantic notion of tasks in such context is merely implemented by designating some input features as task identifiers and task meta-data input features without needing any change in the XTT structure itself. The hierarchical partition structure in the explainable model forming part of the XTT, which may be a tree, graph, hypergraph, or simplicial complex structure, allows for crossover between different knowledge learnt for the different tasks to occur efficiently. Such crossover occurs within the XTT prediction network, which caters for feature interactions within the hierarchical partition structure. The XTT conditional network may be used to select, orchestrate and multiplex the correct path trace through the partition structure linking the task, its associated inputs, and associated outputs. It is contemplated that a denser or sparse XTT may be utilized to implement parts of the partition structure in an energy efficient manner. It is further contemplated that a distributed XTT or a DEA may be used to implement parts of the partition structure in a practical manner.

XTTs may be implemented using sparse explainable models or a DEA using sparse explainable models in some or all of its components, including the feed forward components, query-value-key components, attention model and the output related components. It is contemplated that such sparse models may lead to significant power reduction and performance speedups.

Figure 20:
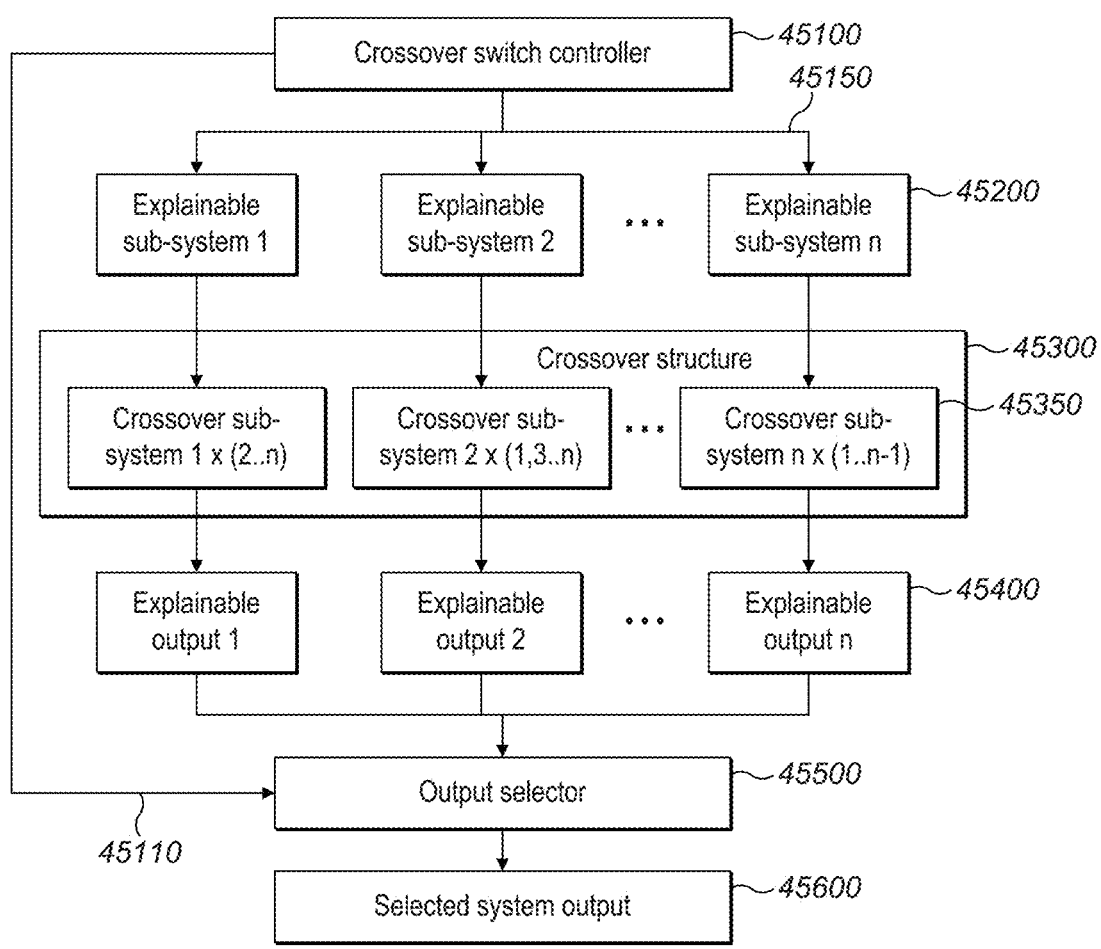
FIG. 20 is an exemplary explainable system with a multi-task crossover learning structure.

FIG. 20 illustrates an exemplary explainable system with multi-task (and multi-modal) crossover learning, which represents a practical solution for multi-task and multi-modal learning for explainable AI systems. Our novel formulation for crossover learning for explainable AI systems, utilizes a crossover learning structure 45300, that is illustrated in more detail in FIG. 21. Continuing with FIG. 20, a crossover switch controller 45100 is used to determine which of the explainable sub-systems 45200 get the task information and input transmitted 45150 to them, thus cutting down on the number of sub-systems that need to be executed in parallel. The explainable sub-systems may be implemented as a DEA or some other suitable homogenous or heterogenous distributed explainable AI system. It is contemplated that a grey-box version of a multi-task and multi-model system may be implemented by having one or more sub-systems consisting of a black-box. Continuing with the exemplary embodiment, each explainable sub-system has links to a crossover learning structure 45300, which in turn consists of various crossover sub-systems 45350. Not all sub-systems necessarily need to be connected to all others, and the crossover learning structure is designed to be implemented as a sparse connection network (although a dense, fully-connected network may still be possible). The explainable output 45400 is produced in parallel, and possibly ranked and prioritized until it reaches the output selector 45500, which takes the interim explainable output 45400 together with control information 45110 from the crossover switch controller 45100 to finally select the system output 45600 that will be output by the system.

FIG. 21 illustrates the detailed components of an exemplary crossover structure implementation (i.e., a detailed part of the crossover sub-system 45350 shown in FIG. 20) linking two explainable sub-systems, represented in FIG. 21 by representative nodes 45210 taken from each of the two sub-systems, in this case, sub-system 1 node 1 (1.1) and sub-system 2 node 1 (2.1). In option (a.), uni-directional links or a directed graph structure is utilized to link the two nodes by having a crossover node 45353 that links sub-system 1 node 1 with sub-system 2 node 1, and another crossover node 45354 that links sub-system 2 node 1 with sub-system 1 node 1. An optional crossover noise node may be inserted in-line between each crossover connection node, namely noise node 45351 in between sub-system 1 node 1 and crossover node 45353, and similarly, noise node 45351 in between sub-system 2 node 1 and crossover node 45354. As another option, the crossover nodes themselves may transmit information to each other, as depicted by exemplary links 45356 and 45357. In option (b.), bi-directional links or an undirected graph structure is utilized to link the two nodes, in which case each crossover node becomes a bi-directional crossover node, as illustrated by component 45355. Noise nodes and inter-crossover node connections may also be added in option (b.) in a similar manner as in option (a.).

The exemplary embodiment of crossover learning shown in FIGS. 20 and 21, may enable XTTs to provide a practical solution for multi-task and multi-modal learning. Various distributed techniques can be used to optimize performance, including optimizing the task order during training, different training schedules and optimizations for different modalities, and sharing the XTT-Encoder across multiple tasks and modalities to optimize the parameter space.

Figure 16:
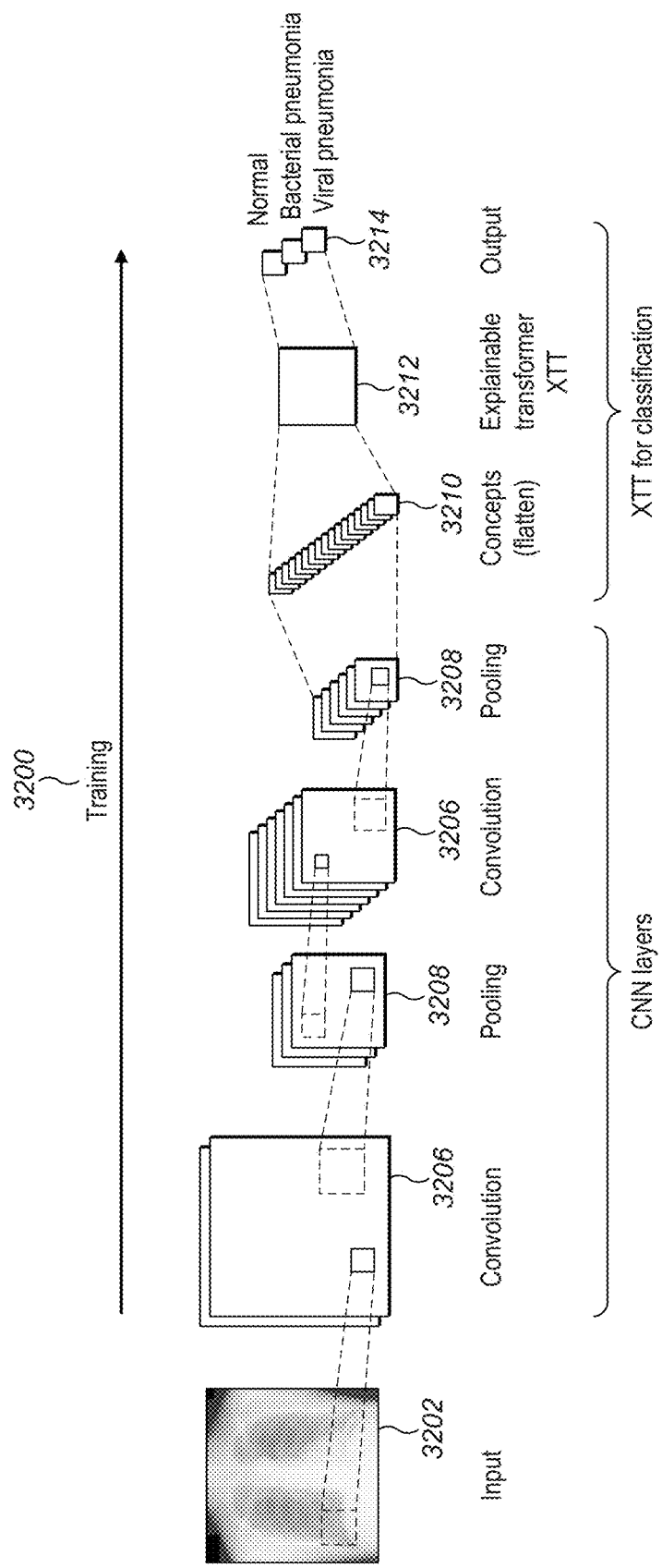
FIG. 16 is an exemplary embodiment of a CNN-XTT architecture.

In an exemplary embodiment, an XTT may be integrated as a component after the final flatten layer of an exemplary CNN based machine learning model. As shown in FIG. 16, the flatten layer may be used as input to a Transformer-Encoder based architecture. With reference to FIG. 16, which illustrates an exemplary medical application, the XTT-Encoder may be fine-tuned by connecting the output of the final Encoder layer to a classification layer to predict if the X-Ray image constitutes a normal unremarkable case or shows signs of Bacterial Pneumonia or Viral Pneumonia. It is further contemplated that further refinements and explanation may be achieved by connecting additional explainable machine learning models to analyze the explainable output further. In a further exemplary embodiment, an XTT or an XNN may be connected to the X-Ray prediction outputs of the system shown in FIG. 16, to determine if the Viral Pneumonia was caused by some particular type of viral disease, like the influenza virus, or a coronavirus like COVID-19, adenoviruses, and so on. It is further contemplated that a risk assessment and an actionable explanation with recommended actions may be further generated in the resulting explanation and interpretation pipeline.

Explainable architectures within the XTT architecture may generate explanations for the classification output. The explanations may be interpreted using basic interpretation, explanatory interpretation, and meta-explanatory interpretation. A basic interpretation may refer to a prediction output o that can be understood by the sub-component. An explanatory interpretation is represented by a 2-tuple vector <o, w> and it refers to a prediction output o combined with a model explanation w for such predicted value, that can be understood by the sub-component. A model explanation may consist of coefficients θ of the explainable architecture x, where x∈{XAI, XNN, INN, XRL, XSN, XMN} or logically equivalent or similar architectures, that may be utilized to explain the feature importance of the input features for a given observation. A meta-explanatory interpretation may be represented by a 3-tuple vector <o, w, j> and it contain the prediction output o, the model explanation w and justification of the model explanation j. The model justification j provides additional information about the assumptions, processes and decisions taken by the explanation system that were taken into consideration to produce the model explanation.

The fully connected layer of a black-box CNN may be replaced with an XTT 3212, as shown in FIG. 16, to construct a white-box CNN-XTT. The steps between 3202 and 3210 may remain the same for a black-box CNN architecture and a CNN-XTT architecture. First, the CNN layer may receive an input 3202. The input 3202 is then convoluted 3206, where different elements of the input are extracted and categorized. Next, the convoluted layers are pooled or grouped based on similar features. The pooled features could be again convoluted and pooled. In this exemplary embodiment, the CNN layer performs the convolution operation 3206 twice and the pooling operation 3208 twice, however it may be contemplated that additional repetitions of these layers may be implemented, depending on the application. After the CNN layers convolute and pool the convoluted features, the features may be flattened 3210 for input into the next system. FIG. 16 illustrates a CNN-XTT architecture, during the forward training pass 3200, which implements an XTT architecture which produces the output 3214 and may additionally produce an explanation. The actual configuration of such steps may depend on the configuration of the specific CNN network. CNNs, similar to tabular datasets, make use of fully-connected layers in order to learn patterns in the data. The other CNN layers are simply feature transformation steps which occur prior to the classification task. A similar concept is applied with CNN-XTT, whereby such CNN transformations may be applied prior to the general XTT.

Pooling layers are standard layers found in CNN networks. They are typically placed after a convolutional layer, where a convolution layer provides a summary of the features in an image or some form of multi-dimensional data. The main issue with convolutional layers is that they are sensitive to the location of the input features. This means that small variations in the input data will result in a different feature map. One approach is to down sample the data where low resolution of the same data is used for further processing. One method for down sampling in a CNN network is called pooling. Pooling makes use of an operator to reduce the size of the feature map. Two common pooling methods are Max and Average Pooling. For example, max pooling may be used to calculate the maximum or largest value from a feature map.

CNN-XTTs may also make full use of masked learning methods to generalize their learning models better, including self-supervised models that have been previously discussed.

The reverse indexing mechanism (backmap) is something unique to the CNN-XTT architecture which is possible due to the white-box nature of CNN-XTTs. In the case where all layers are interpretable (including the CNN layers), it is possible to apply reverse indexing using backmap in order to backtrack the output all the way to the original input.

Figure 17:
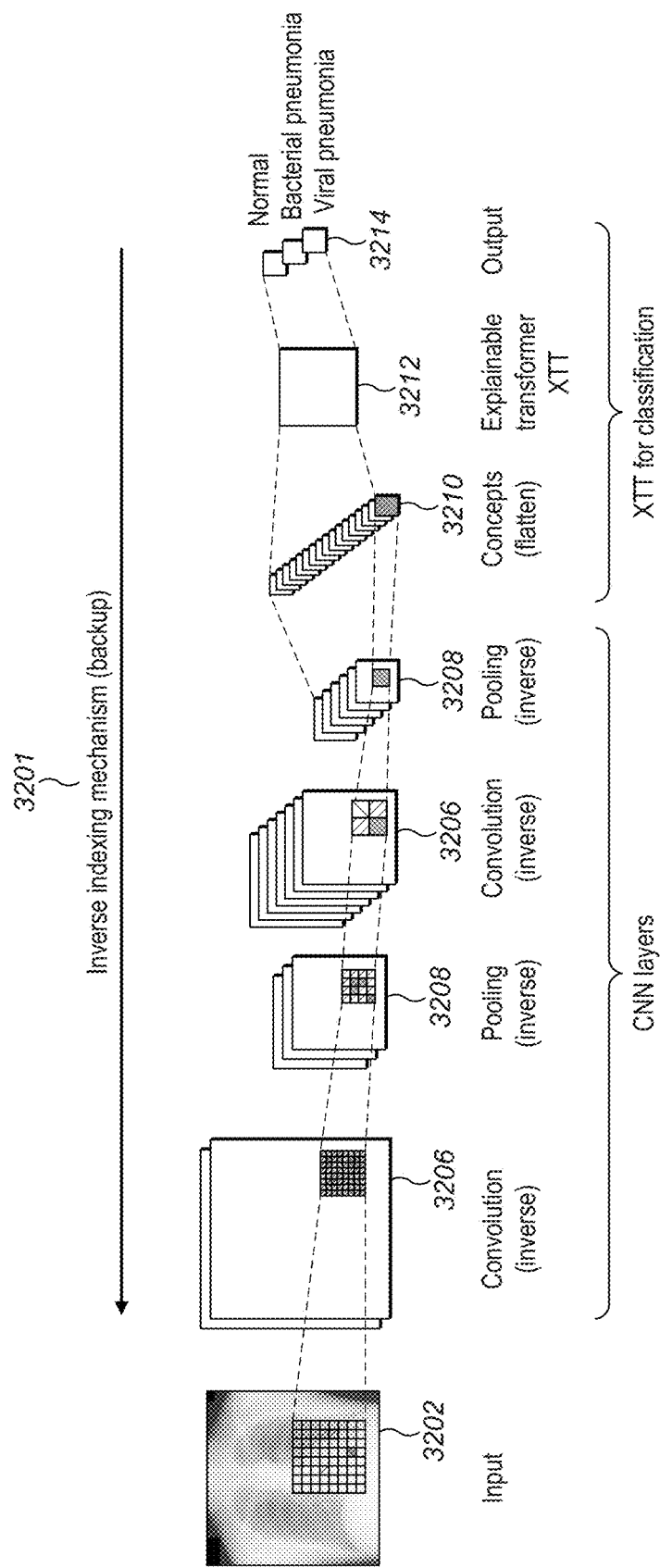
FIG. 17 is an exemplary embodiment of a CNN-XTT implementing an inverse indexing mechanism.

Referring now to exemplary FIG. 17, FIG. 17 may illustrate an exemplary reverse indexing mechanism. An exemplary reverse indexing mechanism 3201 may be used to generate explanations in a CNN-XTT. The reverse indexing process illustrated in FIG. 17 may implement steps which are the same as or similar to the steps in the forward pass indexing process illustrated in FIG. 16. However, in such a case, the operation may instead be performed backwards, beginning with the output, and ending with the features of the input. Further, the pooling function may up-sample the data as opposed to the pooling in the forward pass which down samples the data. Similarly, convolution layers are worked out as a deconvolution operation.

The output from the prediction network may serve as the basis for generating explanations in a CNN-XTT. The prediction network may weigh the input features by using an equation where each feature is weighed by a coefficient. Each coefficient represents the importance of the final convoluted features. In order to create meaningful explanations, the convoluted features along with their importance may be mapped back to the original input. Since the middle layers of CNN-XTTs are not fully connected dense layers (black-box) but rather sparsely connected (white-box) layers of the XNN, it is possible to apply a reverse indexing mechanism (backmap) that maps the output of the convoluted features back to the original input. CNN-XTTs are unique in their implementation of a reverse indexing mechanism, which allows fast output of explanations together with fast association of the explanations with the answer and the precise activation path followed by the CNN-XTT during processing.

The creation of the backmap can generally be implemented as a static process that is executed once when the architecture of the CNN-XTT is determined. If the CNN-XTT architecture itself (i.e., the connections, layers, etc.) is updated, the backmap will need to be updated once per such architectural update. A possible embodiment may involve the dynamic creation and update of the backmap if the CNN-XTT architecture is updated dynamically. The once-per-architectural-update nature of the backmap creation allows for an efficient implementation and room for further optimizations based on the backmap itself. For example, the backmap may be used to efficiently identify segments and regions of interest that occur in the input multi-dimensional data, efficiently identify symbols and concepts, and also optimize the process of creating summaries and lower resolution sub-samples of the input multi-dimensional data quickly.

The backmap may be processed as an external process or as a neural network which performs the inverse function. The neural network may be embedded within the CNN-XTT or kept as a separate network specifically designed for performing the inverse indexing mechanism. The process may start by identifying feature importance, as determined by the coefficients of the XTT network, and moves back, step by step, in reverse. The output weights may be mapped back to the original inputs. Such steps may be applied sequentially, depending on the type of layer found in the original CNN-XTT network. The mapping may be applied until it reaches the original input, which would enable the conceptual feature importance to be mapped back to the original input.

A CNN-XTT may use the backmap to visualize activation paths in the CNN-XTT for a particular query and also be able to incorporate it as part of the justification. Backmap may also be used to enhance visual question answering (Malinowski et al., 2016) by adding an element of explanations to multi-modal representations of fused image, query text and answer pairs.

The reverse indexing mechanism may be useful for generating explanations either in the form of heatmaps or in some form which considers the actual convoluted filters when generating explanations. The convoluted features may be useful for detecting strokes, edges or patterns which may then fuel the explanation generation process which could be visual, textual, audio, etc.

The CNN-XTT architecture may integrate the kernel labelling method, where such method associates human readable labels with data formats such as images or 3D scans that are not textual in nature. The kernel labelling method labels data into a progressive refinement of primitives, patterns, symbols, and concepts from any data format that allows a pattern recognition kernel to be defined, together with a suitable key point description function and an activation maximization function. A kernel primitive may be defined as a matrix of a certain shape being searched for in the respective filter being analyzed. The kernel labelling method may initially analyze the first convolutional layer using human defined kernel primitives and may proceed to slide through the convolutional and pooling layers in the CNN architecture. It is further contemplated that different kernel types, such as linear, non-linear polynomial, exponential, radial-basis-function, sigmoid and other suitable kernels may be utilized in conjunction with XTTs. It is further contemplated that approximation kernels may be utilized in conjunction with XTTs to reduce the amount of computation and/or resources needed, for example through the quadrature method (Nyström), singular-value decomposition (SVD), random Fourier features, random binning features and other suitable methods. It is further contemplated that temporally optimized variants of CNNs, such as Temporal Convolutional Networks (TCNs) may be used in conjunction with XTTs.

XTTs may also utilize a variety of approximation techniques to increase predictive and/or training performance including, but not limited to, approximation or outright elimination of the dot product, using sparse local attention models, adaptive attention windows, use of multi-dimensional attention matrix approximations (potentially using an explainable model for the approximation), intelligent weight sharing and intelligent parametrization.

XTTs may have a wide variety of applications where the input data may be in various formats that are suitable towards some form of token-based encoding, including but not limited to human readable natural language, graphical or visual image data, audio, speech, haptic, video, time series, multi-spectral data, hierarchically ordered multimedia content, 3D data, and other suitable formats. It may be contemplated that a combination of various formats may also be presented and processed by an XTT system using some suitable implementation method such as multiplexing or other form of input combination.

It may be contemplated that the XTT output may present the generated explanations and interpretations using various presentation formats and layouts including but not limited to human readable natural language, graphical or visual formats, audio, speech, haptic, video, time series, multi-spectral data, hierarchically ordered multimedia content, 3D data, and other suitable formats. A combination of various formats may also be used by an XTT system in its output using some suitable implementation method such as multiplexing or other form of output combination.

In an exemplary embodiment, an XTT system may be used to process sequence data. Sequence data may include a number of data points which contain feature data in various sequential formats including, but not limited to: 2D data, 3D data, multi-dimensional data arrays, transactional data, time series, digitized samples, sensor data, image data, hyper-spectral data, natural language text, video data, audio data, haptic data, LIDAR data, RADAR data, SONAR data, and the like. Data points may have one or more associated labels which may indicate the output value or classification for a specific data point or a continuous or non-continuous interval of data points. Data point sequences may result from an internal and/or external process that may output a combination of synthetic data points, perturbed data, sampled data, or transformed data.

XTTs may also allow data point input sequences of arbitrary length to be mapped to arbitrary data point output sequences of arbitrary length, in a multi-modal and multi-task manner. This is achieved by XTTs by utilizing explainable models (unlike non-explainable Transformers, that use unexplainable latent spaces) for the mapping computation, which happens in a similar fashion to Map-Reduce systems. The XTT crossover learning structure allows for multi-task generalization that is domain and application independent.

In an exemplary embodiment, an XTT system may be used to analyze human behavior, including gait analysis, movement prediction and emotional state prediction. As an option, such an XTT system may be used to predict and analyze sports footage and athletic performance. As another option, such an XTT system may be used to detect and predict medical conditions, especially when combined with additional sensor data, such as ECG heart rate data, blood pressure, oxygenation levels, and so on.

In an exemplary embodiment, an XTT system may analyze financial stock trading patterns and utilize a combination of causal models and multi-modal data to predict market behavior, and subsequently execute automated actions such as buying, selling, or putting a long or short position on particular stocks.

In an exemplary embodiment, an XTT system for Industry 4.0 applications, such as intelligent manufacturing, IoT enabled applications, intelligent energy efficient and ecologically friendly smart utility distribution and consumption networks, and related applications, that incorporate a Behavioral Model (BM). Four main different types of functions can be provided by such an exemplary embodiment: (i.) passive predictions and analysis; (ii.) reactive predictions and analysis; (iii.) passive control and interventions; (iv.) reactive control and interventions. In a manufacturing application, exemplary applications would be for: (i.) analyzing audio emanating from machinery, analyzing operational state, and predicting failure modes in advance; (ii.) utilizing boundary proximity conditions that may output warnings to the end-user; (iii.) utilizing feedback thresholds to trigger feedback-based actions and interventions; (iv.) utilizing active estimation and prediction of events to control processes in real-time, including safety considerations.

In an exemplary embodiment, an XTT model is used to translate a sentence from a source language to a target language. The input of the explainable encoder component is the source language sentence $S_e$, such that $S_e = \{t_1, t_2, \ldots, t_n\}$. The encoder component processes the input sequence to produce memory keys and values for the decoder component. The memory keys and values are passed to each explainable decoder layer in the encoder-decoder attention component. The explainable decoder component then predicts the translated tokens of $S_e$ using a linear layer and a softmax function, or similar mechanisms. The predicted output of the softmax layer is used as input to the decoder component for further predictions. In a further exemplary embodiment, an explainable architecture x, where x∈{XAI, XNN, INN, XRL, XSN, XMN} or logically equivalent or similar architectures, is used instead of the linear layer to predict the output of the explainable decoder component.

In an exemplary embodiment, an n-layer XTT is used to translate a document from a source language to another target language. The input embeddings are combined with the positional embeddings and are used as input to the explainable transformer XTT. The explainable architecture in the encoding layer induces the black-box feed-forward neural network component to predict the output of the black-box feed forward neural network 230, while generating global explanations and local explanations. The explanations may be filtered using filters from the explanation framework to create interpretations to be used for the Encoder-Decoder Multi-Head Attention component of the decoder. The XTT Encoder-Decoder may also utilize a dynamic attention span to improve adaptability to different situations, with the span window length being a parameter that gets included in the output explanation and/or justification. The explanation architecture of the decoder induces the feed forward neural network component 270 as shown in FIG. 6, generating explainability for the predictions of the linear layer of the target language vocabulary for the translations. The XTT explanations and/or XTT output may be filtered using filters from an EIGS system or a suitable Explanation Framework to create interpretations that are in turn presented to a suitable Interpreter. A typical embodiment of such a practical application pipeline is presented in FIG. 14, where an XTT can be used as a practical embodiment of components 904, 908, 912 and optionally 911 in a typical explanation and interpretation pipeline. It is further contemplated that an XTT may be utilized to perform presentation oriented transformations and enhancements of explanation and/or interpretation outputs, including but not limited to (i.) generation of human readable explanations; (ii.) dialogue and interactive outputs; (iii.) question-answering; (iv.) classification of explanations and/or interpretations; (v.) frequently asked questions (FAQ) type of outputs; (vi.) entailment of answers and outputs in relation to a previously known context; and (vii.) the selection of an output from multiple ranked choices. It is further noted that XTTs provide significant advantages over non-Transformer architectures such as ELMo, both in terms of parallelization and overall throughput and also in terms of explainability.

In an exemplary embodiment, an n-layer XTT is used to detect if the text content of an email is spam or not spam. The Transformer-Encoder architecture consists of a downstream classifier 1008 connected to the final encoder layer, to predict if an email is spam or not spam, as shown in FIG. 10 (a). The classifier may be an explainable architecture x, where x∈{XAI, XNN, INN, XRL, XSN, XMN} or logically equivalent or similar architectures, to generate explanations for the specific domain downstream task. In a further exemplary embodiment, a Transformer-Decoder architecture is used for a text classification task, shown in FIG. 10 (b). The downstream task classifier 1009 may be an explainable architecture x, where x∈{XAI, XNN, INN, XRL, XSN, XMN} or logically equivalent or similar architectures, to generate explanations for the domain downstream task. The explainable architecture is induced from the feed forward neural network component 1900. The generated global explanations and local explanations are used in conjunction with the output of the XTT for the downstream spam detection task, using a machine learning classifier such as feed forward neural network, to classify if the input text tokens are spam or not spam. The downstream task classifier may also be induced using an explainable architecture x, where x∈{XAI, XNN, INN, XRL, XSN, XMN} or logically equivalent or similar architectures, to generate explanations for the specific domain downstream task.

Finite State Transducers (FSTs) have been one of the earliest models that were successfully applied to document processing, and XTTs are a direct evolution and generalization of those early FSTs. FSTs, and by extension, XTTs, have been highly successful in Human Language Technology (HLT) applications like morphological analysis, and finite-state parsing. Early motivation for FSTs for processing natural languages was the realization that writing grammars for natural languages was just too hard and laborious to be practical. One of the main appeals of FSTs is their ability to be converted to rules and compiled back in FST form while allowing their expressive power of their Non-Deterministic Finite Automaton (NDFA) origin to handle complex input-output transformations. The XTT attention model, being implemented using an explainable model, allows for such rule extraction to be done via successive levels of detailed approximation. Complete conversion of the entire attention model of an XTT to derived rules may also be possible, but without some form of compression, generalization, or approximation, will unlikely result in a practical system due to the sheer number of rules that will be extracted. The advantage with XTTs is that symbolic methods like typed masking and grammar tree analysis and information theory-based compression and analysis methods can be used to generalize and compress such an initial set of rules into a more manageable format. Explainable models within XTTs can be used to convert XTT attention models to symbolic rule-based format by analyzing their feature interaction layer, which can be subsequently converted to recurrence relations (even when there is recurrence or an element of feedback or past learned representation references) and then finally on to a human and machine-readable rule format.

In another exemplary embodiment, an XTT is used to process a legal document and correctly determine the references and text sections applicable to the different parties and entities involved and being references to in the aforesaid legal document. The entity relationships, attributes and constraints that are extracted by the XTT attention model, together with the textual language information itself processed by the XTT, are then utilized to double-check the document against a set of predetermined rules stored, for example, in an XAI model and/or an XNN and/or another XTT, for various legal issues including a combination of: red flags, liability issues, omissions of clauses, over-aggressive claims by a counter-party or entity, precedence issues, precedents, case law references, risk classification of clauses, impact classification of clauses and determination about the acceptability of particular clauses. It is further contemplated that the XTT may be utilized to rank possible edits including inclusions and deletions and/or mitigation strategies to improve the quality of the legal document. It is further contemplated that the XTT may optionally take into consideration the appropriate context, depending on what party the XTT should side with, to ensure that such party interests are represented according to different user specified levels of comprehensiveness and aggressiveness.

Figure 22:
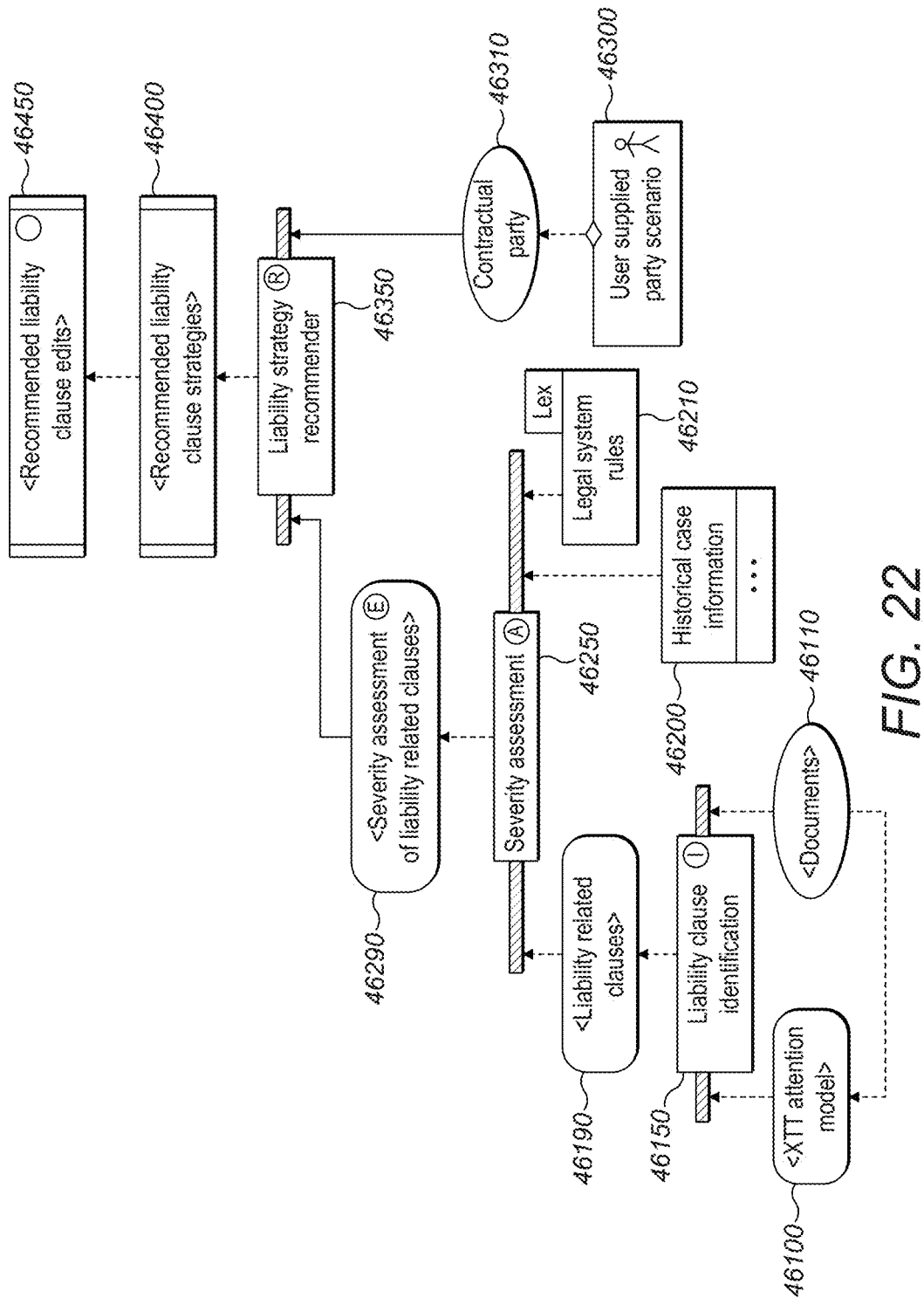
FIG. 22 is an exemplary Explanation Structure Model (ESM) for document processing using XTTs within an Identify-Assess-Recommend-Resolve (IAR) framework.

FIG. 22 illustrates an exemplary XTT system implementation used for legal document processing, using an Explanation Structure Model (ESM) notation. In the example, the XTT attention model 46100 is used to identify potential liability-related clauses 46190 from the legal documents corpus 46110 using a liability clause identification component 46150. The XTT also has access to historical case law information 46200 and a structured system of rules 46210 representing the legal system for the relevant jurisdiction, obtained via an external provider ("Lex" in the example). The historical information 46200, legal system rules 46210 and the liability related clauses 46190 are used to assess the severity and consequence of each clause 46290 using a severity assessment component 46250. The XTT also uses user-supplied scenario information 46300 together with contractual party information 46310 that has been extracted in parallel to process the severity assessed liability clauses 46290 using a liability strategy recommender component 46350 that recommends different liability minimization strategies 46400 depending on what side of the contracting parties to take. Finally, the XTT uses a ranking component from the explainable model to recommend precise edits 46450 to the legal documents 46110 that can then be either automatically selected or selected with human-in-the-loop type of approval.

In an exemplary embodiment, an XTT system that is processing documents may utilize multi-modal document layout and document understanding techniques to segment, process and link text, images, and other multi-modal content in a document correctly.

XTTs may also be used to track state changes within the dynamical system that they are modelling and generate explanations that explain the dynamical processes that are identified within such systems.

In an exemplary embodiment, an XTT system may utilize Fast Weights in its explainable model components. Such XTT systems may be denoted as Fast XTTs or F-XTTs. Fast Weights may give a superior boost to runtime performance of the resulting XTT system while enabling it to adapt quickly to changing input dataset distribution and new previously unforeseen training data samples that were not part of the original training dataset. F-XTTs may also be more efficient at handling sequence input data and other similar multi-dimensional input data. As may be understood in the art, Fast Weights may provide a temporary repository of certain previous events through weight variables which may change more quickly than standard model weights, essentially providing a "short-term memory" for the system.

In another exemplary embodiment, an XTT is used to control the flow of interactive explanation and/or interpretation processes that are commonly used in applications such as dialogue processing, chatbots, call centre management systems, case management systems, customer support systems, client relationship management (CRM) systems, conversational systems, question and answering systems and similar applications where an element of interactivity with a user and/or another system is required. The XTT attention model is used in conjunction with its answer and explanation generation capabilities to provide a practical solution to the efficient management of the interaction flow and generation of the relevant interactive output. It is further contemplated that an explainable Transformer-Decoder type of solution may be used to provide a practical solution in such an exemplary embodiment without needing the full XTT architecture. An XTT-Encoder may be used for named entity recognition (NER) and related tasks like anaphora resolution. An XTT-Encoder may be used for encoding characters and words, in an end-to-end deep learning architecture, to detect the start and the end of an entity. In an exemplary embodiment, an XTT-Encoder is used to encode character-level information to be used as input to another XTT-Encoder to generate word-level contextual embeddings. The word-level XTT-Encoder may process the combination of pre-trained word embeddings with the extracted character features from the character-level XTT-Encoder. A conditional random field layer (Yan et al., 2019) may be used to maximize $P(y|s)$, where s is the sequence and y is the label sequence. The character-level XTT-Encoder and word-level XTT-Encoder may use relative positional encoding and unscaled attention (Yan et al., 2019) to optimize the performance of the NER task.

An XTT-Encoder may be used to identify relationship between two sentences, such as Question-Answering, in a downstream task. An XTT-Encoder may be pre-trained using next sentence prediction (NSP) (Devlin et al., 2018) to learn the association between two sentences using a monolingual corpus. The input tokens of an XTT-Encoder, for a question-answer downstream task, may be defined as $\{[CLS], q_1, q_2, \ldots, q_n, [SEP], a_1, a_2, \ldots, a_m\}$, where [CLS] is a symbol token used in front of every input, [SEP] is a separator token between the question and the answer, q refer to the tokens of the question, such that $q=\{q_1, q_2, \ldots, q_n\}$, and a refer to the tokens of the answer, such that $a=\{a_1, a_2, \ldots, a_m\}$. The [CLS] token is used as input to an explainable model, in an end-to-end deep learning network for classification to determine if the answer corresponds to the input question.

An XTT-Decoder may be used to detect an entity and perform entity tracking in an input sequence, where the input sequence has no knowledge of the entity, by conditioning the XTT-Decoder on the target entity in an external process. An XTT-Decoder may add a token at the end of the input sequence $t_j$ and use the contextualized token representation of $t_j$ to combine it with the entity representation and use it as an input to an explainable model to get the class prediction probabilities. An XTT-Decoder may be guided towards the target entity by restructuring the input sequence. The input sequence may be restructured using a separator token [SEP] between the sentence and the target entity. The [CLS] token may be added at the beginning of the input sequence or at the end of the input sequence. The [CLS] token may be used as an input to an explainable model x, where $x \in \{XAI, XNN, INN, XRL, XSN, XMN\}$ or logically equivalent or similar architectures, to get the class prediction probabilities.

It is further contemplated that an XTT may be linked to knowledge graphs, RDF databases, key-value pair tables or other suitable databases that provide facts in a symbolic manner that can be merged seamlessly within the XTT explainable models. Such integration also allows a combination of deductive, inductive, abductive, and causal logic to be utilized in the feed-forward prediction pass of an XTT, combining symbolically structured knowledge with connectionist approaches.

In an exemplary embodiment, an explainable system may be used in an explainable chatbot system to explain the decisions of a predictive machine learning model. The explainable chatbot system allows the user to interact with an explainable model x, where x∈{XAI, XNN, INN, XRL, XSN, XMN} or logically equivalent or similar architectures, to request explanations. The explainable chatbot system may consist of an explainable architecture x, where x∈{XAI, XNN, INN, XRL, XSN, XMN} or logically equivalent or similar architectures, to classify the query intent and extracts the requested entities. A dialogue management component may be utilized to manage the state and the context between the user and the explainable chatbot system. An XTT model may be trained to project the model explanations to user readable text, to present it to the user. The explainable chat system may allow interaction with the admin of the system, for human knowledge injection (HKI) or the identification of bias in the white-box models. The explanations generated for the users may include basic interpretation of the model, explanatory interpretation of the model, and meta-explanatory interpretation of the model. An explanatory interpretation is represented by a 2-tuple vector <o, w> and it refers to a prediction output o combined with a model explanation w for such predicted value, that can be understood by the sub-component. A model explanation may consist of coefficients $\theta$ of the explainable architecture x, where x∈{XAI, XNN, INN, XRL, XSN, XMN} or logically equivalent or similar architectures, that may be utilized to explain the feature importance of the input features for a given observation. A meta-explanatory interpretation may be represented by a 3-tuple vector <o, w, j> and it contain the prediction output o, the model explanation w and justification of the model explanation j. The model justification j provides additional information about the assumptions, processes and decisions taken by the explanation system that were taken into consideration to produce the model explanation.

XTTs using explainable models that have hierarchical partition structures in form of a graph or hypergraph generalize to Graph-XTTs (GXTTs), where the attention model is based on graph-attention (or hypergraph-attention) and that can also process graph-to-sequence, sequence-to-graph, graph-to-graph transformation modes apart from the standard XTT mode of sequence-to-sequence transformation. GXTTs may utilize different graph, hypergraph or simplicial complex representation formats including directed, undirected graphs, topological networks, Levi graphs or other suitable representation formats.

In another exemplary embodiment, an XTT is used in a reinforcement learning type of application, or a suitable application that requires a feedback control type of mechanism, such as in a robotic system or a typical control engineering application. An XTT may be used to provide a practical solution to the selection of an action from an action policy and/or to implement an appropriate reward function as part of a reinforcement learning agent. It is further contemplated that an XTT may be used in the training and learning of the action policy and/or reward function itself. It is further contemplated that an XTT may be utilized to learn and discover possible actions that may be executed by a reinforcement learning agent utilizing said XTT.

It is further contemplated that an XTT be used in conjunction with an XRL and/or as part of an XRL system. XRL agents may be used to generate explanations that involve an interventional or counterfactual element using the XTT to provide the necessary context.

Explainable Transformer architectures may incorporate other machine learning systems to incorporate an end-to-end explainable DL system which incorporate an XTT architecture as part of the pipeline. In an exemplary embodiment, an explainable autoencoder XAED is used to compress the word embeddings in a lower dimensional space. The compressed dimensional space is used as input to an explainable Transformer architecture, in conjunction with the generated explanations and partition information, and the positional encoding.

An explainable Transformer XTT architecture may be a component in an end-to-end explainable system in an autonomous system. The autonomous system may be designed using a Behavioral Model Hierarchy BMH. A BMH may include multiple behavioural models $BMH_{BM}$, where $BMH_{BM} = \{BM_1, \ldots, BM_n\}$.

In an exemplary embodiment, the autonomous system may have conditional constraints $BMH_c$ on an XTT, or an explainable Transformer-Encoder architecture, where the architecture is a Transformer-Encoder based architecture with n Encoder layers and the output of the final Encoder layer is fed into an output SoftMax to predict the risk of collision with another vehicle. A conditional constraint c may be placed on the internal coefficients of the explainable architecture 3400 x, where x∈{XAI, XNN, XTT, XRL, XSN, XMN} or logically equivalent or similar architectures. The condition c may be based on other conditions in a hierarchical form. A condition may be of the form of conjunctive normal form (CNF), or disjunctive normal form (DNF), or a suitable first order logic in order to be compatible with formal verification problem solvers such as Satisfiability module theories (SMT) and conflict-driven clause learning (CDCL) Satisfiability (SAT) solvers.

A behavioural model BM may include an explainable system 3470, events 3420, triggers 3430, terminal actions 3440, feedback actions 3450 and system components 3460. The activation of one or more conditions $BM_c$ may fire one or more events $BM_e$ 3420 to activate one or more triggers $BM_t$ 3430. A trigger may be connected between multiple BMs within a BMH. A trigger may provide feedback actions 3450 to the explainable Transformer XTT architecture or feedback to a system component 3460, or activate terminal actions 3440 in the behavioral model. The Behavior Model Hierarchy BMH of an autonomous system may include multiple machine learning models $BMH_x$, where $BMH_x = [x_1, \ldots, x_n]$, with the XTT being one of the models in $BMH_x$. In this case, the conditions of the Behavior Model Hierarchy BMH may be fused together as a conditional requirement for a particular trigger in $BMH_t$.

Figure 18:
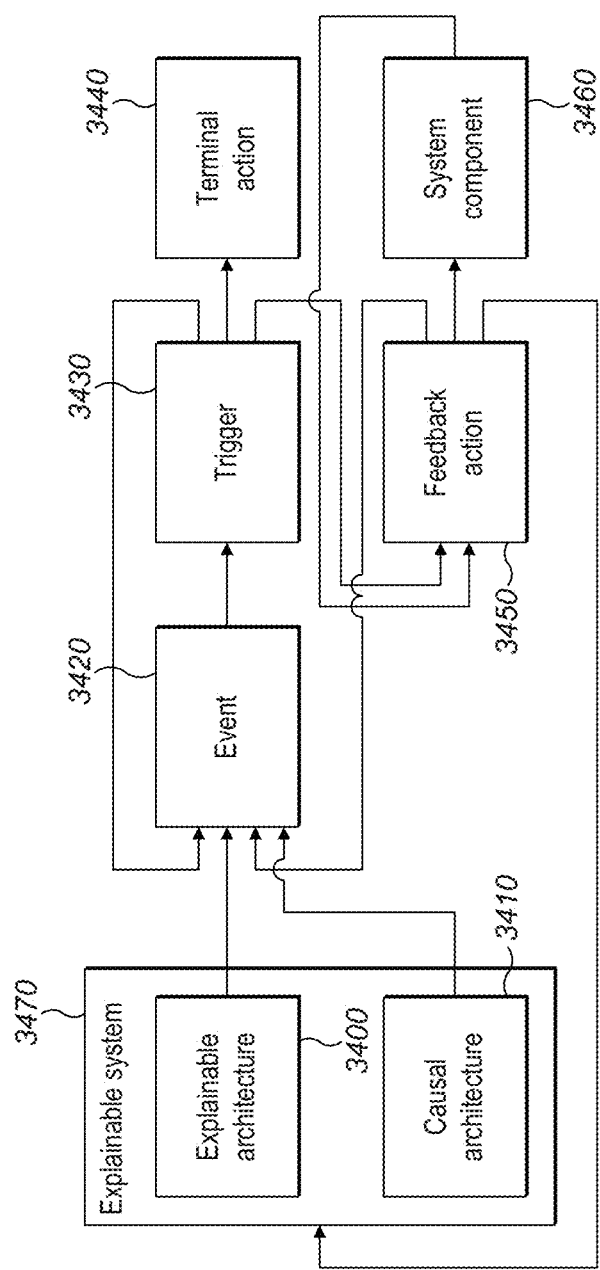
FIG. 18 is an exemplary Behavioural Model for safety and assurance in ML-based systems.

An explainable Transformer XTT architecture may be an explainable architecture component 3400 in an explainable system 3470 within a Behavioural Model framework, as shown in FIG. 18. The explainable system 3470 may include other components such as a causal architecture 3410. A behavioural model BM may consist of an explainable architecture x, where x∈{XAI, XNN, XTT, XRL, XSN, XMN} or logically equivalent or similar architectures. Input constraints may be included during the formal verification of the explainable architecture of the behavioral model $BM_x$. The formal specification constraints may be based on the interpretable internal coefficients of the explainable architecture XTT. The formal specification constraints may be designed in order for formal verification to disallow bias in the explainable system. The formal specification constraints may be used to enable formal verification methods to be utilized with XTTs and all XTT variants. It is further contemplated that formal specification constraints may enable advanced simulation and behavioral analysis methods to be used with XTTs and all XTT variants.

In an exemplary embodiment, an XTT based system (or a sub-system being controlled or monitored by an XTT based system) may be monitored during its nominal operational cycle for anomalies, variances, and deviations from normal operational states and status. It is further contemplated that such a monitoring mechanism may be achieved by combining an XTT with a Behavioral Model (BM), or similar control engineering solution, that allows the definition and implementation of conditions, event, triggers, and actions. Monitoring constraints and expressions underlying conditions, events, triggers and actions may be implemented in a variety of suitable exemplary implementations including, but not limited to, in the form of symbolic rules or system of symbolic expressions, polynomial expressions, conditional and non-conditional probability distributions, joint probability distributions, state-space and phase-space transforms, integer/real/complex/quaternion/octonion transforms, Fourier transforms, Walsh functions, Haar and non-Haar wavelets, generalized L2 functions, fractal-based transforms, Hadamard transforms, Type 1 and Type 2 fuzzy logic and difference analysis. Monitoring constraints and expressions may also be implemented in form of a data structure that references the different features and variables accessible to the explainable model and any associated taxonomies, ontologies, and causal models. Monitoring constraints and expressions may also be implemented in the form of knowledge graph networks, control charts, Nelson rules, Bode plots, Nyquist plots and related methods that determine whether some measured behavioral variable is out of control—i.e., giving a measure of unpredictability versus consistency.

In an exemplary embodiment, an XTT architecture may be used within a behavioural model BM to implement formal verification of an autonomous system to detect nearby pedestrians may be described using constraints and/or rules such as "if a pedestrian is near the autonomous system; and such pedestrian is coming from the left, perform a right turn". An automated constraint and/or rule augmentation system may augment the verification statement by additional background rules adopted from the world context, for example, by adding "where such turn is determined by the system speed, predicted pedestrian speed and right-hand obstacle boundaries". Such a verification problem can be converted into a solvable system of equations, with parameters such as the distance between the autonomous system and the pedestrian, D, given $dist_l<D<dist_u$, where $dist_l$ and $dist_u$ are the lower and upper boundaries of such distance, and at angle θ, given $ang_l<\theta<ang_u$, where $ang_l$ and $ang_u$ are the lower and upper boundaries of the angle of the predicted pedestrian movement vector. Formal verification techniques may be utilized to verify that with such parameter constraints, the prediction output for the right turn angle needs to be within boundaries $o_{lower}<right_{turn}<o_{upper}$. Furthering the example, such formal verification solutions may also be implemented in parallel with those based on observational, dynamic verification of actual observed behavior, in this case, running on the autonomous system itself. Continuing with the example, the autonomous system may also output an explanation at a user-level like "Had to swerve strongly to the right to avoid the pedestrian who ran in front of the car". Adjectives in the explanation, such as "strongly" can be determined via some appropriate classification method, value lookup table, fuzzy logic system, AI model or other appropriate text generation implementation. The autonomous system may consist of an Explainable Transformer-Encoder based architecture $XTT_e$, that takes input images as input. The input images may be divided into patches and flattened and used as input tokens with their corresponding positional encoding. The Transformer-Encoder based architecture $XTT_e$ may be attached to a linear layer for fine-tuning, to predict the control action. The autonomous system may also output more detailed explanations, for example, at a diagnostic-level like "Car swerved strongly to the right (acceleration profile: angle=20°, speed delta=2.77 m/s) to avoid pedestrian (detected object: class=pedestrian, confidence=95%; object vector (predicted): relative degree=90°, relative speed delta=2.22 m/s) collision (predicted collision=91%; predicted injury risk=HIGH; predicted vehicle component=front headlamp)". The autonomous system may also utilize the diagnostic-level explanation, encoded in a suitable format, such as a machine-readable method for encoding and transmitting XAI knowledge, to produce multimedia output, such as an animation on a suitable dashboard display or heads up display system or augmented reality display. It is further contemplated that such information may also be transmitted over an appropriate Intelligent Transport System (ITS) network, such as a vehicle to vehicle (V2V) network, vehicular ad hoc network (VANET), mobile ad hoc network (MANET) using an appropriate inter-vehicle communications (IVC) protocol such as an IEEE 802.11p compatible protocol.

In an exemplary embodiment of an XTT system in an autonomous vehicle, XTTs may be used to predict driving lane shapes, perform end-to-end object detection and behavior prediction, perform point cloud processing, and utilize gaze attention models in conjunction with monocular, stereoscopic and multi-view image data to create internal representations of the surrounding environment, create predictions of the dynamics of the environment while providing contextual aware explanations to the human passengers or users.

An exemplary embodiment may provide a Transformer which is explainable. An exemplary embodiment may include an explainable transducer, explainable Transformer, explainable Transformer-Encoder and/or an explainable Transformer-Decoder. The explainable Transformer architectures may explain the feature attribution of the input tokens towards the predicted data representation. This may be used to understand the predicted output for a given component in a Transformer. Using XNNs/INNs as the underlying architecture for the explainable encoder and explainable decoder of a Transformer, it is possible to construct an end-to-end white-box machine learning system. Advancements of a white-box Transformer include:

Explainable Transformer architectures are as powerful as a standard black-box Transformer.

Explainable Transformer architectures utilize and are fully compatible with all current deep learning libraries and architectures, allowing them to take advantage of all performance advancements available for deep learning systems.

Explainable Transformer architectures allow interpretable models to be created in a flexible manner. They may be trained in one iteration without the need to have an external induction step, as well as the possibility to train it in phases or by incorporating induction for parts of the model.

Explainable Transformer architectures allow fusion of models through partitioning.

Explainable Transformer architectures may compute the encoding and explanation in a single feed-forward pass, without the need for further processing or perturbation.

Explainable Transformers may be initialized, for example, by transferring knowledge from a black-box model, or by transferring knowledge from an existing ruleset, which has been trained externally. Transfer learning may improve the speed and quality of the resulting interpretable model.

Explainable Transformer architectures may incorporate other machine learning systems to incorporate an end-to-end explainable DL system which incorporate an XTT as part of the pipeline.

Explainable Transformer architectures may be used to create interpretable AutoML models.

The foregoing description and accompanying figures illustrate the principles, preferred embodiments, and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for providing an explainable transducer-transformer comprising a processor and a memory configured to provide:
   an input layer configured to receive an input from at least one input interface, configured to identify, from the input, one or more input features, and configured to provide the input to a conditional network and a prediction network configured to operate concurrently;
   the conditional network, comprising:
      a conditional layer configured to model and evaluate the input features based on one or more partitions, wherein each of the one or more partitions comprises a rule provided in the form of an antecedent IF-condition and a consequent THEN-part having at least one output;
      an aggregation layer configured to aggregate one or more rules into one or more aggregated partitions; and
      a switch output layer configured to selectively pool the aggregated partitions from the aggregation layer with the one or more partitions from the conditional layer;
   the prediction network, comprising:
      a feature generation and transformation network comprising one or more transformation neurons configured to apply one or more transformations to the input features;
      a fit layer configured to combine features which have been transformed by the feature generation and transformation network to identify one or more coefficients related to at least one of: one or more features and one or more partitions; and
      a value output layer configured to analyze the one or more coefficients and configured to output a value related to at least one of the one or more features or the one or more partitions; and
   at least one of an encoder layer and a decoder layer, wherein the at least one of the encoder layer and decoder layer comprises an explainable architecture formed from the input; and
   an output layer configured to generate an output based on a combination of a switch output layer output and a value output layer output, and further configured to control at least one of an output interface and an output physical effector via the output;
   wherein the explainable transducer-transformer is configured to store and provide, to an external process, one or more execution paths through the partitions.

2. The system for providing the explainable transducer-transformer of claim 1, wherein the input layer is configured to receive the input from the at least one input interface by receiving an external file and extracting, from the external file, a portion of data from the external file comprising less than all of the data of the external file.

3. The system for providing the explainable transducer-transformer of claim 2, wherein the external file is a multimedia file comprising data defined in a sequential format, and wherein extracting the portion of the data from the external file comprises separating a first form of media data comprising a first plurality of frames from a second form of media data comprising a second plurality of frames, and extracting the first form of media data.

4. The system for providing the explainable transducer-transformer of claim 3, wherein the system comprises each of the encoder layer and the decoder layer, and wherein the input layer is configured to provide one of the first form of media data and the second form of media data as an input to the encoder layer and another of the first form of media data and the second form of media data as an input to the decoder layer.

5. The system for providing the explainable transducer-transformer of claim 3, wherein the input further comprises at least one event class, and wherein the system further comprises an activation layer configured to predict, based on the first plurality of frames, whether the at least one event class is present in one or more of the first plurality of frames.

6. The system for providing the explainable transducer-transformer of claim 3, wherein the system is further configured to generate the input features based on one of the first plurality of frames and the second plurality of frames and generate feature representations based on transformations applied to the input features, wherein the at least one of the encoder layer and the decoder layer includes the decoder layer, and wherein the decoder layer is configured to combine the feature representations with temporal positional embedding.

7. The system for providing the explainable transducer-transformer of claim 2, wherein the external file comprises at least one of structured data and unstructured data, and wherein extracting the portion of the data from the external file comprises extracting and separately storing a plurality of data snippets and a plurality of positional links, each positional link disposed between paired text snippets in the plurality of data snippets.

8. The system for providing the explainable transducer-transformer of claim 7, wherein the at least one input interface comprises at least one of: a dialogue processing system, a chatbot, a call center management system, a case management system, a customer support system, a client relationship management (CRM) system, a conversational system, a question and answering system, and a user interactive system;
   wherein the external file comprises at least one record of a user interaction provided to the at least one input interface; and wherein extracting the portion of the data from the external file further comprises classifying paired data snippets as antecedent-consequent linked data snippets, and generalizing the paired data snippets based on one or more typed masks.

9. The system for providing the explainable transducer-transformer of claim 2, wherein the external file is a text file, wherein the at least one of the encoder layer and the decoder layer includes the encoder layer, wherein an input to the encoder layer comprises a token and an entity input, and wherein the encoder layer is configured to link an entity in the entity input to an entity representation in a knowledge base linked to the encoder layer.

10. The system for providing the explainable transducer-transformer of claim 2, wherein the external file is a multimedia file comprising a plurality of data points comprising at least one of: 2D data points, 3D data points, multi-dimensional array data points, transactional data points, time series data points, digitized sample data points, sensor data points, image data points, hyper-spectral data points, natural language text data points, video data points, audio data points, haptic data points, LIDAR data points, RADAR data points, and SONAR data points; and
wherein the prediction network is configured to output the value related to at least one of the one or more features or the one or more partitions by auto-regressively predicting a data point value from the external file.

11. The system for providing the explainable transducer-transformer of claim 2, wherein the input layer is configured to divide the external file into a plurality of patches, a patch in the plurality of patches comprising the portion of data, and wherein the system is configured to convert, via down-sampling, each patch in the plurality of patches into an input token to form a plurality of input tokens.

12. The system for providing the explainable transducer-transformer of claim 11, wherein the at least one of the encoder layer and decoder layer comprises the encoder layer, and wherein the encoder layer is further configured to retrieve, from a database, a classification token, and determine whether any input token in the plurality of input tokens matches the classification token.

13. The system for providing the explainable transducer-transformer of claim 12, wherein the classification token is a classification of a medical anomaly, and wherein the input further comprises one or more constituent priors associated with the plurality of patches.

14. The system for providing the explainable transducer-transformer of claim 1, wherein the input comprises a plurality of inputs, a first input comprising a computer-generated image and a second input comprising a photograph image, and wherein the value output layer is configured to output a blend of the computer-generated image and the photograph image based on at least one image transformation identified from the computer-generated image.

15. The system for providing the explainable transducer-transformer of claim 1, wherein the system is embodied on an implanted medical device, wherein the at least one input interface comprises a sensor and wherein the input comprises a measurement signal.

16. The system for providing the explainable transducer-transformer of claim 1, wherein the input comprises a plurality of inputs, a first input comprising a plurality of video frames and a second input comprising a plurality of captions associated with the plurality of video frames, wherein the at least one of the encoder layer and decoder layer comprises the encoder layer, and wherein the one or more coefficients define one or more relationships between the plurality of captions and the plurality of video frames.

17. The system for providing the explainable transducer-transformer of claim 1, wherein the input comprises a plurality of sensor inputs linked to an autonomous system including at least a video sensor, wherein the at least one of the encoder layer and decoder layer comprises the encoder layer, wherein the input layer is configured to divide a sensor input associated with the video sensor into a plurality of patches, and wherein the system is configured to convert, via down-sampling, each patch in the plurality of patches into an input token to form a plurality of input tokens.

18. The system for providing the explainable transducer-transformer of claim 17, wherein the output layer is configured to control, via the output, at least one of:
an output interface of the autonomous system, said control comprising providing a multimedia output on at least one of: a dashboard display, a heads up display system, and an augmented reality display; and
an output physical effector of the autonomous system, said output physical effector comprising a steering system or driving system of the autonomous system.

19. A method of operating an explainable transducer-transformer provided on a system comprising a processor and a memory, said method comprising:
providing, to an input layer of the explainable transducer-transformer, an input via at least one user interface, and identifying, with the input layer, one or more input features;
providing, with the input layer, the input to a conditional network and a prediction network configured to operate concurrently;
with the conditional network, performing steps of:
modeling and evaluating, with a conditional layer of the conditional network, the input features based on one or more partitions, wherein each of the one or more partitions comprises a rule provided in the form of an antecedent IF-condition and a consequent THEN-part having at least one output;
aggregating, with an aggregation layer of the conditional network, one or more rules into one or more aggregated partitions; and
selectively pooling, with a switch output layer of the conditional network, the aggregated partitions from the aggregation layer with the one or more partitions from the conditional layer;
with the prediction network, performing steps of:
applying, with a feature generation and transformation network of the prediction network, said feature generation and transformation network comprising one or more transformation neurons, one or more transformations to the input features;
combining, with a fit layer of the prediction network, features which have been transformed by the feature generation and transformation network, and identifying one or more coefficients related to at least one of: one or more features and one or more partitions; and
analyzing, with a value output layer of the prediction network, the one or more coefficient, and outputting a value related to at least one of the one or more features or the one or more partitions;
forming, in at least one of an encoder layer and a decoder layer, an explainable architecture from the input;
generating, with an output layer, an output based on a combination of a switch output layer output and a value output layer output, and controlling at least one of an output interface and an output physical effector via the output; and storing and providing, with the explainable transducer-transformer, to an external process, one or more execution paths through the partitions.

20. A non-transitory computer-readable medium comprising program code that, when executed by a system comprising a processor and a memory, configure the system to execute steps for operating an explainable transducer-transformer, said steps comprising:

provoding, to an input layer of the explainable transducer-transformer, an input via at least one user interface, and identifying, with the input layer, one or more input features;

providing, with the input layer, the input to a conditional network and a prediction network configured to operate concurrently;

with the conditional network, performing steps of:
modeling and evaluating, with a conditional layer of the conditional network, the input features based on one or more partitions, wherein each of the one or more partitions comprises a rule provided in the form of an antecedent IF-condition and a consequent THEN-part having at least one output;

aggregating, with an aggregation layer of the conditional network, one or more rules into one or more aggregated partitions; and selectively pooling, with a switch output layer of the conditional network, the aggregated partitions from the aggregation layer with the one or more partitions from the conditional layer;

with the prediction network, performing steps of:
applying, with a feature generation and transformation network of the prediction network, said feature generation and transformation network comprising one or more transformation neurons, one or more transformations to the input features;

combining, with a fit layer of the prediction network, features which have been transformed by the feature generation and transformation network, and identifying one or more coefficients related to at least one of: one or more features and one or more partitions; and analyzing, with a value output layer of the prediction network, the one or more coefficient, and outputting a value related to at least one of the one or more features or the one or more partitions;

forming, in at least one of an encoder layer and a decoder layer, an explainable architecture from the input;

generating, with an output layer, an output based on a combination of a switch output layer output and a value output layer output, and controlling at least one of an output interface and an output physical effector via the output; and storing and providing, with the explainable transducer-transformer, to an external process, one or more execution paths through the partitions.

* * * * *